US009721330B2

(12) United States Patent
Chen et al.

(10) Patent No.: US 9,721,330 B2
(45) Date of Patent: Aug. 1, 2017

(54) TEMPORAL NOISE REDUCTION METHOD FOR NOISY IMAGE AND RELATED APPARATUS

(71) Applicant: Huawei Technologies Co., Ltd., Shenzhen (CN)

(72) Inventors: Hai Chen, Shenzhen (CN); Fengwei Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/143,190

(22) Filed: Apr. 29, 2016

(65) Prior Publication Data
US 2016/0253789 A1 Sep. 1, 2016

Related U.S. Application Data

(63) Continuation of application No. PCT/CN2014/086885, filed on Sep. 19, 2014.

(30) Foreign Application Priority Data

Nov. 1, 2013 (CN) .......................... 2013 1 0535703

(51) Int. Cl.
*G06T 5/00* (2006.01)
*H04N 5/14* (2006.01)
(Continued)

(52) U.S. Cl.
CPC ............. *G06T 5/002* (2013.01); *H04N 5/145* (2013.01); *H04N 5/213* (2013.01);
(Continued)

(58) Field of Classification Search
CPC .... H04N 5/145; H04N 5/213; H04N 5/23254; H04N 19/117; H04N 19/137;
(Continued)

(56) References Cited

U.S. PATENT DOCUMENTS 6,307,888 B1 * 10/2001 Le Clerc .............. H04N 17/004
348/607
7,145,607 B1 * 12/2006 Hui .......................... H04N 5/21
348/607
(Continued)

FOREIGN PATENT DOCUMENTS

CN 101262559 A 9/2008
CN 102281386 A 12/2011
(Continued)

OTHER PUBLICATIONS

Partial English Translation and Abstract of Chinese Patent Application No. CN103632352, Part 1, Apr. 12, 2016, 22 pages.
(Continued)

*Primary Examiner* — Lin Ye
*Assistant Examiner* — Chriss Yoder, III
(74) *Attorney, Agent, or Firm* — Conley Rose, P.C.

(57) ABSTRACT

Determining of still/movement may be performed with reference to quantization noise of a first section to which a first pixel belongs, and for different results of determining of whether the first pixel is in a movement area or a still area, different frame difference thresholds applicable to the movement area and the still area are separately set, and different frame difference calculation manners are used, different blending coefficients applicable to the movement area and the still area are selected according to the different frame difference thresholds applicable to the movement area and the still area and the frame difference calculation manners, and a noise reduction blending manner is selected according to the different blending coefficients applicable to the movement area and the still area, the frame difference calculation manners, and a pixel value of the first pixel in a current frame.

20 Claims, 13 Drawing Sheets

(51) Int. Cl.
*H04N 5/213* (2006.01)
*H04N 19/117* (2014.01)

(52) U.S. Cl.
CPC .. *H04N 19/117* (2014.11); *G06T 2207/20021* (2013.01); *G06T 2207/20182* (2013.01)

(58) Field of Classification Search
CPC ............ H04N 19/86; H04N 21/440254; G06T 5/001–5/50; G06T 2207/20021; G06T 2207/20024; G06T 2207/20172; G06T 2207/20182; G06T 2207/20212; G06T 2207/20221
See application file for complete search history.

(56) References Cited

U.S. PATENT DOCUMENTS

| | | | |
|---|---|---|---|
| 7,542,622 | B1 | 6/2009 | Angelini et al. |
| 7,983,501 | B2 | 7/2011 | Chiu |
| 8,059,207 | B2 | 11/2011 | Xu et al. |
| 9,444,977 | B2 * | 9/2016 | Moesle ............... H04N 5/21 |
| 2003/0035594 | A1 | 2/2003 | Kondo et al. |
| 2006/0139494 | A1 | 6/2006 | Zhou et al. |
| 2006/0285020 | A1 | 12/2006 | Shin et al. |
| 2007/0019114 | A1 | 1/2007 | DeGarrido et al. |
| 2007/0070250 | A1 | 3/2007 | Zhou et al. |
| 2008/0204600 | A1 * | 8/2008 | Xu ....................... H04N 5/21 |
| | | | 348/607 |
| 2008/0273119 | A1 * | 11/2008 | Yang ................. G06T 5/002 |
| | | | 348/575 |
| 2011/0091127 | A1 | 4/2011 | Kisilev et al. |
| 2013/0128061 | A1 | 5/2013 | Hsu et al. |

FOREIGN PATENT DOCUMENTS

| | | |
|---|---|---|
| CN | 102497497 A | 6/2012 |
| CN | 102769722 A | 11/2012 |
| CN | 103269412 A | 8/2013 |
| CN | 103632352 A | 3/2014 |
| EP | 1995948 A2 | 11/2008 |
| JP | 2003535521 A | 11/2003 |
| JP | 2007329524 A | 12/2007 |
| JP | 2011199716 A | 10/2011 |
| JP | 2012186593 A | 9/2012 |
| JP | 2012227791 A | 11/2012 |
| KR | 20080078607 A | 8/2008 |
| KR | 20100035909 A | 4/2010 |

OTHER PUBLICATIONS

Partial English Translation and Abstract of Chinese Patent Application No. CN103632352, Part 2, Apr. 12, 2016, 5 pages.
Foreign Communication From A Counterpart Application, Chinese Application No. 201310535703.X, Chinese Office Action dated Nov. 16, 2015, 5 pages.
Foreign Communication From A Counterpart Application, PCT Application No. PCT/CN2014/086885, English Translation of International Search Report dated Dec. 19, 2014, 2 pages.
Foreign Communication From A Counterpart Application, PCT Application No. PCT/CN2014/086885, English Translation of Written Opinion dated Dec. 19, 2014, 9 pages.
Foreign Communication From A Counterpart Application, European Application No. 14858101.0, Extended European Search Report dated Oct. 10, 2016, 5 pages.
Foreign Communication From A Counterpart Application, Korean Application No. 10-2016-7011294, Korean Office action dated Jan. 2, 2017, 5 pages.
Foreign Communication From A Counterpart Application, Korean Application No. 10-2016-7011294, English Translation of Korean Office action dated Jan. 2, 2017, 3 pages.
Yan, L., et al., "Adaptive Temporal Filter Based on Motion Compensation for Video Noise Reduction," Chinese Journal of Electron Devices, vol. 30, No. 5, Oct. 2007, 4 pages.
Machine Translation and Abstract of Japanese Publication No. JP2012227791, Nov. 15, 2012, 32 pages.
Foreign Communication From A Counterpart Application, Japanese Application No. 2016-527275, Japanese Office Action dated May 30, 2017, 3 pages.

* cited by examiner

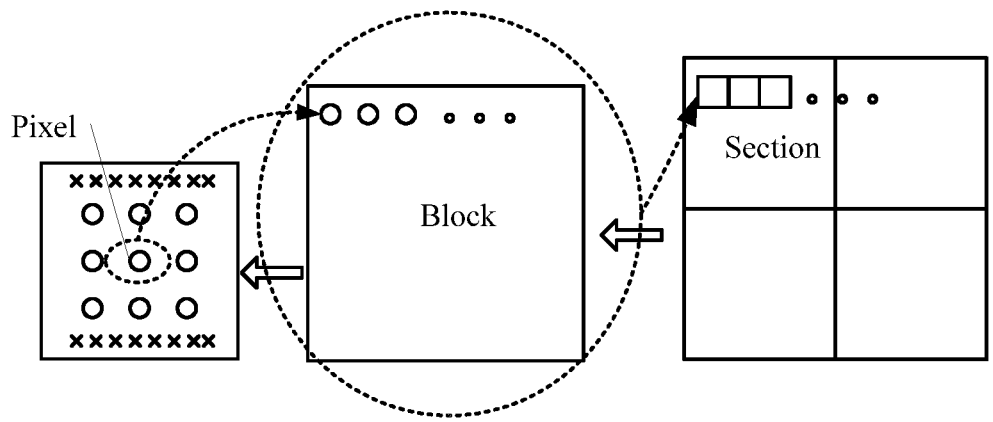
FIG. 9
| -1 | -2 | -1 | | -1 | 0 | 1 | | -2 | -1 | 0 | | 0 | -1 | -2 |
|---|---|---|---|---|---|---|---|---|---|---|---|---|---|---|
| 0 | 0 | 0 | | -2 | 0 | 2 | | -1 | 0 | 1 | | 1 | 0 | -1 |
| 1 | 2 | 1 | | -1 | 0 | 1 | | 0 | 1 | 2 | | 2 | 1 | 0 |
E_h  　　　　E_v  　　　　E_p 45  　　　　E_n 45
FIG. 10
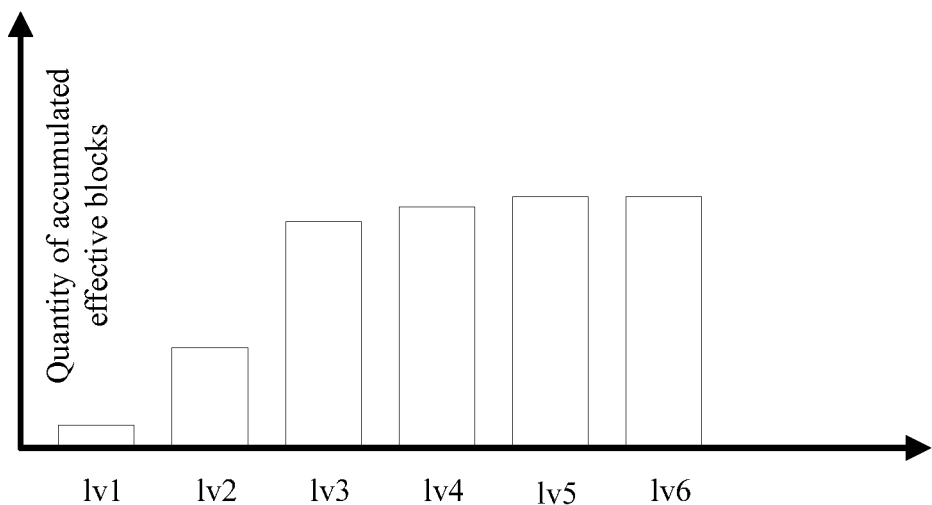
FIG. 11A

TEMPORAL NOISE REDUCTION METHOD FOR NOISY IMAGE AND RELATED APPARATUS

CROSS-REFERENCE TO RELATED APPLICATION

This application is a continuation of International Application No. PCT/CN2014/086885, filed on Sep. 19, 2014, which claims priority to Chinese Patent Application No. 201310535703.X, filed on Nov. 1, 2013, both of which are hereby incorporated by reference in their entireties.

TECHNICAL FIELD

The present disclosure relates to the field of image processing technologies, and in particular, to a temporal noise reduction (TNR) method for a noisy image and a related apparatus.

BACKGROUND

As an image display device increasingly develops, people have higher requirements for high-quality and high definition image information. In practice, a digital image is usually affected by an imaging device, noise interference in an external environment, and the like, during processes of digitalization and transmission. Therefore, such a digital image with noise interference is usually referred to as an image with noise or a noisy image. Noise may reduce a resolution of a digital image and affects display details of the image, which is extremely disadvantageous to subsequent processing of the image. Therefore, effective noise suppression is essential to an image application. Image noise reduction is of great significance in a video processing system. In a television system, deinterlacing, anti-aliasing, and image scaling require that the system provide an image without noise or with low noise as input image information. In a surveillance system, image noise reduction is also a main method for improving quality of a surveillance image.

TNR is an important technical method for image noise reduction. A TNR method that is commonly used in the prior art can be implemented in the following manner:

$$\text{pixel}tnr(x,y,t) = \text{pixel}tnr(x,y,t+\Delta t) \times \text{alpha} + \text{pixel}(x,y,t) \times (1-\text{alpha})$$

where pixel indicates an original noisy image, pixeltnr is an image obtained after TNR, and in a digital image, the foregoing variables are both replaced with discrete variables, x and y are two-dimensional space coordinates, and t is a one-dimensional time coordinate, where x and y determine a position of an indicated pixel, and t represents a position of a current image in an image sequence, that is, a quantity of frames, $\Delta t$ is a time offset, and $\Delta t$ is usually set to 1, alpha$\in[0,1]$, and alpha is a blending coefficient and is used to determine a noise reduction intensity, a larger alpha indicates a higher noise reduction intensity, and vice versa.

The TNR in the prior art is mainly TNR based on determining of movement/still. A movement level of corresponding image content is determined according to a size of a frame difference, and a corresponding blending coefficient is selected according to the movement level. When the frame difference is lower, it is considered that a corresponding movement level is lower, a movement is tending to be still, and a higher blending coefficient alpha is selected, and vice versa.

During a process of implementing the present disclosure, the inventors of the present disclosure found that in the TNR based on determining of movement/still, only a frame difference is used as a basis for determining whether an image moves, and a corresponding blending coefficient is selected according to a result of the determining. However, a detection error may easily occur if only a frame difference is used as a basis for determining a movement of an image. If a moving image is determined to be a still image, smearing of the image may occur, and details of the image may be lost. If a still image is determined to be a moving image, a noise reduction effect may be poor for an image with large noise. Therefore, the TNR based on determining of movement/still cannot adapt to different noise scenarios.

SUMMARY

Embodiments of the present disclosure provide a TNR method for a noisy image and a related apparatus, which are used to perform noise reduction processing on the noisy image with a low probability of detection error, and can be applied to multiple noise scenarios.

To resolve the foregoing technical problems, the embodiments of the present disclosure provide the following technical solutions.

According to a first aspect, an embodiment of the present disclosure provides a TNR method for a noisy image, including acquiring quantization noise of a first section of a noisy image, where the first section is any one of multiple sections divided from the noisy image, detecting, according to the quantization noise of the first section, pixel positions of all pixels in a movement estimation neighborhood in a next frame after the pixels move from pixel positions in a current frame to the next frame, where the movement estimation neighborhood includes neighbor pixels centered around a first pixel, and the first pixel is any pixel in the first section, determining, according to a pixel position change situation of all the pixels in the movement estimation neighborhood that change from the current frame to the next frame, whether the first pixel is in a movement area or a still area, and if the first pixel is in the movement area, selecting a first blending coefficient according to a first frame difference of the first pixel and a preset first frame difference threshold, and calculating a first noise reduction pixel value corresponding to the first pixel according to the first blending coefficient, a pixel value of the first pixel in the current frame, and a movement compensation pixel value of the first pixel in a previous frame, where the first frame difference is a difference between the pixel value of the first pixel in the current frame and the movement compensation pixel value of the first pixel in the previous frame, and the movement compensation pixel value is a pixel value of a corresponding position of the first pixel in the current frame and is obtained after movement estimation and movement compensation are performed based on a noise reduction pixel of the first pixel in the previous frame, and if the first pixel is in the still area, selecting a second blending coefficient according to a second frame difference of the first pixel and a preset second frame difference threshold, and then calculating a second noise reduction pixel value corresponding to the first pixel according to the second blending coefficient, the pixel value of the first pixel in the current frame, and a noise reduction pixel value of the first pixel in the previous frame, where the second frame difference threshold is greater than the first frame difference threshold, the second frame difference is a difference between the pixel value of the first pixel in the current frame and the noise reduction pixel value of the first pixel in the previous frame, and the noise reduction pixel value is a pixel value of a corresponding position of the noise reduction pixel of the first pixel in the previous frame.

With reference to the first aspect, in a first possible implementation manner of the first aspect, acquiring quantization noise of a first section of a noisy image includes dividing the first section into multiple blocks, where each block includes multiple pixels, acquiring quantization noise of all pixels in a first block, and acquiring quantization noise of the first block according to the quantization noise of all the pixels in the first block, where the first block is any block in the first section, and separately acquiring quantization noise of all the blocks except the first block in the first section, and calculating average quantization noise based on the quantization noise of all the blocks in the first section, and using the average quantization noise as the quantization noise of the first section, or, accumulating the quantization noise of all the blocks one by one in the first section, and using quantization noise that is greater than a preset noise threshold in a cumulative histogram as the quantization noise of the first section.

With reference to the first possible implementation manner of the first aspect, in a second possible implementation manner of the first aspect, acquiring quantization noise of the first block according to the quantization noise of all the pixels in the first block includes determining whether each pixel in the first block is in a flat area, acquiring quantization noise of all pixels in the first block that are in the flat area, and calculating the quantization noise of the first block according to the quantization noise of all the pixels in the first block that are in the flat area.

With reference to the second possible implementation manner of the first aspect, in a third possible implementation manner of the first aspect, determining whether each pixel in the first block is in a flat area includes acquiring pixel values of all pixels in a noise estimation neighborhood, where the noise estimation neighborhood includes neighbor pixels that are centered around the first pixel and that are used to determine quantization noise of the first pixel, and the first pixel is any pixel in the first block, calculating an edge estimation value of the first pixel according to the pixel values and Sobel edge convolution kernels of all the pixels in the noise estimation neighborhood, determining whether the edge estimation value of the first pixel is greater than an edge area threshold, and if the edge estimation value of the first pixel is greater than the edge area threshold, determining that the first pixel is in an edge area, or, if the edge estimation value of the first pixel is less than or equal to the edge area threshold, determining that the first pixel is not in the edge area, calculating a texture estimation value of the first pixel according to the pixel values of all the pixels in the noise estimation neighborhood, and determining whether the texture estimation value of the first pixel is greater than a texture area threshold, and if the texture estimation value of the first pixel is greater than the texture area threshold, determining that the first pixel is in a texture area, or, if the texture estimation value of the first pixel is less than or equal to the texture area threshold, determining that the first pixel is not in the texture area, when the first pixel meets both of the following conditions: the first pixel is not in the edge area and the first pixel is not in the texture area, determining the first pixel is in the flat area.

With reference to the third possible implementation manner of the first aspect, in a fourth possible implementation manner of the first aspect, calculating an edge estimation value of the first pixel according to the pixel values and Sobel edge convolution kernels of all the pixels in the noise estimation neighborhood includes calculating the edge estimation value of the first pixel in the following manner:

$$EM(x,y)=|NH(x,y)*E\_h|+|NH(x,y)*E\_v|+|NH(x,y)*E\_p45|+|NH(x,y)*E\_n45|,$$

where (x,y) is a pixel position of the first pixel in the current frame, EM(x,y) is the edge estimation value of the first pixel, NH(x,y) is the noise estimation neighborhood, $E\_h$, $E\_v$, $E\_p45$, and $E\_n45$ are the Sobel edge convolution kernels, and * is a convolution symbol. The calculating a texture estimation value of the first pixel according to the pixel values of all the pixels in the noise estimation neighborhood includes calculating the texture estimation value of the first pixel in the following manner:

$$\text{Noise\_Max\_Min}(x,y)=\text{Max}(abs(value_i-\text{value\_median}))-\text{Min}(abs(value_i-\text{value\_median})),$$
$$value_i \in NH(x,y),$$

where (x,y) is the pixel position of the first pixel in the current frame, Noise_Max_Min(x,y) is the texture estimation value of the first pixel, $value_i$ is the $i^{th}$ pixel value in the noise estimation neighborhood, NH(x,y) is the noise estimation neighborhood, and value_median is a middle value or an average value of the pixel values of all the pixels in NH(x,y), and determining, in the following manner, whether the first pixel meets both of the following conditions. The first pixel is not in the edge area and the first pixel is not in the texture area:

$$(EM(x,y)<=EGth)\&\&(\text{Noise\_Max\_Min}(x,y)<=MNth)==1,$$

where EM(x,y) is the edge estimation value of the first pixel, EGth is the edge area threshold, Noise_Max_Min(x,y) is the texture estimation value of the first pixel, and MNth is the texture area threshold.

With reference to the first possible implementation manner of the first aspect, in a fifth possible implementation manner of the first aspect, acquiring quantization noise of all pixels in a first block includes acquiring pixel values of all pixels in a noise estimation neighborhood, where the noise estimation neighborhood includes neighbor pixels that are centered around the first pixel and that are used to determine quantization noise of the first pixel, and the first pixel is any pixel in the first block, and calculating the quantization noise of the first pixel in the following manner:

$$\text{pixel\_noise}(x,y)=\text{sum}(abs(value_i-\text{value\_median})),$$
$$value_i \in NH(x,y),$$

where (x,y) is a pixel position of the first pixel in the current frame, pixel_noise(x,y) is the quantization noise of the first pixel, $value_i$ is the $i^{th}$ pixel value in the noise estimation neighborhood, NH(x,y) is the noise estimation neighborhood, and value_median is a middle value or an average value of the pixel values of all the pixels in NH(x,y).

With reference to the first aspect, in a sixth possible implementation manner of the first aspect, detecting, according to the quantization noise of the first section, pixel positions of all pixels in a movement estimation neighborhood in a next frame after the pixels move from pixel positions in a current frame to the next frame includes acquiring a brightness anti-noise value and a gradient anti-noise value of the first pixel according to the quantization noise of the first section to which the first pixel belongs, performing movement detection on the first pixel according to the brightness anti-noise value and the gradient anti-noise value of the first pixel and a pixel value of the first pixel at a pixel position in the current frame, to obtain a pixel position of the first pixel in the next frame, acquiring brightness anti-noise values and gradient anti-noise values of other pixels except the first pixel in the first section according to the quantization noise of the first section, and performing movement detection on the other pixels except the first pixel in the first section according to the brightness anti-noise values and the gradient anti-noise values of the other pixels except the first pixel in the first section and pixel values of the other pixels except the first pixel in the first section at pixel positions in the current frame, to obtain pixel positions of the other pixels except the first pixel in the first section in the next frame.

With reference to the sixth possible implementation manner of the first aspect, in a seventh possible implementation manner of the first aspect, performing movement detection on the first pixel according to the brightness anti-noise value and the gradient anti-noise value of the first pixel and a pixel value of the first pixel at a pixel position in the current frame, to obtain a pixel position of the first pixel in the next frame includes calculating, according to the brightness anti-noise value of the first pixel, a brightness change value when the first pixel moves from the pixel position in the current frame to the pixel position in the next frame, calculating, according to the gradient anti-noise value of the first pixel, a horizontal-direction gradient change value when the first pixel moves from the pixel position in the current frame to the pixel position in the next frame, calculating, according to the gradient anti-noise value of the first pixel, a vertical-direction gradient change value when the first pixel moves from the pixel position in the current frame to the pixel position in the next frame, calculating a pixel similarity matching value of the first pixel according to the brightness change value, the horizontal-direction gradient change value, and the vertical-direction gradient change value, and calculating a pixel position of the first pixel in the next frame when a minimum value of the pixel similarity matching value is acquired.

With reference to the seventh possible implementation manner of the first aspect, in an eighth possible implementation manner of the first aspect, calculating, according to the brightness anti-noise value of the first pixel, a brightness change value when the first pixel moves from the pixel position in the current frame to the pixel position in the next frame includes calculating, in the following manner, the brightness change value when the first pixel moves from the pixel position in the current frame to the pixel position in the next frame:

$$\Delta\text{gray}' = \begin{cases} 0, & \Delta\text{gray} - lath(noiselvl) < 0 \\ \Delta\text{gray} - lath(noiselvl), & \Delta\text{gray} - lath(noiselvl) \geq 0 \end{cases}$$

where $\Delta\text{gray}'$ is the brightness change value, $lath(noiselvl)$ is the brightness anti-noise value of the first pixel, $\Delta\text{gray}=abs(g_m(x,y)-g_{m+1}(x+i,y+j))$, $(x,y)$ is the pixel position of the first pixel in the current frame, $g_m(x,y)$ is a pixel value of the first pixel in the $m^{th}$ frame, the $m^{th}$ frame is the current frame of the first pixel, the $(m+1)^{th}$ frame is the next frame of the first pixel, and $g_{m+1}(x+i,y+j)$ is a pixel value of the first pixel in the $(m+1)^{th}$ frame. Calculating, according to the gradient anti-noise value of the first pixel, a horizontal-direction gradient change value when the first pixel moves from the pixel position in the current frame to the pixel position in the next frame includes calculating, in the following manner, the horizontal-direction gradient change value when the first pixel moves from the pixel position in the current frame to the pixel position in the next frame:

$$\Delta\text{gradh}' = \begin{cases} 0, & \Delta\text{gradh} - gath(noiselvl) < 0 \\ \Delta\text{gradh} - gath(noiselvl), & \Delta\text{gradh} - gath(noiselvl) \geq 0 \end{cases}$$

where $\Delta\text{gradh}'$ is the horizontal-direction gradient change value, $gath(noiselvl)$ is the gradient anti-noise value of the first pixel, $$\Delta\text{gradh}=abs(g_m(x+1,y)-g_m(x-1,y)-(g_{m+1}(x+i+1,y+j)-g_{m+1}(x+i-1,y+j))),$$

$g_m(x+1,y)$ is a pixel value obtained after the first pixel moves upward from the pixel value $g_m(x,y)$ in the current frame in a horizontal direction, $g_m(x-1,y)$ is a pixel value obtained after the first pixel moves downward from the pixel value $g_m(x,y)$ in the current frame in the horizontal direction, $g_{m+1}(x+i+1,y+j)$ is a pixel value obtained after the first pixel moves upward from the pixel value $g_{m+1}(x+i,y+j)$ in the next frame in the horizontal direction, and $g_{m+1}(x+i-1,y+j)$ is a pixel value obtained after the first pixel moves downward from the pixel value $g_{m+1}(x+i,y+j)$ in the next frame in the horizontal direction. Calculating, according to the gradient anti-noise value of the first pixel, a vertical-direction gradient change value when the first pixel moves from the pixel position in the current frame to the pixel position in the next frame includes calculating, in the following manner, the vertical-direction gradient change value when the first pixel moves from the pixel position in the current frame to the pixel position in the next frame:

$$\Delta\text{gradv}' = \begin{cases} 0, & \Delta\text{gradv} - gath(noiselvl) < 0 \\ \Delta\text{gradv} - gath(noiselvl), & \Delta\text{gradv} - gath(noiselvl) \geq 0 \end{cases}$$

where $\Delta\text{gradv}'$ is the vertical-direction gradient change value, $gath(noiselvl)$ is the gradient anti-noise value of the first pixel, $$\Delta\text{gradv}=abs(g_m(x,y+1)-g_m(x,y-1)-(g_{m+1}(x+i,y+j+1)-g_{m+1}(x+i,y+j-1))),$$

$g_m(x,y+i)$ is a pixel value obtained after the first pixel moves upward from the pixel value $g_m(x,y)$ in the current frame in a vertical direction, $g_m(x,y-1)$ is a pixel value obtained after the first pixel moves downward from the pixel value $g_m(x,y)$ in the current frame in the vertical direction, $g_{m+1}(x+i,y+j+1)$ is a pixel value obtained after the first pixel moves upward from the pixel value $g_{m+1}(x+i,y+j)$ in the next frame in the vertical direction, and $g_{m+1}(x+i,y+j-1)$ is a pixel value obtained after the first pixel moves downward from the pixel value $g_{m+1}(x+i,y+j)$ in the next frame in the vertical direction, and calculating a pixel similarity matching value of the first pixel according to the brightness change value, the horizontal-direction gradient change value, and the vertical-direction gradient change value includes calculating the pixel similarity matching value of the first pixel in the following manner:

$$\text{cost-volume}=\Delta\text{gray}'+\Delta\text{gradh}'+\Delta\text{gradv}'$$

where cost-volume is the pixel similarity matching value of the first pixel, $\Delta\text{gray}'$ is the brightness change value, $\Delta\text{gradh}'$ is the horizontal-direction gradient change value, and $\Delta\text{gradv}'$ is the vertical-direction gradient change value.

With reference to the sixth possible implementation manner of the first aspect, in a ninth possible implementation manner of the first aspect, after acquiring quantization noise of a first section of a noisy image, the method further includes acquiring quantization noise of all N sections of the noisy image, and comparing the quantization noise of the N sections with N preset quantization thresholds, and classifying the quantization noise of the N sections into (N+1) noise levels, and acquiring a brightness anti-noise value and a gradient anti-noise value of the first pixel according to the quantization noise of the first section to which the first pixel belongs includes extracting a noise level of the first section, acquiring the brightness anti-noise value of the first pixel according to a positive correlation relationship between the noise level and the brightness anti-noise value, and acquiring the gradient anti-noise value of the first pixel according to a positive correlation relationship between the noise level and the gradient anti-noise value.

With reference to the first aspect, in a tenth possible implementation manner of the first aspect, determining, according to a pixel position change situation of all the pixels in the movement estimation neighborhood that change from the current frame to the next frame, whether the first pixel is in a movement area or a still area includes counting pixels in the still area in the movement estimation neighborhood according to pixel positions of all the pixels in the current frame in the movement estimation neighborhood and pixel positions of all the pixels in the next frame in the movement estimation neighborhood, comparing a quantity of the pixels in the still area in the movement estimation neighborhood with a preset threshold for determining of movement/still, and if the quantity of the pixels in the still area in the movement estimation neighborhood is greater than or equal to the preset threshold for determining of movement/still, determining that the first pixel is in the still area, and if the quantity of the pixels in the still area in the movement estimation neighborhood is less than the preset threshold for determining of movement/still, determining that the first pixel is in a movement area.

With reference to the first aspect, in an eleventh possible implementation manner of the first aspect, selecting a first blending coefficient according to a first frame difference of the first pixel and a preset first frame difference threshold includes determining whether the first frame difference of the first pixel is less than the preset first frame difference threshold, and if the first frame difference of the first pixel is less than or equal to the first frame difference threshold, selecting the first blending coefficient according to the quantization noise of the first section to which the first pixel belongs, and if the first frame difference of the first pixel is greater than the first frame difference threshold, selecting a first frame difference weight coefficient according to the quantization noise of the first section to which the first pixel belongs, and selecting the first blending coefficient according to the first frame difference threshold, the first frame difference of the first pixel, and the first frame difference weight coefficient.

With reference to the first aspect, in a twelfth possible implementation manner of the first aspect, calculating a first noise reduction pixel value corresponding to the first pixel according to the first blending coefficient, a pixel value of the first pixel in the current frame, and a movement compensation pixel value of the first pixel in a previous frame includes calculating the first noise reduction pixel value corresponding to the first pixel in the following manner:

$$TNR\ Output(T)_{\_fir} = TNR\ Output_{\_mc}(T-1) \times alpha_{\_fir} + Frame\ Input(T) \times (1-alpha_{\_fir})$$

where $TNR\ Output(T)_{\_fir}$ is the first noise reduction pixel value corresponding to the first pixel, $TNR\ Output_{\_mc}(T-1)$ is the pixel value of the corresponding position of the first pixel in the current frame and is obtained after movement estimation and movement compensation are performed based on the noise reduction pixel of the first pixel in the previous frame, $alpha_{\_fir}$ is the first blending coefficient, and $Frame\ Input(T)$ is the pixel value of the first pixel in the current frame.

With reference to the first aspect, in a thirteenth possible implementation manner of the first aspect, calculating a second noise reduction pixel value corresponding to the first pixel according to the second blending coefficient, the pixel value of the first pixel in the current frame, and a noise reduction pixel value of the first pixel in the previous frame includes calculating the second noise reduction pixel value corresponding to the first pixel in the following manner $$TNR\ Output(T)_{\_sec} = TNR\ Output(T-1) \times alpha_{\_sec} + Frame\ Input(T) \times (1-alpha_{\_sec})$$

where $TNR\ Output(T)_{\_sec}$ is the second noise reduction pixel value corresponding to the first pixel, $TNR\ Output(T-1)$ is the pixel value of the corresponding position of the noise reduction pixel of the first pixel in the previous frame, $alpha_{\_sec}$ is the second blending coefficient, and $Frame\ Input(T)$ is the pixel value of the first pixel in the current frame.

According to a second aspect, an embodiment of the present disclosure further provides a TNR apparatus for a noisy image, including a noise acquiring module configured to acquire quantization noise of a first section of a noisy image, where the first section is any one of multiple sections divided from the noisy image, a movement estimating module configured to detect, according to the quantization noise of the first section, pixel positions of all pixels in a movement estimation neighborhood in a next frame after the pixels move from pixel positions in a current frame to the next frame, where the movement estimation neighborhood includes neighbor pixels centered around a first pixel, and the first pixel is any pixel in the first section, and a movement/still determining module configured to determine, according to a pixel position change situation of all the pixels in the movement estimation neighborhood that change from the current frame to the next frame, whether the first pixel is in a movement area or a still area, and if the first pixel is in the movement area, trigger execution of a first blending coefficient selecting module and a first TNR module, or if the first pixel is in the still area, trigger execution of a second blending coefficient selecting module and a second TNR module, where the first blending coefficient selecting module is configured to, when the first pixel is in a movement area, select a first blending coefficient according to a first frame difference of the first pixel and a preset first frame difference threshold, where the first frame difference is a difference between a pixel value of the first pixel in the current frame and a movement compensation pixel value of the first pixel in the previous frame. The first TNR module is configured to calculate a first noise reduction pixel value corresponding to the first pixel according to the first blending coefficient, the pixel value of the first pixel in the current frame, and the movement compensation pixel value of the first pixel in the previous frame, where the movement compensation pixel value is a pixel value of a corresponding position of the first pixel in the current frame and is obtained after movement estimation and movement compensation are performed based on a noise reduction pixel of the first pixel in the previous frame. The second blending coefficient selecting module is configured to, when the first pixel is in a still area, select a second blending coefficient according to a second frame difference of the first pixel and a preset second frame difference threshold, where the second frame difference is a difference between the pixel value of the first pixel in the current frame and a noise reduction pixel value of the first pixel in the previous frame, and the second frame difference threshold is greater than the first frame difference threshold, and the second TNR module is configured to calculate a second noise reduction pixel value corresponding to the first pixel according to the second blending coefficient, the pixel value of the first pixel in the current frame, and the noise reduction pixel value of the first pixel in the previous frame, where the noise reduction pixel value is a pixel value of a corresponding position of the noise reduction pixel of the first pixel in the previous frame.

With reference to the first aspect, in a first possible implementation manner of the first aspect, the noise acquiring module includes a block dividing submodule configured to divide the first section into multiple blocks, where each block includes multiple pixels, a quantization noise acquiring submodule configured to acquire quantization noise of all pixels in a first block, and acquire quantization noise of the first block according to the quantization noise of all the pixels in the first block, where the first block is any block in the first section, and separately acquire quantization noise of all the blocks except the first block in the first section, and a section noise acquiring submodule configured to calculate average quantization noise based on the quantization noise of all the blocks in the first section, and use the average quantization noise as the quantization noise of the first section, or, accumulate the quantization noise of all the blocks one by one in the first section, and use quantization noise that is greater than a preset noise threshold in a cumulative histogram as the quantization noise of the first section.

With reference to the first possible implementation manner of the first aspect, in a second possible implementation manner of the first aspect, the quantization noise acquiring submodule includes an area determining unit configured to determine whether each pixel in the first block is in a flat area, a flat area quantization value acquiring unit configured to acquire quantization noise of all pixels in the first block that are in the flat area, and a block quantization value acquiring unit configured to calculate the quantization noise of the first block according to the quantization noise of all the pixels in the first block that are in the flat area.

With reference to the second possible implementation manner of the first aspect, in a third possible implementation manner of the first aspect, the area determining unit includes a pixel value acquiring subunit configured to acquire pixel values of all pixels in a noise estimation neighborhood, where the noise estimation neighborhood includes neighbor pixels that are centered around the first pixel and that are used to determine quantization noise of the first pixel, and the first pixel is any pixel in the first block, an edge estimating subunit configured to calculate an edge estimation value of the first pixel according to the pixel values and Sobel edge convolution kernels of all the pixels in the noise estimation neighborhood, an edge area determining subunit configured to determine whether the edge estimation value of the first pixel is greater than an edge area threshold, and if the edge estimation value of the first pixel is greater than the edge area threshold, determine that the first pixel is in an edge area, or, if the edge estimation value of the first pixel is less than or equal to the edge area threshold, determine that the first pixel is not in the edge area, a texture estimating subunit configured to calculate a texture estimation value of the first pixel according to the pixel values of all the pixels in the noise estimation neighborhood, a texture area determining subunit configured to determine whether the texture estimation value of the first pixel is greater than a texture area threshold, and if the texture estimation value of the first pixel is greater than the texture area threshold, determine that the first pixel is in a texture area, or, if the texture estimation value of the first pixel is less than or equal to the texture area threshold, determine that the first pixel is not in the texture area, and a flat area determining subunit configured to determine that the first pixel is in the flat area if the first pixel meets both of the following conditions: the first pixel is not in the edge area and the first pixel is not in the texture area.

With reference to the third possible implementation manner of the first aspect, in a fourth possible implementation manner of the first aspect, the edge estimating subunit is further configured to calculate the edge estimation value of the first pixel in the following manner:

$$EM(x,y)=|NH(x,y)*E\_h|+|NH(x,y)*E\_v|+|NH(x,y)*E\_p45|+|NH(x,y)*E\_n45|,$$

where $(x,y)$ is a pixel position of the first pixel in the current frame, $EM(x,y)$ is the edge estimation value of the first pixel, $NH(x,y)$ is the noise estimation neighborhood, $E\_h$, $E\_v$, $E\_p45$, and $E\_n45$ are the Sobel edge convolution kernels, and $*$ is a convolution symbol. The texture estimating subunit is further configured to calculate the texture estimation value of the first pixel in the following manner:

$$\text{Noise\_Max\_Min}(x,y)=\text{Max}(abs(value_i-value\_median))-\text{Min}(abs(value_i-value\_median)),$$
$$value_i \in NH(x,y)$$

where $(x,y)$ is the pixel position of the first pixel in the current frame, $\text{Noise\_Max\_Min}(x,y)$ is the texture estimation value of the first pixel, $value_i$ is the $i^{th}$ pixel value in the noise estimation neighborhood, $NH(x,y)$ is the noise estimation neighborhood, and $value\_median$ is a middle value or an average value of the pixel values of all the pixels in $NH(x,y)$, and the flat area determining subunit is configured to determine, in the following manner, whether the first pixel meets both of the following conditions: the first pixel is not in the edge area and the first pixel is not in the texture area:

$$(EM(x,y)<=EGth)\&\&(\text{Noise\_Max\_Min}(x,y)<=MNth)==1,$$

where $EM(x,y)$ is the edge estimation value of the first pixel, $EGth$ is the edge area threshold, $\text{Noise\_Max\_Min}(x,y)$ is the texture estimation value of the first pixel, and $MNth$ is the texture area threshold.

With reference to the first possible implementation manner of the first aspect, in a fifth possible implementation manner of the first aspect, the quantization noise acquiring submodule is further configured to acquire pixel values of all pixels in a noise estimation neighborhood, where the noise estimation neighborhood includes neighbor pixels that are centered around the first pixel and that are used to determine quantization noise of the first pixel, and the first pixel is any pixel in the first block, and calculate the quantization noise of the first pixel in the following manner:

$$pixel\_noise(x,y)=\text{sum}(abs(value_i-value\_median)),$$
$$value_i \in NH(x,y)$$

where $(x,y)$ is a pixel position of the first pixel in the current frame, $pixel\_noise(x,y)$ is the quantization noise of the first pixel, $value_i$ is the $i^{th}$ pixel value in the noise estimation neighborhood, NH(x,y) is the noise estimation neighborhood, and value_median is a middle value or an average value of the pixel values of all the pixels in NH(x,y).

With reference to the first aspect, in a sixth possible implementation manner of the first aspect, the movement estimating module includes an anti-noise value acquiring submodule configured to acquire a brightness anti-noise value and a gradient anti-noise value of the first pixel according to the quantization noise of the first section to which the first pixel belongs, and a movement detecting submodule configured to perform movement detection on the first pixel according to the brightness anti-noise value and the gradient anti-noise value of the first pixel and a pixel value of the first pixel at a pixel position in the current frame, to obtain a pixel position of the first pixel in the next frame.

With reference to the sixth possible implementation manner of the first aspect, in a seventh possible implementation manner of the first aspect, the movement detecting submodule includes a brightness calculating unit configured to calculate, according to the brightness anti-noise value of the first pixel, a brightness change value when the first pixel moves from the pixel position in the current frame to the pixel position in the next frame, a horizontal gradient calculating unit configured to calculate, according to the gradient anti-noise value of the first pixel, a horizontal-direction gradient change value when the first pixel moves from the pixel position in the current frame to the pixel position in the next frame, a vertical gradient calculating unit configured to calculate, according to the gradient anti-noise value of the first pixel, a vertical-direction gradient change value when the first pixel moves from the pixel position in the current frame to the pixel position in the next frame, a similarity matching value calculating unit configured to calculate a pixel similarity matching value of the first pixel according to the brightness change value, the horizontal-direction gradient change value, and the vertical-direction gradient change value, and a pixel position calculating unit configured to calculate a pixel position of the first pixel in the next frame when a minimum value of the pixel similarity matching value is acquired.

With reference to the seventh possible implementation manner of the first aspect, in an eighth possible implementation manner of the first aspect, the brightness calculating unit is further configured to calculate, in the following manner, the brightness change value when the first pixel moves from the pixel position in the current frame to the pixel position in the next frame:

$$\Delta\text{gray}' = \begin{cases} 0, \Delta\text{gray} - lath(noiselvl) < 0 \\ \Delta\text{gray} - lath(noiselvl), \Delta\text{gray} - lath(noiselvl) \geq 0 \end{cases}$$

where $\Delta$gray' is the brightness change value, lath(noiselvl) is the brightness anti-noise value of the first pixel, $\Delta$gray=abs $(g_m(x,y)-g_{m+1}(x+i,y+j))$, (x,y) is the pixel position of the first pixel in the current frame, $g_m(x,y)$ is a pixel value of the first pixel in the $m^{th}$ frame, the $m^{th}$ frame is the current frame of the first pixel, the $(m+1)^{th}$ frame is the next frame of the first pixel, and $g_{m+1}(x+i,y+j)$ is a pixel value of the first pixel in the $(m+1)^{th}$ frame. The horizontal gradient calculating unit is further configured to calculate, in the following manner, the horizontal-direction gradient change value when the first pixel moves from the pixel position in the current frame to the pixel position in the next frame:

$$\Delta\text{gradh}' = \begin{cases} 0, \Delta\text{gradh} - gath(noiselvl) < 0 \\ \Delta\text{gradh} - gath(noiselvl), \Delta\text{gradh} - gath(noiselvl) \geq 0 \end{cases}$$

where $\Delta$gradh' is the horizontal-direction gradient change value, gath(noiselvl) is the gradient anti-noise value of the first pixel, $\Delta\text{gradh}=abs(g_m(x+1,y)-g_m(x-1,y)-(g_{m+1}(x+i+1,y+j)-g_{m+1}(x+i-1,y+j)))$ $g_m(x+1,y)$ is a pixel value obtained after the first pixel moves upward from the pixel value $g_m(x,y)$ in the current frame in a horizontal direction, $g_m(x-1,y)$ is a pixel value obtained after the first pixel moves downward from the pixel value $g_m(x,y)$ in the current frame in the horizontal direction, $g_{m+1}(x+i+1,y+j)$ is a pixel value obtained after the first pixel moves upward from the pixel value $g_{m+1}(x+i,y+j)$ in the next frame in the horizontal direction, and $g_{m+1}(x+i-1,y+j)$ is a pixel value obtained after the first pixel moves downward from the pixel value $g_{m+1}(x+i,y+j)$ in the next frame in the horizontal direction. The vertical gradient calculating unit is further configured to calculate, in the following manner, the vertical-direction gradient change value when the first pixel moves from the pixel position in the current frame to the pixel position in the next frame:

$$\Delta\text{gradv}' = \begin{cases} 0, \Delta\text{gradv} - gath(noiselvl) < 0 \\ \Delta\text{gradv} - gath(noiselvl), \Delta\text{gradv} - gath(noiselvl) \geq 0 \end{cases}$$

where $\Delta$gradv' is the vertical-direction gradient change value, gath(noiselvl) is the gradient anti-noise value of the first pixel, $\Delta\text{gradv}=abs(g_m(x,y+1)-g_m(x,y-1)-(g_{m+1}(x+i,y+j+1)-g_{m+1}(x+i,y+j-1)))$ $g_m(x,y+1)$ is a pixel value obtained after the first pixel moves upward from the pixel value $g_m(x,y)$ in the current frame in a vertical direction, $g_m(x,y-1)$ is a pixel value obtained after the first pixel moves downward from the pixel value $g_m(x,y)$ in the current frame in the vertical direction, $g_{m+1}(x+i,y+j+1)$ is a pixel value obtained after the first pixel moves upward from the pixel value $g_{m+1}(x+i,y+j)$ in the next frame in the vertical direction, and $g_{m+1}(x+i,y+j-1)$ is a pixel value obtained after the first pixel moves downward from the pixel value $g_{m+1}(x+i,y+j)$ in the next frame in the vertical direction, and the similarity matching value calculating unit is further configured to calculate the pixel similarity matching value of the first pixel in the following manner:

cost-volume=$\Delta$gray'+$\Delta$gradh'+$\Delta$gradv' where cost-volume is the pixel similarity matching value of the first pixel, $\Delta$gray' is the brightness change value, $\Delta$gradh' is the horizontal-direction gradient change value, and $\Delta$gradv' is the vertical-direction gradient change value.

With reference to the sixth possible implementation manner of the first aspect, in a ninth possible implementation manner of the first aspect, the noise acquiring module is further configured to acquire quantization noise of all N sections of the noisy image, and compare the quantization noise of the N sections with N preset quantization thresholds, and classify the quantization noise of the N sections into (N+1) noise levels, and the anti-noise value acquiring submodule is further configured to extract a noise level of the first section, acquire the brightness anti-noise value of the first pixel according to a positive correlation relationship between the noise level and the brightness anti-noise value, and acquire the gradient anti-noise value of the first pixel according to a positive correlation relationship between the noise level and the gradient anti-noise value.

With reference to the first aspect, in a tenth possible implementation manner of the first aspect, the movement/still determining module includes a counting submodule configured to count pixels in the still area in the movement estimation neighborhood according to pixel positions of all the pixels in the current frame in the movement estimation neighborhood and pixel positions of all the pixels in the next frame in the movement estimation neighborhood, a movement/still determining submodule configured to compare a quantity of the pixels in the still area in the movement estimation neighborhood with a preset threshold for determining of movement/still, a still determining submodule configured to determine that the first pixel is in the still area if the quantity of the pixels in the still area in the movement estimation neighborhood is greater than or equal to the preset threshold for determining of movement/still, and a movement determining submodule configured to determine that the first pixel is in a movement area if the quantity of the pixels in the still area in the movement estimation neighborhood is less than the preset threshold for determining of movement/still.

With reference to the first aspect, in an eleventh possible implementation manner of the first aspect, the first blending coefficient selecting module includes a first frame difference determining submodule configured to determine whether the first frame difference of the first pixel is less than the preset first frame difference threshold, a first selecting submodule configured to, if the first frame difference of the first pixel is less than or equal to the first frame difference threshold, select the first blending coefficient according to the quantization noise of the first section to which the first pixel belongs, and a second selecting submodule configured to, if the first frame difference of the first pixel is greater than the first frame difference threshold, select a first frame difference weight coefficient according to the quantization noise of the first section to which the first pixel belongs, and select the first blending coefficient according to the first frame difference threshold, the first frame difference of the first pixel, and the first frame difference weight coefficient.

With reference to the first aspect, in a twelfth possible implementation manner of the first aspect, the first TNR module is further configured to calculate the first noise reduction pixel value corresponding to the first pixel in the following manner:

$$\text{TNR Output}(T)_{fir} = \text{TNR Output}_{mc}(T-1) \times \text{alpha}_{fir} + \text{Frame Input}(T) \times (1-\text{alpha}_{fir})$$

where $\text{TNR Output}(T)_{fir}$ is the first noise reduction pixel value corresponding to the first pixel, $\text{TNR Output}_{mc}(T-1)$ is the pixel value of the corresponding position of the first pixel in the current frame and is obtained after movement estimation and movement compensation are performed based on the noise reduction pixel of the first pixel in the previous frame, $\text{alpha}_{fir}$ is the first blending coefficient, and Frame Input(T) is the pixel value of the first pixel in the current frame.

With reference to the first aspect, in a thirteenth possible implementation manner of the first aspect, the second TNR module is further configured to calculate the second noise reduction pixel value corresponding to the first pixel in the following manner $$\text{TNR Output}(T)_{sec} = \text{TNR Output}(T-1) \times \text{alpha}_{sec} + \text{Frame Input}(T) \times (1-\text{alpha}_{sec})$$

where $\text{TNR Output}(T)_{sec}$ is the second noise reduction pixel value corresponding to the first pixel, TNR Output(T−1) is the pixel value of the corresponding position of the noise reduction pixel of the first pixel in the previous frame, $\text{alpha}_{sec}$ is the second blending coefficient, and Frame Input(T) is the pixel value of the first pixel in the current frame.

It can be learned from the foregoing technical solutions that the embodiments of the present disclosure have the following advantages.

In the embodiments of the present disclosure, a noisy image is divided into multiple sections. First, quantization noise of a first section is acquired. Then, pixel positions of all pixels in a movement estimation neighborhood in a next frame after the pixels separately move from pixel positions in a current frame to the next frame are detected according to the quantization noise of the first section. Next, whether a first pixel is in a movement area or a still area is determined according to a pixel position change situation of all the pixels in the movement estimation neighborhood that change from the current frame to the next frame. Next, different frame difference thresholds applicable to a movement area and a still area are separately set according to the determining of whether the first pixel is in a movement area or a still area, and then different frame difference calculation manners and previous-frame pixel value calculation manners that are applicable to a movement area and a still area are used. Finally, different noise reduction blending manners applicable to a movement area and a still area are selected according to a blending coefficient, a pixel value of a previous frame, and a pixel value of the first pixel in the current frame, where the blending coefficient is selected according to a movement estimation result of the first pixel. In the embodiments of the present disclosure, still/movement may be determined with reference to the quantization noise of the first section to which the first pixel belongs, and therefore a probability of incorrect determining is very low. For different results of the determining of whether the first pixel is in a movement area or a still area, different frame difference thresholds applicable to a movement area and a still area are separately set, and different frame difference calculation manners are used. Different blending coefficients applicable to a movement area and a still area are selected according to the different frame difference thresholds applicable to a movement area and a still area and the frame difference calculation manners. A noise reduction blending manner is selected according to the different blending coefficients applicable to a movement area and a still area, the frame difference calculation manners, and the pixel value of the first pixel in the current frame. In this way, noise reduction processing can be implemented according to whether the noisy image is in a movement area or a still area, and a probability of detection error is very low. Therefore, the technical solutions in these embodiments of the prevent disclosure can be applied to multiple noise scenarios.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and persons skilled in the art may still derive other drawings from these accompanying drawings.

FIG. 9 is a schematic diagram of dividing a noisy image into sections according to an embodiment of the present disclosure;

FIG. 10 is a schematic diagram of values of Sobel edge convolution kernels according to an embodiment of the present disclosure;

FIG. 11A is a cumulative histogram of quantization noise values of sections of a noisy image according to an embodiment of the present disclosure;

DESCRIPTION OF EMBODIMENTS

Figure 1:
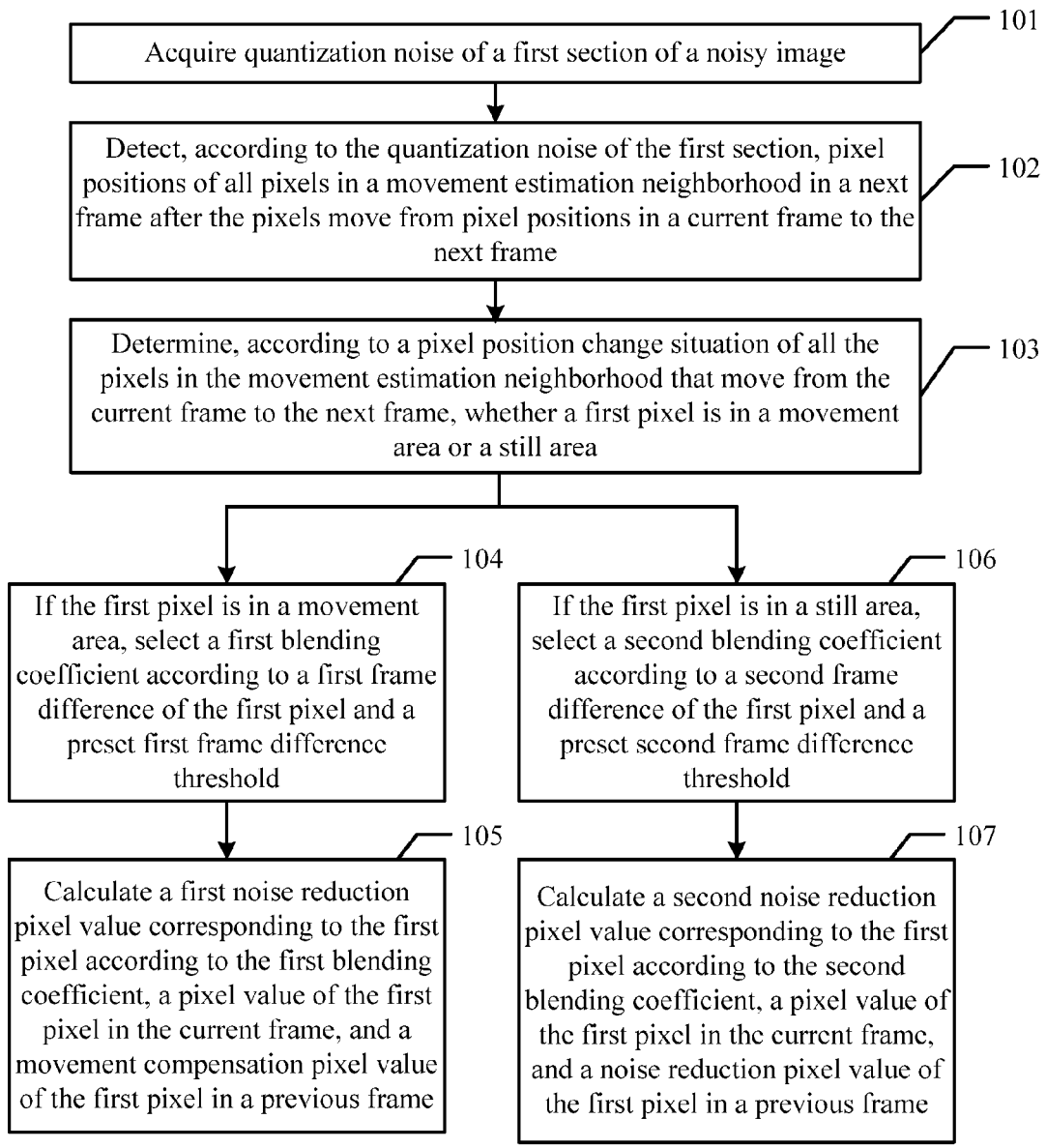
FIG. 1 is a schematic block diagram of a process of a TNR method for a noisy image according to an embodiment of the present disclosure.

Embodiments of the present disclosure provide a TNR method for a noisy image and a related apparatus, which are used to perform noise reduction processing on the noisy image with a low probability of detection error, and can be applied to multiple noise scenarios.

To make the disclosure objectives, features, and advantages of the present disclosure clearer and more comprehensible, the following clearly describes the technical solutions in the embodiments of the present disclosure with reference to the accompanying drawings in the embodiments of the present disclosure. The embodiments described in the following are merely a part rather than all of the embodiments of the present disclosure. All other embodiments obtained by persons skilled in the art based on the embodiments of the present disclosure shall fall within the protection scope of the present disclosure.

In the specification, claims, and accompanying drawings of the present disclosure, the terms "first", "second", and so on are intended to distinguish between similar objects but do not necessarily indicate a specific order or sequence. It should be understood that the terms so used are interchangeable under appropriate circumstances, and this is only a manner of distinguishing between objects with same properties in the embodiments of the present disclosure. Moreover, the terms "include", "contain" and any other variants mean to cover the non-exclusive inclusion such that a process, method, system, product, or device that includes a list of units is not necessarily limited to those units, but may include other units not expressly listed or inherent to such a process, method, system, product, or device.

The following separately provides detailed descriptions.

In an embodiment of the present disclosure, a TNR method for a noisy image of a mobile device may include acquiring quantization noise of a first section of a noisy image, where the first section is any one of multiple sections divided from the noisy image, detecting, according to the quantization noise of the first section, pixel positions of all pixels in a movement estimation neighborhood in a next frame after the pixels move from pixel positions in a current frame to the next frame, where the movement estimation neighborhood includes neighbor pixels centered around a first pixel, and the first pixel is any pixel in the first section, determining, according to a pixel position change situation of all the pixels in the movement estimation neighborhood that change from the current frame to the next frame, whether the first pixel is in a movement area or a still area. If the first pixel is in the movement area, selecting a first blending coefficient according to a first frame difference of the first pixel and a preset first frame difference threshold, and then calculating a first noise reduction pixel value corresponding to the first pixel according to the first blending coefficient, a pixel value of the first pixel in the current frame, and a movement compensation pixel value of the first pixel in a previous frame, where the first frame difference is a difference between the pixel value of the first pixel in the current frame and the movement compensation pixel value of the first pixel in the previous frame, and the movement compensation pixel value is a pixel value of a corresponding position of the first pixel in the current frame and is obtained after movement estimation and movement compensation are performed based on a noise reduction pixel of the first pixel in the previous frame, and if the first pixel is in the still area, selecting a second blending coefficient according to a second frame difference of the first pixel and a preset second frame difference threshold, and then calculating a second noise reduction pixel value corresponding to the first pixel according to the second blending coefficient, the pixel value of the first pixel in the current frame, and a noise reduction pixel value of the first pixel in the previous frame, where the second frame difference threshold is greater than the first frame difference threshold, the second frame difference is a difference between the pixel value of the first pixel in the current frame and the noise reduction pixel value of the first pixel in the previous frame, and the noise reduction pixel value is a pixel value of a corresponding position of the noise reduction pixel of the first pixel in the previous frame.

Referring to FIG. 1, a TNR method for a noisy image according to an embodiment of the present disclosure may include the following steps.

Step 101: Acquire Quantization Noise of a First Section of a Noisy Image.

The first section is any one of multiple sections divided from the noisy image.

In this embodiment of the present disclosure, a digital image is usually affected by an imaging device, noise interference in an external environment, and the like, during processes of digitalization and transmission. Therefore, such a digital image with noise interference is referred to as a noisy image. In this embodiment of the present disclosure, a noisy image is first divided into multiple sections. For different sections of the image, noise interference caused during processes of digitization and transmission may be different, and therefore quantization noise of each section needs to be separately calculated according to different actual situations of the sections. In this embodiment of the present disclosure, a first pixel included in the first section is used as an example to describe how to perform TNR on a noisy image. Certainly, for a process of processing a pixel included in another section of the noisy image, reference may also be made to a method for processing the first pixel.

In some embodiments of the present disclosure, after a noisy image is divided into multiple sections, acquiring quantization noise of a first section of the noisy image using pixel values of pixels included in the first section may be implemented in multiple manners in an actual application. For example, acquiring quantization noise of a first section of a noisy image in step 101 may further include the following steps.

Step A1: Divide the first section into multiple blocks, where each block includes multiple pixels.

Step A2: Acquire quantization noise of all pixels in a first block, and acquire quantization noise of the first block according to the quantization noise of all the pixels in the first block, where the first block is any block in the first section, and separately acquire quantization noise of all the blocks except the first block in the first section.

Step A3: Calculate average quantization noise based on the quantization noise of all the blocks in the first section, and use the average quantization noise as the quantization noise of the first section, or accumulate the quantization noise of all the blocks one by one in the first section, and use the quantization noise that is greater than a preset noise threshold in a cumulative histogram as the quantization noise of the first section.

For step A1, the first section of the noisy image is divided into multiple blocks, and therefore all the pixels included in the first section of the noisy image are distributed among all the blocks. Step A2 describes calculation of the quantization noise of the first block included in the first section, and calculation of the quantization noise of all the blocks except the first block in the first section. After the quantization noise of all the blocks in the first section is calculated, calculating the quantization noise of the first section in step A3 can be implemented in two different manners: one manner is to acquire an average value of the quantization noise of all the blocks, and use the average value as the quantization noise of the first section, and the other manner is to accumulate the quantization noise of all the blocks one by one, create a cumulative histogram, set a noise threshold, and then use the quantization noise that is greater than the noise threshold in the cumulative histogram as the quantization noise of the first section.

In some other embodiments of the present disclosure, acquiring quantization noise of all pixels in the first block in step A2 includes acquiring pixel values of all pixels in a noise estimation neighborhood, where the noise estimation neighborhood includes neighbor pixels that are centered around the first pixel and that are used to determine quantization noise of the first pixel, and the first pixel is any pixel in the first block, and calculating the quantization noise of the first pixel in the following manner:

$$\text{pixel\_noise}(x,y) = \text{sum}(abs(\text{value}_i - \text{value\_median})),$$
$$\text{value}_i \in NH(x,y)$$

where $(x,y)^{(x,y)}$ is a pixel position of the first pixel in a current frame, pixel_noise(x,y) is the quantization noise of the first pixel, value, is the $i^{th}$ pixel value in the noise estimation neighborhood, NH(x,y) is the noise estimation neighborhood, and value_median is a middle value or an average value of the pixel values of all the pixels in NH(x,y).

In some other embodiments of the present disclosure, acquiring quantization noise of the first block according to the quantization noise of all the pixels in the first block in step A2 may further include the following steps.

Step A21: Determine whether each pixel in the first block is in a flat area.

Step A22: Acquire quantization noise of all pixels in the first block that are in the flat area.

Step A23: Calculate the quantization noise of the first block according to the quantization noise of all the pixels in the first block that are in the flat area.

In determining whether each pixel in the first block is in a flat area in step A21, all the pixels included in the first block may be classified into three types. The first type is a pixel in the flat area, the second type is a pixel in an edge area, and the third type is a pixel in a texture area. Then, in calculating the quantization noise of the first block, pixels in the texture area and pixels in the edge area may be ignored, that is, only pixels in the first block that are in the flat area are used to calculate the quantization noise of the first block. For example, in step A23, a minimum value of the quantization noise of all the pixels in the first block that are in the flat area may be acquired, and the minimum quantization noise is used as the quantization noise of the first block, or an average value of the quantization noise of all the pixels in the first block that are in the flat area may be acquired, and the average value is used as the quantization noise of the first block.

In some other embodiments of the present disclosure, determining whether each pixel in the first block is in a flat area in step A21 may further include the following steps.

Step A211: Acquire pixel values of all pixels in a noise estimation neighborhood, where the noise estimation neighborhood is neighbor pixels that are centered around the first pixel and that are used to determine quantization noise of the first pixel, and the first pixel is any pixel in the first block.

Step A212: Calculate an edge estimation value of the first pixel according to the pixel values and Sobel edge convolution kernels of all the pixels in the noise estimation neighborhood.

Step A213: Determine whether the edge estimation value of the first pixel is greater than an edge area threshold, and if the edge estimation value of the first pixel is greater than the edge area threshold, determine that the first pixel is in an edge area, or if the edge estimation value of the first pixel is less than or equal to the edge area threshold, determine that the first pixel is not in the edge area.

Step A214: Calculate a texture estimation value of the first pixel according to the pixel values of all the pixels in the noise estimation neighborhood.

Step A215: Determine whether the texture estimation value of the first pixel is greater than a texture area threshold, and if the texture estimation value of the first pixel is greater than the texture area threshold, determine that the first pixel is in a texture area, or, if the texture estimation value of the first pixel is less than or equal to the texture area threshold, determine that the first pixel is not in the texture area.

If the first pixel meets both of the following conditions: the first pixel is not in the edge area and the first pixel is not in the texture area, determining the first pixel is in the flat area.

The edge area threshold and the texture area threshold need to be set according to a specific application scenario, and a specific value of the threshold may be determined according to an actual application scenario.

Furthermore, calculating an edge estimation value of the first pixel according to the pixel values and Sobel edge convolution kernels of all the pixels in the noise estimation neighborhood in step A212 includes calculating the edge estimation value of the first pixel in the following manner:

$$EM(x,y)=|NH(x,y)*E\_h|+|NH(x,y)*E\_v|+|NH(x,y)*E\_p45|+|NH(x,y)*E\_n45|,$$

where $(x,y)$ is the pixel position of the first pixel in the current frame, $EM(x,y)$ is the edge estimation value of the first pixel, $NH(x,y)$ is the noise estimation neighborhood, $E\_h$, $E\_v$, $E\_p45$, and $E\_n45$ are the Sobel edge convolution kernels, and * is a convolution symbol.

Calculating a texture estimation value of the first pixel according to the pixel values of all the pixels in the noise estimation neighborhood in step A214 includes calculating the texture estimation value of the first pixel in the following manner $$\text{Noise\_Max\_Min}(x,y)=\text{Max}(abs(\text{value}_i-\text{value\_median}))-\text{Min}(abs(\text{value}_i-\text{value\_median})),$$
$$\text{value}_i \in NH(x,y)$$

where $(x,y)$ is the pixel position of the first pixel in the current frame, $\text{Noise\_Max\_Min}(x,y)$ is the texture estimation value of the first pixel, $\text{value}_i$ is the $i^{th}$ pixel value in the noise estimation neighborhood, $NH(x,y)$ is the noise estimation neighborhood, and value_median is a middle value or an average value of the pixel values of all the pixels in $NH(x,y)$, and determining, in the following manner, whether the first pixel meets both of the following conditions: the first pixel is not in the edge area and the first pixel is not in the texture area:

$$(EM(x,y)<=EGth)\&\&(\text{Noise\_Max\_Min}(x,y)<=MNth)==1$$

where $EM(x,y)$ is the edge estimation value of the first pixel, $EGth$ is the edge area threshold, $\text{Noise\_Max\_Min}(x,y)$ is the texture estimation value of the first pixel, and $MNth$ is the texture area threshold.

It should be noted that, in this embodiment of the present disclosure, after acquiring quantization noise of a first section of a noisy image in step 101, the method may further include the following steps. Acquiring quantization noise of all N sections of the noisy image, and comparing the quantization noise of the N sections with N preset quantization thresholds, and classifying the quantization noise of the N sections into (N+1) noise levels.

N is a non-zero natural number. For example, a value of N is 7, and therefore the noisy image is divided into seven sections in total. According to the foregoing method for acquiring the quantization noise of the first section, quantization noise of a second section, quantization noise of a third section, quantization noise of a fourth section, quantization noise of a fifth section, quantization noise of a sixth section, and quantization noise of a seventh section of the noisy image are separately calculated. According to seven preset quantization thresholds, the quantization noise of the seven sections may be classified into eight noise levels: Noise_level 0, Noise_level 1, Noise_level 2, Noise_level 3, Noise_level 4, Noise_level 5, Noise_level 6, and Noise_level 7.

After the quantization noise of all the sections of the noisy image is classified into different noise levels, relationships between multiple parameters of pixels and the noise levels may be set according to a known simulation result of a noisy image in a noisy environment. Further, the relationships may be presented in a graphical manner, and therefore proportional relationships between the noise levels and the parameters, such as a positive correlation relationship between a blending parameter and a noise level, a positive correlation relationship between a brightness anti-noise value and a noise level, and a positive correlation relationship between a gradient anti-noise value and a noise level, can be presented visually based on graphics.

Step 102: Detect, according to the quantization noise of the first section, pixel positions of all pixels in a movement estimation neighborhood in a next frame after the pixels move from pixel positions in a current frame to the next frame.

The movement estimation neighborhood includes neighbor pixels centered around the first pixel, and the first pixel is any pixel in the first section.

In this embodiment of the present disclosure, to determine whether the first pixel moves after the first pixel transits from the current frame to the next frame, a 1×n neighborhood centered around the first pixel may be obtained by division, and the neighborhood may be defined as a movement estimation neighborhood. The movement estimation neighborhood includes the first pixel that serves as the central pixel and neighbor pixels of the central pixel. For example, when n=5, it indicates that two pixels on the left of the first pixel, two pixels on the right of the first pixel, and the first pixel, five pixels in total, form the movement estimation neighborhood of the first pixel.

After the movement estimation neighborhood of the first pixel is obtained by division, pixel positions of the first pixel and multiple pixels in the movement estimation neighborhood in the next frame after the pixels separately move from current pixel positions to the next frame are detected according to the quantization noise of the first section in order to determine whether all the pixels in the movement estimation neighborhood are in a still area or a movement area.

In some embodiments of the present disclosure, detecting, according to the quantization noise of the first section, pixel positions of all pixels in a movement estimation neighborhood in a next frame after the pixels move from pixel positions in a current frame to the next frame in step 102 may further include the following steps.

Step B1: Acquire a brightness anti-noise value and a gradient anti-noise value of the first pixel according to the quantization noise of the first section to which the first pixel belongs.

Step B2: Perform movement detection on the first pixel according to the brightness anti-noise value and the gradient anti-noise value of the first pixel and a pixel value of the first pixel at a pixel position in the current frame, to obtain a pixel position of the first pixel in the next frame.

Step B3: Acquire brightness anti-noise values and gradient anti-noise values of other pixels except the first pixel in the first section according to the quantization noise of the first section.

Step B4: Perform movement detection on the other pixels except the first pixel in the first section according to the brightness anti-noise values and the gradient anti-noise values of the other pixels except the first pixel in the first section and pixel values of the other pixels except the first pixel in the first section at pixel positions in the current frame, to obtain pixel positions of the other pixels except the first pixel in the first section in the next frame.

It should be noted that step B1 and step B2 describe how to detect the pixel position of the first pixel in the next frame, and step B3 and step B4 describe how to detect the pixel positions of the other pixels except the first pixel in the first section in the next frame, where the detection of the pixel position of the first pixel in the next frame, and the detection of the pixel positions of the other pixels except the first pixel in the first section in the next frame may be performed simultaneously, or a pixel position of any pixel in the first section in the next frame may be first detected, or the pixel positions of all the pixels in the first section in the next frame may be detected simultaneously, which is not limited herein. Implementation manners of steps B3 and B4 are similar to those of steps B1 and B2. The following further describes steps B1 and B2 in detail.

It should be noted that, in this embodiment of the present disclosure, acquiring a brightness anti-noise value and a gradient anti-noise value of the first pixel according to the quantization noise of the first section to which the first pixel belongs in step B1 may further include extracting a noise level of the first section, acquiring the brightness anti-noise value of the first pixel according to a positive correlation relationship between the noise level and the brightness anti-noise value, and acquiring the gradient anti-noise value of the first pixel according to a positive correlation relationship between the noise level and the gradient anti-noise value.

Figure 2:
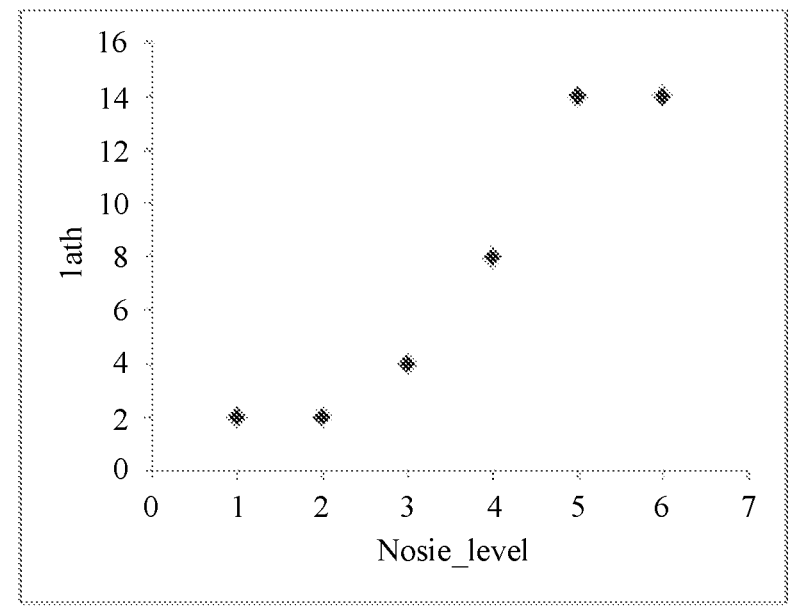
FIG. 2 is a schematic diagram of a positive correlation relationship between a noise level and a brightness anti-noise value according to this embodiment of the present disclosure.

It should be noted that when multiple noise levels are set for the values of the quantization noise of all the sections of the noisy image, a noise level of a section to which the first pixel belongs (that is, the first section) may be extracted, and then the brightness anti-noise value of the first pixel is acquired according to the positive correlation relationship between a noise level and a brightness anti-noise value, where the positive correlation relationship between a noise level and a brightness anti-noise value may further indicate a positive proportional relationship or a positive proportional trend relationship. A schematic diagram of a positive correlation relationship between the noise level and the brightness anti-noise value may be set according to a known simulation result of a noisy image in a noisy environment, or an empirical value may be obtained according to image change situations of multiple noisy images in a specific noisy environment, and then a schematic diagram of a positive correlation relationship between the noise level and the brightness anti-noise value may also be set according to the empirical value. Referring to FIG. 2, FIG. 2 is a schematic diagram of a positive correlation relationship between the noise level and the brightness anti-noise value according to this embodiment of the present disclosure. Based on this schematic diagram of the positive correlation relationship between a noise level and a brightness anti-noise value, a brightness anti-noise value can be visually acquired according to a noise level. For example, when the noise level is 3, a value corresponding to brightness anti-noise value (lath) is 4. When the noise level is 5, a value corresponding to brightness anti-noise value is 14. The positive correlation relationship between a noise level and a gradient anti-noise value may also be described in a graphical manner using an example, and details are not described herein again. The schematic diagram of the positive correlation relationship between a noise level and a brightness anti-noise value needs to be flexibly set according to a specific application scenario. The illustration given herein is intended to describe an implementation manner of the positive correlation relationship between a noise level and a brightness anti-noise value, and is not used as a specified situation for values of brightness anti-noise values in all scenarios.

In some other embodiments of the present disclosure, performing movement detection on the first pixel according to the brightness anti-noise value and the gradient anti-noise value of the first pixel and a pixel value of the first pixel at a pixel position in the current frame, to obtain a pixel position of the first pixel in the next frame in step B2 may further include the following steps.

Step B21: Calculate, according to the brightness anti-noise value of the first pixel, a brightness change value when the first pixel moves from the pixel position in the current frame to the pixel position in the next frame.

Step B22: Calculate, according to the gradient anti-noise value of the first pixel, a horizontal-direction gradient change value when the first pixel moves from the pixel position in the current frame to the pixel position in the next frame.

Step B23: Calculate, according to the gradient anti-noise value of the first pixel, a vertical-direction gradient change value when the first pixel moves from the pixel position in the current frame to the pixel position in the next frame.

Step B24: Calculate a pixel similarity matching value of the first pixel according to the brightness change value, the horizontal-direction gradient change value, and the vertical-direction gradient change value.

Step B25: Calculate a pixel position of the first pixel in the next frame when a minimum value of the pixel similarity matching value is acquired.

After the brightness change value, the horizontal-direction gradient change value, and the vertical-direction gradient change value are calculated in steps B21, B22, and B23, the pixel similarity matching value can be obtained by adding the brightness change value, the horizontal-direction gradient change value, and the vertical-direction gradient change value. Then, in step B25, when the minimum value (min) of the pixel similarity matching value is acquired, the pixel position of the first pixel in the next frame when the minimum value of the pixel similarity matching value is acquired can be calculated.

Furthermore, calculating, according to the brightness anti-noise value of the first pixel, a brightness change value when the first pixel moves from the pixel position in the current frame to the pixel position in the next frame in step B21 includes calculating, in the following manner, the brightness change value when the first pixel moves from the pixel position in the current frame to the pixel position in the next frame:

$$\Delta\text{gray}' = \begin{cases} 0, \Delta\text{gray} - lath(noiselvl) < 0 \\ \Delta\text{gray} - lath(noiselvl), \Delta\text{gray} - lath(noiselvl) \geq 0 \end{cases}$$

where $\Delta$gray' is the brightness change value, lath(noiselvl) is the brightness anti-noise value of the first pixel, $\Delta$gray=abs$(g_m(x,y)-g_{m+1}(x+i,y+j)))$, $(x,y)$ is the pixel position of the first pixel in the current frame, $g_m(x,y)$ is a pixel value of the first pixel in the $m^{th}$ frame, the $m^{th}$ frame is the current frame of the first pixel, the $(m+1)^{th}$ frame is the next frame of the first pixel, and $g_{m+1}(x+i,y+j)$ is a pixel value of the first pixel in the $(m+1)^{th}$ frame.

Calculating, according to the gradient anti-noise value of the first pixel, a horizontal-direction gradient change value when the first pixel moves from the pixel position in the current frame to the pixel position in the next frame in step B22 includes calculating, in the following manner, the horizontal-direction gradient change value when the first pixel moves from the pixel position in the current frame to the pixel position in the next frame:

$$\Delta\text{gradh}' = \begin{cases} 0, \Delta\text{gradh} - gath(noiselvl) < 0 \\ \Delta\text{gradh} - gath(noiselvl), \Delta\text{gradh} - gath(noiselvl) \geq 0 \end{cases}$$

where $\Delta$gradh' is the horizontal-direction gradient change value, gath(noiselvl) is the gradient anti-noise value of the first pixel, $\Delta\text{grad}h=abs(g_m(x+1,y)-g_m(x-1,y)-(g_{m+1}(x+i+1,y+j)-g_{m+1}(x+i-1,y+j)))$ $g_m(x+1,y)$ is a pixel value obtained after the first pixel moves upward from the pixel value $g_m(x,y)$ in the current frame in a horizontal direction, $g_m(x-1,y)$ is a pixel value obtained after the first pixel moves downward from the pixel value $g_m(x,y)$ in the current frame in the horizontal direction, $g_{m+1}(x+i+1,y+j)$ is a pixel value obtained after the first pixel moves upward from the pixel value $g_{m+1}(x+i,y+j)$ in the next frame in the horizontal direction, and $g_{m+1}(x+i-1,y+j)$ is a pixel value obtained after the first pixel moves downward from the pixel value $g_{m+1}(x+i,y+j)$ in the next frame in the horizontal direction.

Calculating, according to the gradient anti-noise value of the first pixel, a vertical-direction gradient change value when the first pixel moves from the pixel position in the current frame to the pixel position in the next frame in step B23 includes calculating, in the following manner, the vertical-direction gradient change value when the first pixel moves from the pixel position in the current frame to the pixel position in the next frame:

$$\Delta\text{gradv}' = \begin{cases} 0, \Delta\text{gradv} - gath(noiselvl) < 0 \\ \Delta\text{gradv} - gath(noiselvl), \Delta\text{gradv} - gath(noiselvl) \geq 0 \end{cases}$$

where $\Delta$gradv' is the vertical-direction gradient change value, gath(noiselvl) is the gradient anti-noise value of the first pixel, $\Delta\text{grad}v=abs(g_m(x,y+1)-g_m(x,y-1)-(g_{m+1}(x+i,y+j+1)-g_{m+1}(x+i,y+j-1)))$ where $g_m(x,y+1)$ is a pixel value obtained after the first pixel moves upward from the pixel value $g_m(x,y)$ in the current frame in a vertical direction, $g_m(x,y-1)$ is a pixel value obtained after the first pixel moves downward from the pixel value $g_m(x,y)$ in the current frame in the vertical direction, $g_{m+1}(x+i,y+j+1)$ is a pixel value obtained after the first pixel moves upward from the pixel value $g_{m+1}(x+i,y+j)$ in the next frame in the vertical direction, and $g_{m+1}(x+i,y+j-1)$ is a pixel value obtained after the first pixel moves downward from the pixel value $g_{m+1}(x+i,y+j)$ in the next frame in the vertical direction.

Calculating a pixel similarity matching value of the first pixel according to the brightness change value, the horizontal-direction gradient change value, and the vertical-direction gradient change value in step B24 includes calculating the pixel similarity matching value of the first pixel in the following manner:

cost-volume=$\Delta$gray'+$\Delta$gradh'+$\Delta$gradv' where cost-volume is the pixel similarity matching value of the first pixel, $\Delta$gray' is the brightness change value, $\Delta$gradh' is the horizontal-direction gradient change value, and $\Delta$gradv' is the vertical-direction gradient change value.

Step 103: Determine, according to a pixel position change situation of all the pixels in the movement estimation neighborhood that change from the current frame to the next frame, whether a first pixel is in a movement area or a still area. If the first pixel is in the movement area, trigger execution of step 104 and step 105, and if the first pixel is in the still area, trigger execution of step 106 and step 107.

In this embodiment of the present disclosure, after it is detected whether all the pixels in the movement estimation neighborhood move when transiting from the pixel positions in the current frame to the pixel positions in the next frame, multiple pixels in the movement estimation neighborhood are classified into pixels in the still area and pixels in the movement area. Therefore, the pixel position change situation of all the pixels in the movement estimation neighborhood that change from the current frame to the next frame indicates whether the multiple pixels in the movement estimation neighborhood move when transiting from the current frame to the next frame in order to determine whether the multiple pixels in the movement estimation neighborhood are in a still area or a movement area.

In some embodiments of the present disclosure, determining, according to a pixel position change situation of all the pixels in the movement estimation neighborhood that change from the current frame to the next frame, whether a first pixel is in a movement area or a still area in step 103 may further include the following steps.

Step C1: Count pixels in the still area in the movement estimation neighborhood according to pixel positions of all the pixels in the current frame in the movement estimation neighborhood and pixel positions of all the pixels in the next frame in the movement estimation neighborhood.

Step C2: Compare a quantity of the pixels in the still area in the movement estimation neighborhood with a preset threshold for determining of movement/still. If the quantity of the pixels in the still area in the movement estimation neighborhood is greater than or equal to the preset threshold for determining of movement/still, perform step C3, and if the quantity of the pixels in the still area in the movement estimation neighborhood is less than the preset threshold for determining of movement/still, perform step C4.

Step C3: If the quantity of the pixels in the still area in the movement estimation neighborhood is greater than or equal to the preset threshold for determining of movement/still, determine that the first pixel is in the still area.

Step C4: If the quantity of the pixels in the still area in the movement estimation neighborhood is less than the preset threshold for determining of movement/still, determine that the first pixel is in a movement area.

For the movement estimation neighborhood of the first pixel, if the quantity of the pixels in the still area in the movement estimation neighborhood is greater than or equal to the threshold for determining of movement/still, it is considered that the first pixel is also in the still area, or if the quantity of the pixels in the still area in the movement estimation neighborhood is less than the threshold for determining of movement/still, it is considered that the first pixel is in a movement area. This manner of using the movement estimation neighborhood to determine a movement/still situation of the first pixel can improve an anti-noise capability of movement estimation in an optical flow method.

It should be noted that, in this embodiment of the present disclosure, the preset threshold for determining of movement/still may be set to a fixed value, may be set to a value that is adjusted according to a size of the movement estimation neighborhood, or may be set to a value that is adjusted according to a noise level of a section to which a pixel belongs. The threshold for determining of movement/still may be further set according to an actual application scenario, and details are not described herein again.

Step 104: If the first pixel is in the movement area, select a first blending coefficient according to a first frame difference of the first pixel and a preset first frame difference threshold, and then trigger execution of step 105.

The first frame difference (FD) of the first pixel is a difference between the pixel value of the first pixel in the current frame and a movement compensation pixel value of the first pixel in the previous frame. In this embodiment of the present disclosure, according to whether the first pixel is in a movement area or a still area, different frame difference calculation manners applicable to a still area and a movement area are used.

In this embodiment of the present disclosure, after it is detected in step 102 that the first pixel moves from the pixel position in the current frame to the pixel position in the next frame, if the first pixel is in the movement area, the first frame difference of the first pixel can be calculated according to the pixel position of the first pixel in the current frame and the movement compensation pixel value of the first pixel in the previous frame.

In this embodiment of the present disclosure, two different frame difference thresholds are preset according to whether a pixel is in the still area or a movement area. For example, a first frame difference threshold is preset for a pixel in a movement area, a second frame difference threshold is preset for a pixel in the still area, and the second frame difference threshold is greater than the first frame difference threshold.

In this embodiment of the present disclosure, a blending coefficient alpha can determine a noise reduction intensity, alpha∈[0,1], a larger alpha indicates a higher noise reduction intensity, and a smaller alpha indicates a lower noise reduction intensity. When the first pixel is in a movement area, the first frame difference threshold is selected and used as a basis for selecting a blending coefficient. It is assumed that the selected blending coefficient is the first blending coefficient.

In some embodiments of the present disclosure, selecting a first blending coefficient according to a first frame difference of the first pixel and a preset first frame difference threshold in step 104 may further include the following steps.

Step D1: Determine whether the first frame difference of the first pixel is less than the preset first frame difference threshold. If the first frame difference is less than or equal to the first frame difference threshold, perform step D2, and if the first frame difference is greater than the first frame difference threshold, perform step D3.

Step D2: If the first frame difference of the first pixel is less than or equal to the first frame difference threshold, select the first blending coefficient according to the quantization noise of the first section to which the first pixel belongs.

Step D3: If the first frame difference of the first pixel is greater than the first frame difference threshold, select a first frame difference weight coefficient according to the quantization noise of the first section to which the first pixel belongs, and select the first blending coefficient according to the first frame difference threshold, the first frame difference of the first pixel, and the first frame difference weight coefficient.

Figure 3:
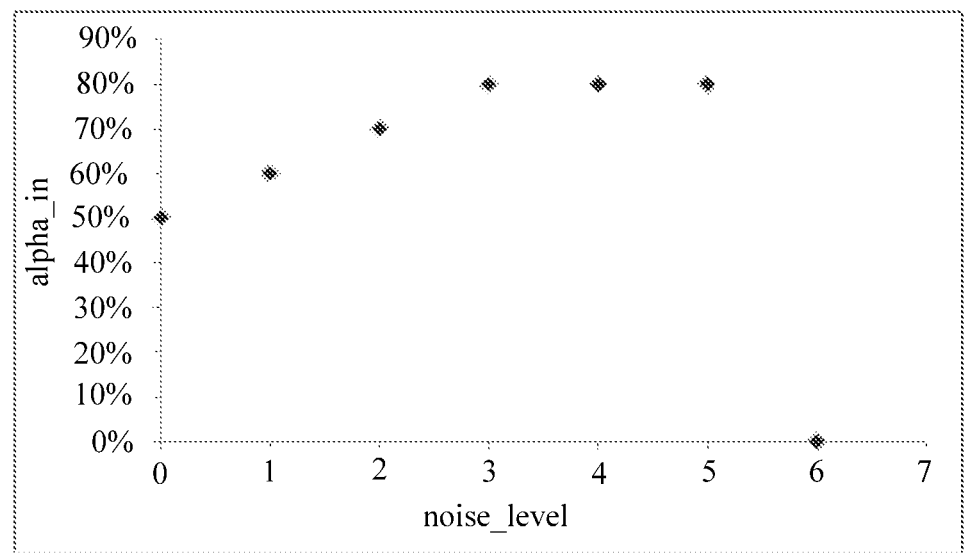
FIG. 3 is a schematic diagram of a positive correlation relationship between a noise level and a blending coefficient according to this embodiment of the present disclosure.

When the first frame difference of the first pixel is less than or equal to the first frame difference threshold, a noise level and a blending coefficient are in a positive correlation relationship. The positive correlation relationship between a noise level and a blending coefficient may be visually presented in a graphical manner. A schematic diagram of a positive correlation relationship between a noise level and a blending coefficient may be set according to a known simulation result of a noisy image in a noisy environment, or an empirical value may be obtained according to image change situations of multiple noisy images in a specific noisy environment, and then a schematic diagram of a positive correlation relationship between a noise level and a blending coefficient may also be set according to the empirical value. Referring to FIG. 3, FIG. 3 is a schematic diagram of a positive correlation relationship between a noise level and a blending coefficient according to this embodiment of the present disclosure. Based on this schematic diagram of the positive correlation relationship between a noise level and a blending coefficient, a blending coefficient can be visually acquired. In FIG. 3, noise_level indicates a noise level, and alpha_in indicates a value of the first blending coefficient. In step D1, it is assumed that the first frame difference of the first pixel is FD, and the first frame difference threshold is th1. When FD≤th1, according to the positive correlation relationship between a noise level and a blending coefficient, the first blending coefficient selected for the first pixel is alpha_in. According to different noise levels of the first section to which the first pixel belongs, the first blending coefficient may have different values.

When the first frame difference of the first pixel is greater than the first frame difference threshold, a first frame difference weight coefficient is selected according to the quantization noise of the first section to which the first pixel belongs. The first frame difference weight coefficient may also have different values according to different noise levels of a section to which a pixel belongs, and a higher noise level indicates a larger first frame difference weight coefficient. In the selecting the first blending coefficient according to the first frame difference threshold, the first frame difference of the first pixel, and the first frame difference weight coefficient in step D3, the first blending coefficient may be further acquired in the following manner.

In step D1, it is assumed that the first frame difference of the first pixel is FD, and the first frame difference threshold is th1. When FD>th1, the first frame difference weight coefficient is coff. It is assumed that a largest blending coefficient that can be selected under a current noise level is alpha_in, where alpha_in is a constant. The first blending coefficient is represented by alpha, and a physical meaning represented by coff is a change rate of values of alpha. The first blending coefficient can be calculated in the following manner:

$$\text{alpha}=\text{alpha\_in}-\text{coff}\times(FD-th1).$$

Figure 4:
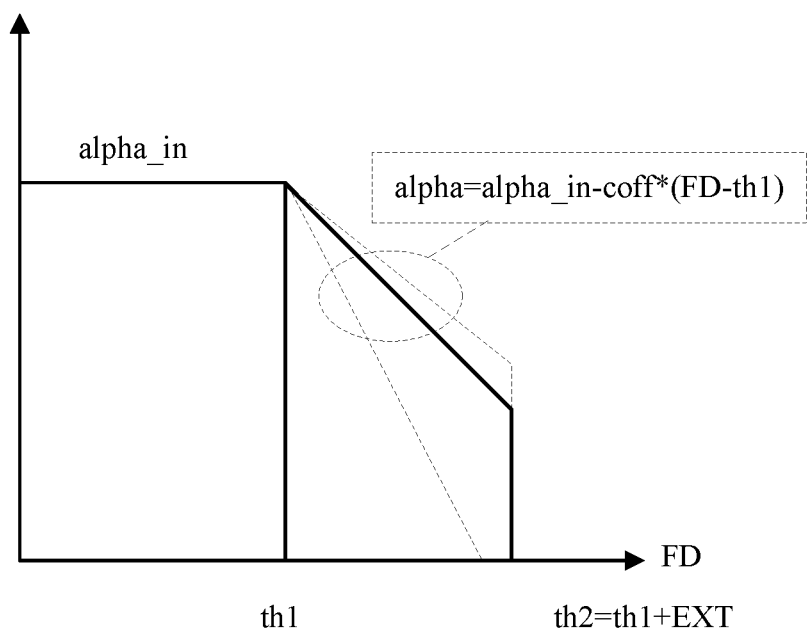
FIG. 4 is a schematic diagram of a relationship between a blending coefficient and a frame difference according to this embodiment of the present disclosure.

Referring to FIG. 4, FIG. 4 is a schematic diagram of a relationship between a blending coefficient and a first frame difference according to this embodiment of the present disclosure. FD on the horizontal axis indicates the first frame difference, and alpha on the vertical axis indicates a blending coefficient. When FD≤th1, the value of the first blending coefficient is alpha_in. When FD>th1, the first blending coefficient alpha=alpha_in−coff×(FD−th1), where coff indicates a slope of the oblique line shown in the figure. For different noise levels of the first section to which the first pixel belongs, the first frame difference weight coefficient coff may have different values. In FIG. 4, several possible values of coff are indicated using different oblique dashed lines.

It should be noted that EXT in FIG. 4 is a threshold extension, and th2=th1+EXT is satisfied. When the frame difference FD is greater than th2, noise reduction is not performed, that is, alpha=0.

Step 105: Calculate a first noise reduction pixel value corresponding to the first pixel according to the first blending coefficient, a pixel value of the first pixel in the current frame, and a movement compensation pixel value of the first pixel in a previous frame.

The movement compensation pixel value is a pixel value of a corresponding position of the first pixel in the current frame and is obtained after movement estimation and movement compensation are performed based on a noise reduction pixel of the first pixel in the previous frame.

In this embodiment of the present disclosure, if the first pixel is in the movement area, the movement compensation pixel value of the first pixel in the previous frame that is obtained through calculation is selected for blending, and the first noise reduction pixel value corresponding to the first pixel is calculated according to the selected first blending coefficient, the pixel value of the first pixel in the current frame, and the movement compensation pixel value of the first pixel in the previous frame.

Figure 5:
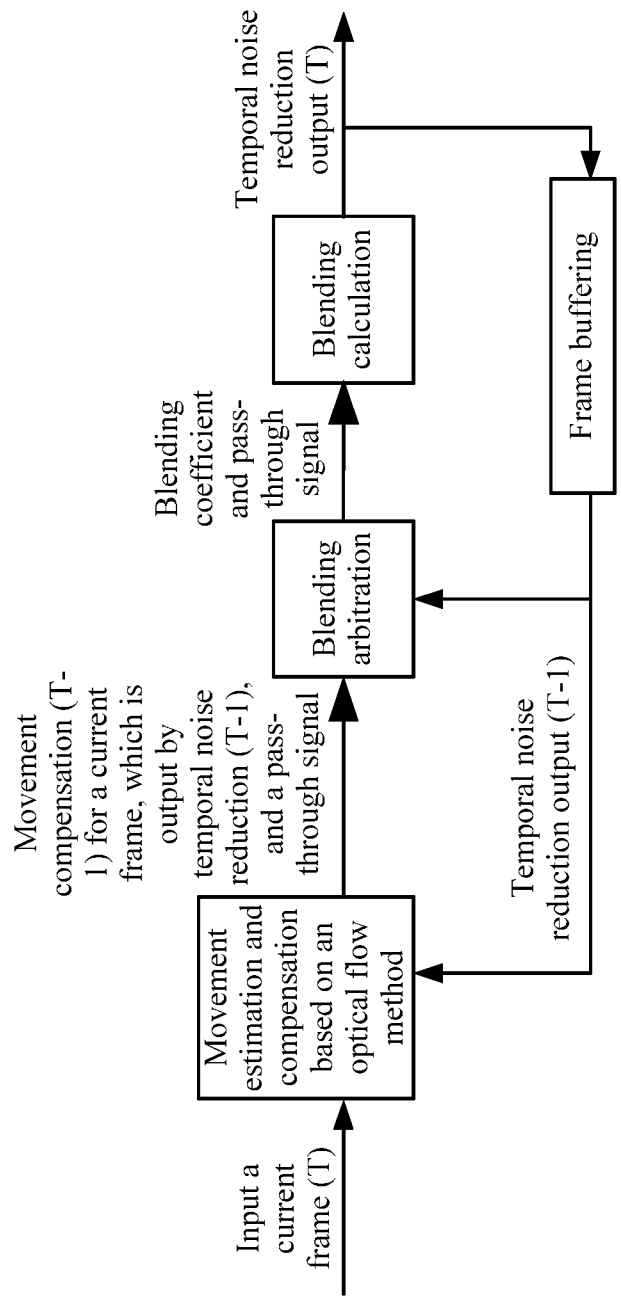
FIG. 5 is a schematic diagram of an implementation process of TNR that is based on movement estimation and compensation of an optical flow method.

It should be noted that, in some embodiments of the present disclosure, the movement compensation pixel value of the first pixel in the previous frame may be acquired using the following embodiment. Referring to FIG. 5, FIG. 5 is a schematic diagram of an implementation process of TNR that is based on matched movement estimation and compensation of an optical flow method. Movement estimation is performed using an image section as a unit. A movement-compensated frame is obtained after the movement compensation is performed on a previous frame of a noisy image according to a result of the movement estimation. Movement compensation (T−1) for a current frame, which is output by TNR (T−1), and a pass-through signal (which refers to the current frame of the input noisy image) are input. A blending coefficient is determined according to frame difference information, and then blending is performed on the current frame of the noisy image with reference to the selected blending coefficient and the movement-compensated frame in order to complete the noise reduction processing on the noisy image.

In some embodiments of the present disclosure, calculating a first noise reduction pixel value corresponding to the first pixel according to the first blending coefficient, a pixel value of the first pixel in the current frame, and a movement compensation pixel value of the first pixel in a previous frame in step 105 may further include calculating the first noise reduction pixel value corresponding to the first pixel in the following manner:

$$\text{TNR Output}(T)\_{fir}=\text{TNR Output}\_{mc}(T-1)\times\text{alpha}\_{fir}+\text{Frame Input}(T)\times(1-\text{alpha}\_{fir})$$

where TNR Output$(T)\_{fir}$ is the first noise reduction pixel value corresponding to the first pixel, TNR Output$\_{mc}(T-1)$ is the pixel value of the corresponding position of the first pixel in the current frame and is obtained after movement estimation and movement compensation are performed based on the noise reduction pixel of the first pixel in the previous frame, alpha$\_{fir}$ is the first blending coefficient, and Frame Input(T) is the pixel value of the first pixel in the current frame.

Step 106: If the first pixel is in the still area, select a second blending coefficient according to a second frame difference of the first pixel and a preset second frame difference threshold, and then trigger execution of step 107.

The second frame difference threshold is greater than the first frame difference threshold. The second frame difference is a difference between the pixel value of the first pixel in the current frame and the noise reduction pixel value of the first pixel in the previous frame.

In this embodiment of the present disclosure, two different frame difference thresholds are preset according to whether a pixel is in the still area or a movement area. For example, a first frame difference threshold is preset for a pixel in a movement area, a second frame difference threshold is preset for a pixel in the still area, and the second frame difference threshold is greater than the first frame difference threshold.

In this embodiment of the present disclosure, a blending coefficient alpha can determine a noise reduction intensity, alpha∈[0,1], a larger alpha indicates a higher noise reduction intensity, and a smaller alpha indicates a lower noise reduction intensity. When the first pixel is in the still area, the second frame difference threshold is selected and used as a basis for selecting a blending coefficient. It is assumed that the selected blending coefficient is the second blending coefficient.

In some embodiments of the present disclosure, selecting a second blending coefficient according to a second frame difference of the first pixel and a preset second frame difference threshold in step 106 may further include the following steps.

Step E1: Determine whether the second frame difference of the first pixel is less than the preset second frame difference threshold. If the second frame difference is less than or equal to the second frame difference threshold, perform step E2, and if the second frame difference is greater than the second frame difference threshold, perform step E3.

Step E2: If the second frame difference of the first pixel is less than or equal to the second frame difference threshold, select the second blending coefficient according to the quantization noise of the first section to which the first pixel belongs.

Step E3: If the second frame difference of the first pixel is greater than the second frame difference threshold, select a second frame difference weight coefficient according to the quantization noise of the first section to which the first pixel belongs, and select the second blending coefficient according to the second frame difference threshold, the second frame difference of the first pixel, and the second frame difference weight coefficient.

When the second frame difference of the first pixel is less than or equal to the second frame difference threshold, a noise level and a blending coefficient are in a positive correlation relationship. The positive correlation relationship between a noise level and a blending coefficient may be visually presented in a graphical manner. A schematic diagram of a positive correlation relationship between a noise level and a blending coefficient may be set according to a known simulation result of a noisy image in a noisy environment, or an empirical value may be obtained according to image change situations of multiple noisy images in a specific noisy environment, and then a schematic diagram of a positive correlation relationship between a noise level and a blending coefficient may also be set according to the empirical value. The schematic diagram of the positive correlation relationship between a noise level and a blending coefficient is similar to that in the foregoing FIG. 3. A difference lies in that specific values of alpha_in corresponding to noise_level is different from that shown in FIG. 3. However, the relationship between a noise level and a blending coefficient is still a positive proportional relationship or a positive proportional trend relationship.

When the second frame difference of the first pixel is greater than the second frame difference threshold, a second frame difference weight coefficient is selected according to the quantization noise of the first section to which the first pixel belongs. The second frame difference weight coefficient may also have different values according to different noise levels of a section to which a pixel belongs, and a higher noise level indicates a larger second frame difference weight coefficient. In the selecting the second blending coefficient according to the second frame difference threshold, the second frame difference of the first pixel, and the second frame difference weight coefficient in step E3, the second blending coefficient may be acquired in the following manner:

In step E1, it is assumed that the second frame difference of the first pixel is FD, and the second frame difference threshold is th1'. When FD>th1', the first frame difference weight coefficient is coff'. It is assumed that a largest blending coefficient that can be selected under a current noise level is alpha_in', where alpha_in' is a constant. The second blending coefficient is represented by alpha', and a physical meaning represented by coff' is a change rate of values of alpha'. The second blending coefficient can be calculated in the following manner:

alpha'=alpha_in'−coff'×(*FD*−*th*1').

Figure 6:
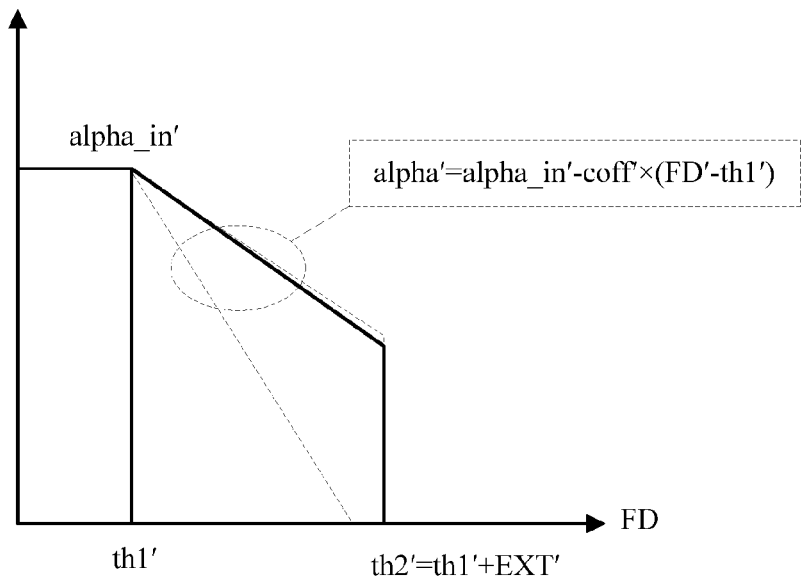
FIG. 6 is a schematic diagram of another relationship between a blending coefficient and a frame difference according to this embodiment of the present disclosure.

Referring to FIG. 6, FIG. 6 is a schematic diagram of another relationship between a blending coefficient and a frame difference according to this embodiment of the present disclosure. FD on the horizontal axis indicates the second frame difference, and alpha' on the vertical axis indicates the second blending coefficient. When FD≤th1', the value of the second blending coefficient is alpha_in'. When FD>th1', the second blending coefficient alpha'=alpha_in'−coff'×(FD−th1'), where coff' indicates a slope of the oblique line shown in the figure. For different noise levels of the first section to which the first pixel belongs, the second frame difference weight coefficient coff' may have different values. In FIG. 6, several possible values of coff' are indicated using different oblique dashed lines.

It should be noted that EXT' in FIG. 6 is a threshold extension, and th2'=th1'+EXT' is satisfied. When the frame difference FD is greater than th2', noise reduction is not performed, that is, alpha'=0. A difference between FIG. 4 and FIG. 6 lies in that the values of th1, EXT, and coff are different from the values of th1', EXT', and coff'.

It should be noted that, in this embodiment of the present disclosure, according to whether the first pixel is in a movement area or a still area, different frame difference calculation manners are used for the first pixel. When the first pixel is in a movement area, the frame difference of the first pixel is calculated in a movement estimation manner, that is, the first frame difference is the difference between the pixel value of the first pixel in the current frame and the movement compensation pixel value of the first pixel in the previous frame. When the first pixel is in the still area, the second frame difference is the difference between the pixel value of the first pixel in the current frame and the noise reduction pixel value of the first pixel in the previous frame. Because different frame difference calculation manners applicable to a movement area and a still area are used according to whether the first pixel is in a movement area or a still area, the frame difference of the first pixel can be calculated more accurately. These frame difference calculation manners can be applied to multiple noise scenarios.

Step 107: Calculate a second noise reduction pixel value corresponding to the first pixel according to the second blending coefficient, a pixel value of the first pixel in the current frame, and a noise reduction pixel value of the first pixel in a previous frame.

The noise reduction pixel value is a pixel value of a corresponding position of a noise reduction pixel of the first pixel in the previous frame.

In this embodiment of the present disclosure, if the first pixel is in the still area, the noise reduction pixel value of the first pixel in the previous frame that is obtained through calculation is selected for blending, and the second noise reduction pixel value corresponding to the first pixel is calculated according to the selected second blending coefficient, the pixel value of the first pixel in the current frame, and the noise reduction pixel value of the first pixel in the previous frame.

Figure 7:
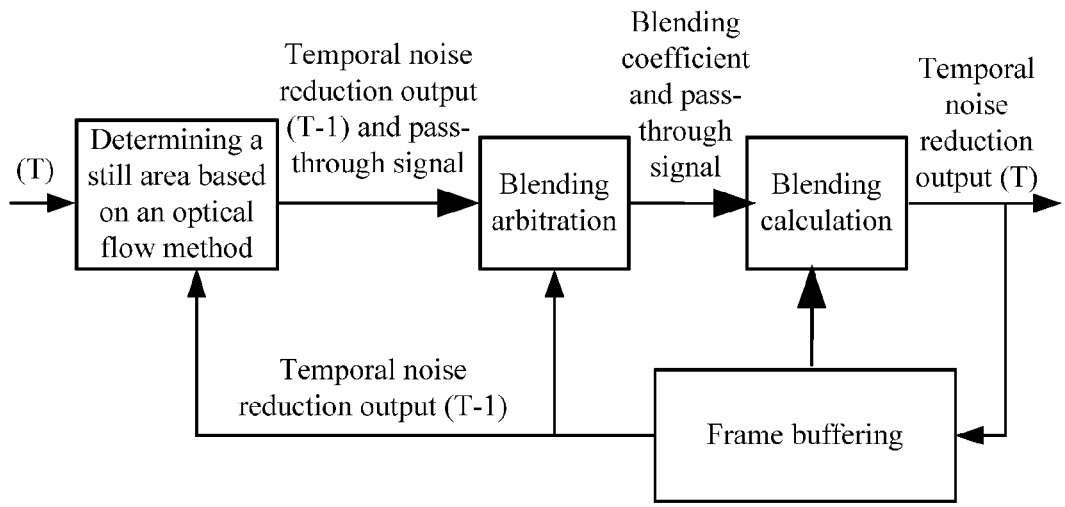
FIG. 7 is a schematic diagram of an implementation process of TNR when a still area is determined based on an optical flow method.

It should be noted that, in some embodiments of the present disclosure, the noise reduction pixel value of the first pixel in the previous frame may be acquired using the following embodiment. Referring to FIG. 7, FIG. 7 is a schematic diagram of an implementation process of TNR when a still area is determined based on an optical flow method. In the TNR when a still area is determined based on the optical flow method, (T−1) that is output by TNR, and a pass-through signal (which refers to the current frame of the input noisy image) are input, a blending coefficient is determined according to a size of a frame difference, and then blending is performed on the current frame of the noisy image with reference to the selected blending coefficient and the previous frame of the noisy image in order to complete noise reduction processing on the noisy image.

In some embodiments of the present disclosure, calculating a second noise reduction pixel value corresponding to the first pixel according to the second blending coefficient, a pixel value of the first pixel in the current frame, and a noise reduction pixel value of the first pixel in a previous frame in step 107 may further include the following step. Calculating the second noise reduction pixel value corresponding to the first pixel in the following manner:

$$\text{TNR Output}(T)_{sec} = \text{TNR Output}(T-1) \times \text{alpha}_{sec} + \text{Frame Input}(T) \times (1-\text{alpha}_{sec})$$

where TNR Output$(T)_{sec}$ is the second noise reduction pixel value corresponding to the first pixel, TNR Output(T−1) is the pixel value of the corresponding position of the noise reduction pixel of the first pixel in the previous frame, alpha$_{sec}$ is the second blending coefficient, and Frame Input(T) is the pixel value of the first pixel in the current frame.

In the embodiments of the present disclosure, a noisy image is divided into multiple sections. First, quantization noise of a first section is acquired. Then, pixel positions of all pixels in the first section in a movement estimation neighborhood in a next frame after the pixels separately move from pixel positions in a current frame to the next frame are detected according to the quantization noise of the first section. Next, whether a first pixel is in a movement area or a still area is determined according to a pixel position change situation of all the pixels in the movement estimation neighborhood that change from the current frame to the next frame. Next, different frame difference thresholds applicable to a movement area and a still area are separately set according to the determining of whether the first pixel is in a movement area or a still area, and then different frame difference calculation manners and previous-frame pixel value calculation manners that are applicable to a movement area and a still area are used. Finally, different noise reduction blending manners applicable to a movement area and a still area are selected according to a blending coefficient, a pixel value of a previous frame, and a pixel value of the first pixel in the current frame, where the blending coefficient is selected according to a movement estimation result of the first pixel. In the embodiments of the present disclosure, still/movement may be determined with reference to the quantization noise of the first section to which the first pixel belongs, and therefore a probability of incorrect determining is very low. For different results of the determining of whether the first pixel is in a movement area or a still area, different frame difference thresholds applicable to a movement area and a still area are separately set, and different frame difference calculation manners are used. Different blending coefficients applicable to a movement area and a still area are selected according to the different frame difference thresholds applicable to a movement area and a still area and the frame difference calculation manners. A noise reduction blending manner is selected according to the different blending coefficients applicable to a movement area and a still area, the frame difference calculation manners, and the pixel value of the first pixel in the current frame. In this way, noise reduction processing can be implemented according to whether the noisy image is in a movement area or a still area, and a probability of detection error is very low. Therefore, the technical solutions in these embodiments of the prevent disclosure can be applied to multiple noise scenarios.

For a better understanding and implementation of the foregoing solutions in the embodiments of the present disclosure, specific descriptions are provided below using corresponding application scenarios as examples.

Figure 8:
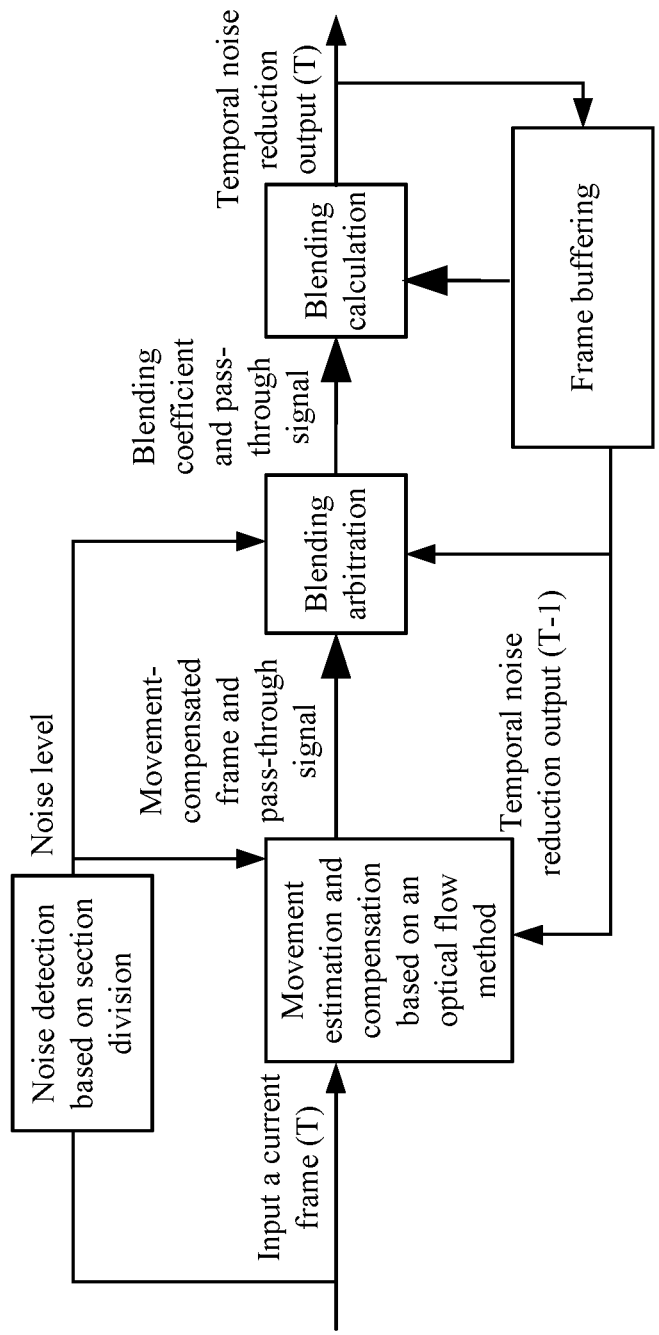
FIG. 8 is a schematic diagram of an overall process of a TNR method for a noisy image according to an embodiment of the present disclosure.

The TNR method for a noisy image that is provided in the embodiments of the present disclosure is a TNR method that is based on movement estimation and compensation of an optical flow method of noise detection. This method is mainly based on a noise rating idea of noise detection. In this method, an anti-noise capability based on movement estimation and compensation of the optical flow method is improved by means of noise rating, and blending noise reduction is performed in a self-adaptive manner according to noise rating and frame difference information. Referring to FIG. 8, FIG. 8 is a schematic diagram of an overall process of a TNR method for a noisy image according to an embodiment of the present disclosure. The main implementation idea includes the following four main parts.

(1) dividing an image into sections, and rating quantization noise of the sections that is obtained through noise detection.

(2) implementing an anti-noise mechanism that is based on movement estimation and compensation of the optical flow method using noise level information of a section in which a determined pixel is located.

(3) selecting a noise reduction blending manner using movement estimation information and frame difference information.

(4) adjusting a blending coefficient using noise information and the frame difference information.

The following describes each part using examples.

(1) Performing Noise Detection on a Noisy Image.

Referring to FIG. 9, FIG. 9 is a schematic diagram of dividing a noisy image into sections according to an embodiment of the present disclosure. First, the noisy image is divided into multiple sections. The noisy image is divided into n×m sections as indicated by an arrow from right to left. In the example in the figure, the noisy image is divided into 2×2=4 sections. As shown in FIG. 9, a current frame of the noisy image is divided into four sections, a first section, a second section, a third section, and a fourth section. Then, each section is further divided into multiple blocks, where each block is also referred to as a dot matrix. That is, each section includes many dot matrices of a selected size (for example, 5×5), which are referred to as blocks. For each pixel in a block, for example, for a first pixel in the first section, quantization of noise values is performed using pixel values of multiple pixels in a noise estimation neighborhood of the first pixel. The noise estimation neighborhood includes one 3×3 dot matrix. The noise estimation neighborhood may be represented by NH9(x,y).

Quantization noise of the first pixel is calculated in the following manner:

$$\text{pixel\_noise}(x,y) = \text{sum}(abs(\text{value}_i - \text{value\_median})),$$
$$\text{value}_i \in NH(x,y),$$

where (x,y) is a pixel position of the first pixel in the current frame, pixel_noise(x,y) is the quantization noise of the first pixel, value$_i$ is the $i^{th}$ pixel value in the noise estimation neighborhood, NH(x,y) is the noise estimation neighborhood, and value_median is a middle value or an average value of pixel values of all pixels in NH(x,y).

It should be noted that, when NH(x,y) is further a 3×3 neighborhood, the neighborhood may be represented by NH9(x,y), value$_i$ may further indicate a pixel brightness value in NH9(x,y). In addition, value_median indicates a middle brightness value that is obtained by sequencing the brightness values of the nine pixels in the 3×3 dot matrix with a total quantity of nine pixels, or a brightness value that is obtained by averaging the brightness values of the nine pixels.

Next, it is determined whether the first pixel in a first block is in a flat area.

First, it is checked whether the first pixel is in an edge area.

An edge estimation value of the first pixel is calculated in the following manner:

$$EM(x,y)=|NH(x,y)*E\_h|+|NH(x,y)*E\_v|+|NH(x,y)*E\_p45|+|NH(x,y)*E\_n45|,$$

where (x,y) is the pixel position of the first pixel in the current frame, EM(x,y) is the edge estimation value of the first pixel, NH(x,y) is the noise estimation neighborhood, E_h, E_v, E_p45, and E_n45 are Sobel edge convolution kernels, and * is a convolution symbol.

E_h, E_v, E_p45, and E_n45 are values of the Sobel edge convolution kernels. Reference may be made to a schematic diagram of the values of the Sobel edge convolution kernels shown in FIG. 10.

An edge area threshold EGth is set. If EM(x,y) is greater than the edge area threshold, it is determined that the first pixel is in an edge area. If EM(x,y) is less than or equal to the edge area threshold, it is determined that the first pixel is not in the edge area.

Next, it is checked whether the first pixel is in a texture area.

A texture estimation value of the first pixel is calculated in the following manner:

$$\text{Noise\_Max\_Min}(x,y)=\text{Max}(abs(\text{value}_i-\text{value\_median}))-\text{Min}(abs(\text{value}_i-\text{value\_median})),$$
$$\text{value}_i \in NH(x,y),$$

where (x,y) is the pixel position of the first pixel in the current frame, Noise_Max_Min(x,y) is the texture estimation value of the first pixel, value, is the $i^{th}$ pixel value in the noise estimation neighborhood, NH(x,y) is the noise estimation neighborhood, and value_median is the middle value or the average value of the pixel values of all the pixels in NH(x,y).

A texture area threshold MNth is set. If Noise_Max_Min (x,y) is greater than the texture area threshold, it is determined that the first pixel is in a texture area. If Noise_Max_Min(x,y) is less than or equal to the texture area threshold, it is determined that the first pixel is not in the texture area.

A flat area requires that the determined first pixel be not in the edge area or a texture area. That is, it may be determined, in the following manner, whether the first pixel meets both of the following conditions: the first pixel is not in the edge area and the first pixel is not in the texture area:

$$(EM(x,y)<=EGth)\&\&(\text{Noise\_Max\_Min}(x,y)<=MNth)==1,$$

where EM(x,y) is the edge estimation value of the first pixel, EGth is the edge area threshold, Noise_Max_Min(x,y) is the texture estimation value of the first pixel, and MNth is the texture area threshold.

After it is determined whether the first pixel is in the flat area, an edge area, or a texture area, it is determined, in a same manner, whether other pixels of the first block to which the first pixel belongs are in a flat area, an edge area, or a texture area.

Next, quantization noise of all pixels in the first block that are in a flat area is acquired, and a value of quantization noise of the first block is a minimum value of the quantization noise of all the pixels in the first block that are in the flat area or an average value of the quantization noise of all the pixels in the flat area.

Quantization noise of all the blocks in the first section is calculated in a manner of calculating the quantization noise of the first block, and then an average noise value of all the blocks (excluding the blocks that are not in the flat area) in the first section is selected as quantization noise of the first section, or quantization noise of all the blocks in the first section is accumulated one by one, and quantization noise that is greater than a preset noise threshold in a cumulative histogram is used as quantization noise of the first section.

Figure 11B:
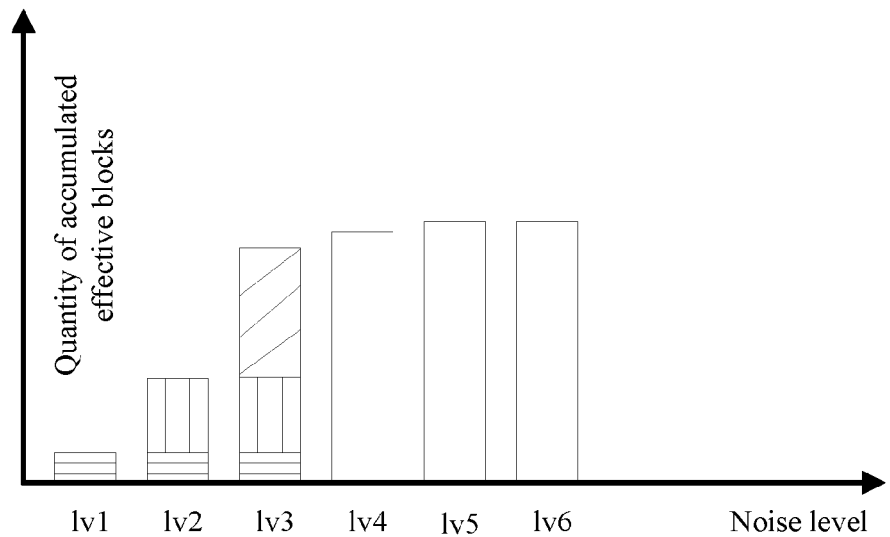
FIG. 11B is a schematic diagram illustrating a cumulative histogram.

To describe in detail calculation of the quantization noise of the first section using a cumulative histogram, refer to FIG. 11A and FIG. 11B. FIG. 11A is a cumulative histogram of quantization noise values of sections of a noisy image according to an embodiment of the present disclosure. FIG. 11B is a schematic diagram of illustration of the cumulative histogram. The cumulative histogram shows a quantity of all effective blocks whose noise levels are lower than or equal to a current noise level in a cumulative manner.

In FIG. 11A, the horizontal axis indicates noise levels, where quantization noise of the sections is classified into six levels: lv1, lv2, lv3, lv4, lv5, and lv6. The vertical axis indicates a quantity of effective blocks that are accumulated. For FIG. 11B, a bar with horizontal lines indicates a quantity of blocks at lv1. A bar with vertical lines indicates a quantity of blocks at lv2, and a bar with oblique lines indicates a quantity of blocks at lv3. The cumulative histogram is a cumulative quantity of all effective blocks whose noise levels are lower than or equal to the current noise level. It is assumed that there are six levels in total. A height of lv6 represents a quantity of all effective blocks.

A percentage threshold a is set. It is assumed that a=50%. As shown in FIG. 11B, the first i in the cumulative histogram is acquired if an area under the noise value i>total area×a, it may be considered that a noise value of the section is the noise value i. In FIG. 11B, the first noise level that meets the percentage threshold condition is lv3.

After the quantization noise of the first section is acquired, quantization noise of all N sections of the noisy image may also be acquired in a same manner. The quantization noise of the N sections is compared with N preset quantization thresholds, and the quantization noise of the N sections is classified into (N+1) noise levels.

(2) An Anti-Noise Mechanism that is Based on Movement Estimation and Compensation of the Optical Flow Method.

Figure 12:
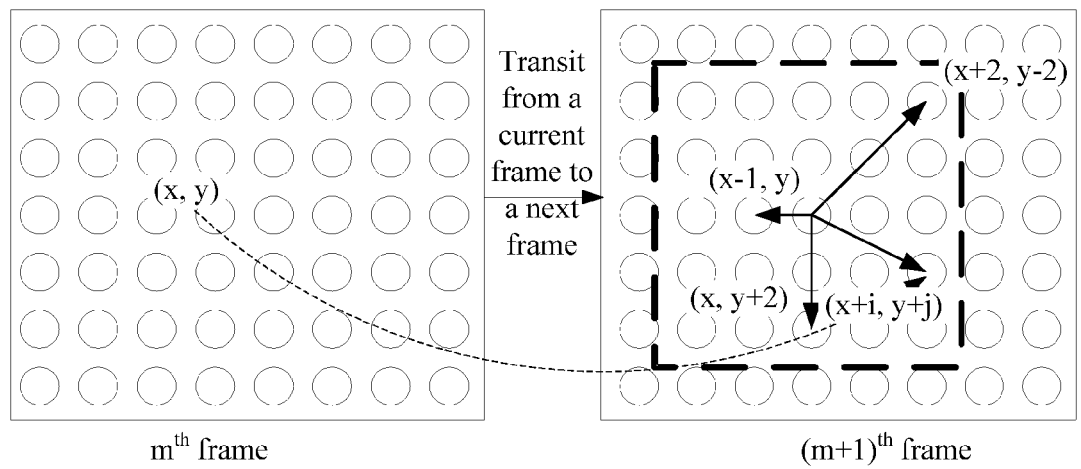
FIG. 12 is a schematic diagram of a position change when a first pixel transits from a current frame to a next frame according to an embodiment of the present disclosure.

FIG. 12 is a schematic diagram of a position change when a pixel transits from a current frame to a next frame. It is assumed that the $m^{th}$ frame of an image without noise is located at a position (x,y) shown in the left part of FIG. 12, and that the $m^{th}$ frame moves, along the direction indicated by the dashed line, from the position (x,y) to a position (x+i,y+j) of the $(m+1)^{th}$ frame that is shown in the right part of FIG. 12. A pixel similarity matching value (cost-volume) is calculated using the following formula:

$$\text{cost-volume}=\Delta\text{gray}+\Delta\text{grad}h+\Delta\text{grad}v,$$

where $$\Delta\text{gray}=abs(g_m(x,y)-g_{m+1}(x+i,y+j)),$$

$$\Delta\text{grad}h=abs(g_m(x+1,y)-g_m(x-1,y)-(g_{m+1}(x+i+1,y+j)-g_{m+1}(x+i-1,y+j))), \text{ and}$$

$$\Delta\text{grad}v=abs(g_m(x,y+1)-g_m(x,y-1)-(g_{m+1}(x+i,y+j+1)-g_{m+1}(x+i,y+j-1))).$$

It should be noted that a pixel similarity matching value in a noisy image may be affected by noise and therefore movement detection distortion is caused. Calculation of a pixel similarity matching value of a first pixel is still used as an example for description. For a method for calculating pixel similarity matching values of other pixels, reference may be made to the calculation manner for the first pixel.

(x,y) is a pixel position of the first pixel in the current frame. The following anti-noise mechanism may be used in this embodiment of the present disclosure.

The pixel similarity matching value of the first pixel is calculated in the following manner:

$$\text{cost-volume} = \Delta\text{gray}' + \Delta\text{grad}h' + \Delta\text{grad}v',$$

where a brightness change value when the first pixel moves from a pixel position in the current frame to a pixel position in the next frame is calculated in the following manner:

$$\Delta\text{gray}' = \begin{cases} 0, & \Delta\text{gray} - lath(noiselvl) < 0 \\ \Delta\text{gray} - lath(noiselvl), & \Delta\text{gray} - lath(noiselvl) \geq 0 \end{cases}$$

where $\Delta\text{gray}'$ is the brightness change value, lath(noiselvl) is a brightness anti-noise value of the first pixel, $\Delta\text{gray}=\text{abs}(g_m(x,y)-g_{m+1}(x+i,y+j))\Delta\text{gray}=\text{abs}(g_m(x,y)-g_{m+1}(x+y+j))$, (x,y) is the pixel position of the first pixel in the current frame, $g_m(x,y)$ is a pixel value of the first pixel in the $m^{th}$ frame, the $m^{th}$ frame is the current frame of the first pixel, the $(m+1)^{th}$ frame is the next frame of the first pixel, and $g_{m+1}(x+i,y+j)$ is a pixel value of the first pixel in the $(m+1)^{th}$ frame.

A horizontal-direction gradient change value when the first pixel moves from the pixel position in the current frame to the pixel position in the next frame is calculated in the following manner:

$$\Delta\text{grad}h' = \begin{cases} 0, & \Delta\text{grad}h - gath(noiselvl) < 0 \\ \Delta\text{grad}h - gath(noiselvl), & \Delta\text{grad}h - gath(noiselvl) \geq 0 \end{cases}$$

where $\Delta\text{grad}h'$ is the horizontal-direction gradient change value, and gath(noiselvl) is a gradient anti-noise value of the first pixel, $$\Delta\text{grad}h = abs(g_m(x+1,y)-g_m(x-1,y)-(g_{m+1}(x+i+1,y+j)-g_{m+1}(x+i-1,y+j))),$$

$g_m(x+1,y)$ is a pixel value obtained after the first pixel moves upward from the pixel value $g_m(x,y)$ in the current frame in a horizontal direction, $g_m(x-1,y)$ is a pixel value obtained after the first pixel moves downward from the pixel value $g_m(x,y)$ in the current frame in the horizontal direction, $g_{m+1}(x+i+1,y+j)$ is a pixel value obtained after the first pixel moves upward from the pixel value $g_{m+1}(x+i,y+j)$ in the next frame in the horizontal direction, and $g_{m+1}(x+i-1,y+j)$ is a pixel value obtained after the first pixel moves downward from the pixel value $g_{m+1}(x+i,y+j)$ in the next frame in the horizontal direction.

A vertical-direction gradient change value when the first pixel moves from the pixel position in the current frame to the pixel position in the next frame is calculated in the following manner $$\Delta\text{grad}v' = \begin{cases} 0, & \Delta\text{grad}v - gath(noiselvl) < 0 \\ \Delta\text{grad}v - gath(noiselvl), & \Delta\text{grad}v - gath(noiselvl) \geq 0 \end{cases}$$

where $\Delta\text{grad}v'$ is the vertical-direction gradient change value, and gath(noiselvl) is the gradient anti-noise value of the first pixel, $$\Delta\text{grad}v = abs(g_m(x,y+1)-g_m(x,y-1)-(x+i,y+j+1)-g_{m+1}(x+i,y+j-1))),$$

$g_m(x,y+1)$ is a pixel value obtained after the first pixel moves upward from the pixel value $g_m(x,y)$ in the current frame in a vertical direction, $g_m(x,y-1)$ is a pixel value obtained after the first pixel moves downward from the pixel value $g_m(x,y)$ in the current frame in the vertical direction, $g_{m+1}(x+i,y+j+1)$ is a pixel value obtained after the first pixel moves upward from the pixel value $g_{m+1}(x+i,y+j)$ in the next frame in the vertical direction, and $g_{m+1}(x+i,y+j-1)$ is a pixel value obtained after the first pixel moves downward from the pixel value $g_{m+1}(x+i,y+j)$ in the next frame in the vertical direction.

It should be noted that, in this embodiment of the present disclosure, after a noise level of a first section is extracted, a brightness anti-noise value lath(noiselvl) of the first pixel can be acquired according to a positive correlation relationship between the noise level and the brightness anti-noise value, and a gradient anti-noise value gath(noiselvl) of the first pixel can be acquired according to a positive correlation relationship between the noise level and the gradient anti-noise value. For the positive correlation relationship between a noise level and a brightness anti-noise value, reference may be made to the schematic diagram of the positive correlation relationship between a noise level and a brightness anti-noise value shown in FIG. 2. The positive correlation relationship between a noise level and a gradient anti-noise value may be based on a schematic diagram that is similar to FIG. 2 and that is used to describe a positive proportional relationship or a positive proportional trend relationship.

(3) Selecting a Noise Reduction Blending Manner Using Movement Estimation Information and Frame Difference Information.

Figure 13:
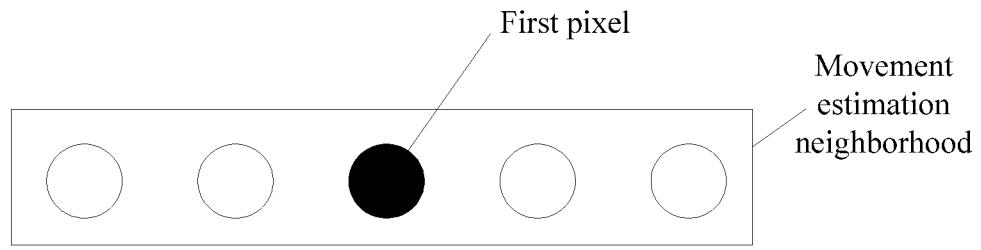
FIG. 13 is a schematic diagram of an implementation manner of a movement estimation neighborhood according to an embodiment of the present disclosure.

As shown in FIG. 13, which is a schematic diagram of an implementation manner of a movement estimation neighborhood according to an embodiment of the present disclosure, 1×n neighbor pixels centered around a determined first pixel form a movement estimation neighborhood. In FIG. 13, a movement estimation neighborhood formed by 1×5 pixels is used as an example. A quantity of pixels in the still area, that is, still_cnt, is counted. The quantity of the pixels in the still area in the movement estimation neighborhood is compared with a preset threshold for determining of movement/still, that is, still_th. If the neighborhood meets the following formula, it is considered that the determined first pixel is in the still area. If the neighborhood does not meet the following formula, it is considered that the first pixel is in a movement area.

$$\text{still\_cnt} \geq \text{still\_th},$$

In the formula still_th is a threshold for determining of movement/still for the neighborhood formed by 1×n pixels. still_th may be set to a fixed value, or adjusted according to a size of the neighborhood and a noise level. For example, when the noise level is low, still_th is set to a larger value. When the noise level is high, still_th is set to a smaller value. An objective of determining the neighborhood formed by 1×n pixels is to improve an anti-noise capability of the movement estimation of the optical flow method.

According to whether the first pixel is in a movement area or a still area, different frame difference thresholds need to be calculated separately, a corresponding blending coefficient needs to be selected, and different blending methods need to be selected to perform noise reduction processing in order to improve an anti-noise capability in this embodiment of the present disclosure.

The following describes adjustment of a frame difference threshold according to a result of determining of whether the first pixel is in a movement area or a still area.

When the first pixel is in the still area, a corresponding frame difference is interfered with by noise only. When the first pixel is in a movement area, in addition to being interfered with by noise, the corresponding frame difference is also interfered with by movement-related movement estimation and compensation. Therefore, in selecting a blending coefficient alpha, a frame difference threshold used when the first pixel is in the still area may be greater than a frame difference threshold used when the first pixel is in a movement area. If the first pixel is in the movement area, a first frame difference threshold is set. If the first pixel is in the still area, a second frame difference threshold is set. In addition, the second frame difference threshold is greater than the first frame difference threshold.

The following describes a noise reduction blending manner that is selected according to the result of the determining of whether the first pixel is in a movement area or in the still area.

Figure 14A:
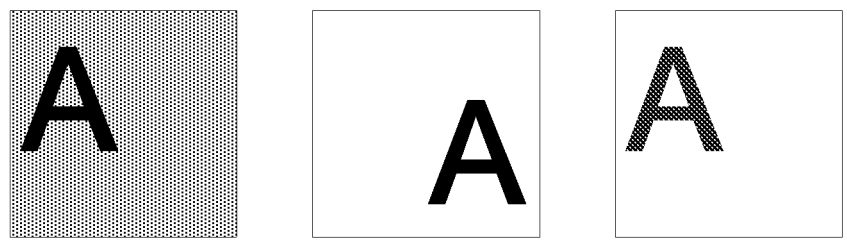
FIG. 14A is a schematic diagram of a noisy image whose first pixel is in a movement area according to an embodiment of the present disclosure.
Figure 14B:
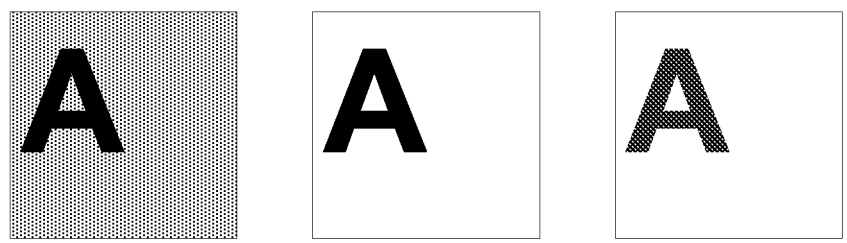
FIG. 14B is a schematic diagram of a noisy image whose first pixel is in a still area according to an embodiment of the present disclosure.

Referring to FIG. 14A and FIG. 14B, FIG. 14A is a schematic diagram of a noisy image whose first pixel is in a movement area according to an embodiment of the present disclosure, and FIG. 14B is a schematic diagram of a noisy image whose first pixel is in the still area according to an embodiment of the present disclosure. In FIG. 14A and FIG. 14B, the left part is a current frame Frame Input(T) of a noisy image. The middle part is an image TNR Output(T−1) that is obtained after TNR is performed on a previous frame. The right part is an image Frame MC(T) that is obtained after TNR and movement compensation are performed on the previous frame. For FIG. 14A, it can be considered that the first pixel is in a movement area. Therefore, noise reduction blending is performed on the current frame of the noisy image, and the previous frame of the image on which TNR and movement compensation are performed in order to obtain a first noise reduction pixel value corresponding to the first pixel. For FIG. 14B, it can be considered that the first pixel is in the still area. Therefore, noise reduction blending is performed on the current frame of the noisy image and the previous frame of the image on which TNR is performed in order to obtain a second noise reduction pixel value corresponding to the first pixel. For acquisition of the first noise reduction pixel value and the second noise reduction pixel value, reference may be made to the formulas described in the foregoing embodiments, and details are not described herein again.

(4) Adjusting a Blending Coefficient Using Noise Information and Frame Difference Information.

According to different results of determining of whether a first pixel is in a movement area or a still area, different blending coefficients are separately set with reference to noise level information and frame difference information of a pixel, and a first blending coefficient and a second blending coefficient are separately set. For a specific manner of setting a blending coefficient, reference may be made to the descriptions of steps D1, D2, and D3 or E1, E2, and E3 in the foregoing embodiments, and the first blending coefficient and the second blending coefficient can be visually acquired with reference to a schematic diagram of the positive correlation relationship between a noise level and a blending coefficient shown in FIG. 3.

It can be learned from the foregoing embodiments that a noisy image is divided into multiple sections. First, quantization noise of a first section is acquired. Then, pixel positions of all pixels in the first section in a movement estimation neighborhood in a next frame after the pixels separately move from pixel positions in a current frame to the next frame are detected according to the quantization noise of the first section. Next, whether a first pixel is in a movement area or a still area is determined according to a pixel position change situation of the pixels in the movement estimation neighborhood that change from the current frame to the next frame. Next, different frame difference thresholds applicable to a movement area and a still area are separately set according to the determining of whether the first pixel is in a movement area or a still area, and then different frame difference calculation manners and previous-frame pixel value calculation manners that are applicable to a movement area and a still area are used. Finally, different noise reduction blending manners applicable to a movement area and a still area are selected according to a blending coefficient, a pixel value of a previous frame, and a pixel value of the first pixel in the current frame, where the blending coefficient is selected according to a movement estimation result of the first pixel. In the embodiments of the present disclosure, still/movement may be determined with reference to the quantization noise of the first section to which the first pixel belongs, and therefore a probability of incorrect determining is very low. For different results of the determining of whether the first pixel is in a movement area or a still area, different frame difference thresholds applicable to a movement area and a still area are separately set, and different frame difference calculation manners are used. Different blending coefficients applicable to a movement area and a still area are selected according to the different frame difference thresholds applicable to a movement area and a still area and the frame difference calculation manners. A noise reduction blending manner is selected according to the different blending coefficients applicable to a movement area and a still area, the frame difference calculation manners, and the pixel value of the first pixel in the current frame. In this way, noise reduction processing can be implemented according to whether the noisy image is in a movement area or a still area, and a probability of detection error is very low. Therefore, the technical solutions in these embodiments of the prevent disclosure can be applied to multiple noise scenarios.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also understand that all the embodiments described in this specification belong to exemplary embodiments, and the involved actions and modules are not necessarily mandatory to the present disclosure.

For better implementation of the foregoing solutions in the embodiments of the present disclosure, the following further provides a related apparatus that is used to implement the foregoing solutions.

Figure 15A:
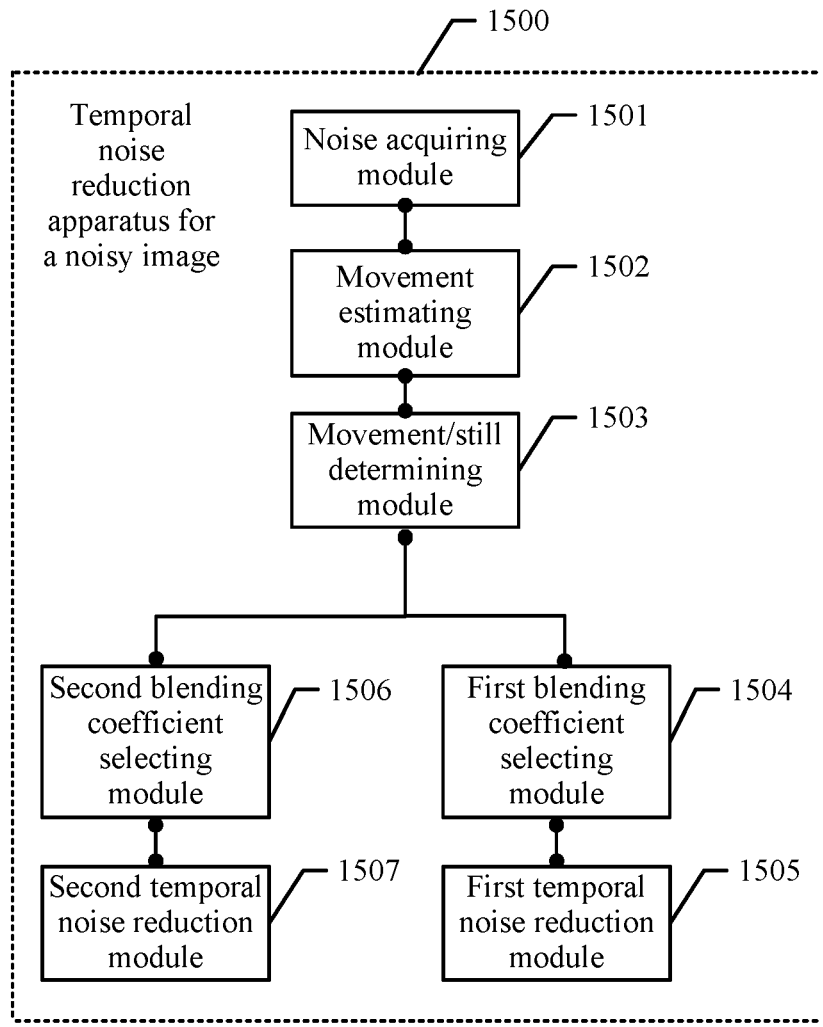
FIG. 15A is a schematic structural diagram of a TNR apparatus for a noisy image according to an embodiment of the present disclosure.

Referring to FIG. 15A, a TNR apparatus 1500 for a noisy image according to an embodiment of the present disclosure may include a noise acquiring module 1501, a movement estimating module 1502, a movement/still determining module 1503, a first blending coefficient selecting module 1504, a first TNR module 1505, a second blending coefficient selecting module 1506, and a second TNR module 1507.

The noise acquiring module 1501 is configured to acquire quantization noise of a first section of a noisy image, where the first section is any one of multiple sections divided from the noisy image.

The movement estimating module 1502 is configured to detect, according to the quantization noise of the first section, pixel positions of all pixels in a movement estimation neighborhood in a next frame after the pixels move from pixel positions in a current frame to the next frame, where the movement estimation neighborhood includes neighbor pixels centered around a first pixel, and the first pixel is any pixel in the first section.

The movement/still determining module 1503 is configured to determine, according to a pixel position change situation of all the pixels in the movement estimation neighborhood that change from the current frame to the next frame, whether the first pixel is in a movement area or a still area, and if the first pixel is in the movement area, trigger execution of the first blending coefficient selecting module 1504 and the first TNR module 1505, or if the first pixel is in the still area, trigger execution of the second blending coefficient selecting module 1506 and the second TNR module 1507.

The first blending coefficient selecting module 1504 is configured to select a first blending coefficient according to a first frame difference of the first pixel and a preset first frame difference threshold when the first pixel is in a movement area, where the first frame difference is a difference between a pixel value of the first pixel in the current frame and a movement compensation pixel value of the first pixel in the previous frame.

The first TNR module 1505 is configured to calculate a first noise reduction pixel value corresponding to the first pixel according to the first blending coefficient, the pixel value of the first pixel in the current frame, and the movement compensation pixel value of the first pixel in the previous frame, where the movement compensation pixel value is a pixel value of a corresponding position of the first pixel in the current frame and is obtained after movement estimation and movement compensation are performed based on a noise reduction pixel of the first pixel in the previous frame.

The second blending coefficient selecting module 1506 is configured to select a second blending coefficient according to a second frame difference of the first pixel and a preset second frame difference threshold when the first pixel is in the still area, where the second frame difference threshold is greater than the first frame difference threshold, and the second frame difference is a difference between the pixel value of the first pixel in the current frame and a noise reduction pixel value of the first pixel in the previous frame.

The second TNR module 1507 is configured to calculate a second noise reduction pixel value corresponding to the first pixel according to the second blending coefficient, the pixel value of the first pixel in the current frame, and the noise reduction pixel value of the first pixel in the previous frame, where the noise reduction pixel value is a pixel value of a corresponding position of the noise reduction pixel of the first pixel in the previous frame.

In some embodiments of the present disclosure, the noise acquiring module 1501 is further configured to acquire quantization noise of all N sections of the noisy image, and compare the quantization noise of the N sections with N preset quantization thresholds, and classify the quantization noise of the N sections into (N+1) noise levels.

Figure 15B:
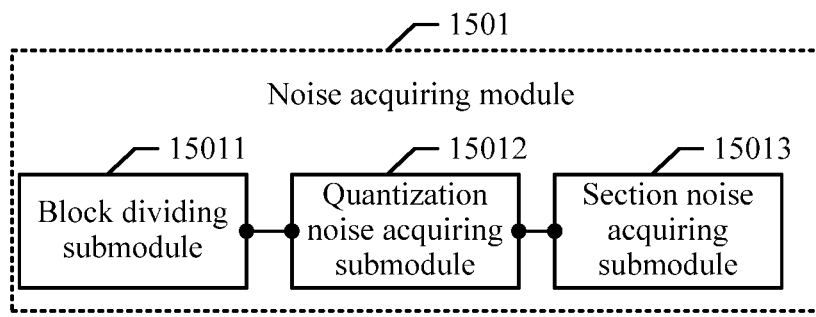
FIG. 15B is a schematic structural diagram of a noise acquiring module according to an embodiment of the present disclosure.

In some embodiments of the present disclosure, referring to FIG. 15B, the noise acquiring module 1501 includes a block dividing submodule 15011, a quantization noise acquiring submodule 15012, and a section noise acquiring submodule 15013.

The block dividing submodule 15011 is configured to divide the first section into multiple blocks, where each block includes multiple pixels.

The quantization noise acquiring submodule 15012 is configured to acquire quantization noise of all pixels in a first block, and acquire quantization noise of the first block according to the quantization noise of all the pixels in the first block, where the first block is any block in the first section, and separately acquire quantization noise of all the blocks except the first block in the first section.

The section noise acquiring submodule 15013 is configured to calculate average quantization noise based on the quantization noise of all the blocks in the first section, and use the average quantization noise as the quantization noise of the first section, or, accumulate the quantization noise of all the blocks one by one in the first section, and use quantization noise that is greater than a preset noise threshold in a cumulative histogram as the quantization noise of the first section.

The quantization noise acquiring submodule 15012 is further configured to acquire pixel values of all pixels in a noise estimation neighborhood, where the noise estimation neighborhood includes neighbor pixels that are centered around the first pixel and that are used to determine quantization noise of the first pixel, and the first pixel is any pixel in the first block, and calculate the quantization noise of the first pixel in the following manner:

$$\text{pixel\_noise}(x,y) = \text{sum}(abs(\text{value}_i - \text{value\_median})),$$
$$\text{value}_i \in NH(x,y),$$

where (x,y) is a pixel position of the first pixel in the current frame, pixel_noise(x,y) is the quantization noise of the first pixel, value$_i$ is the $i^{th}$ pixel value in the noise estimation neighborhood, NH(x,y) is the noise estimation neighborhood, and value_median is a middle value or an average value of the pixel values of all the pixels in NH(x,y).

Figure 15C:
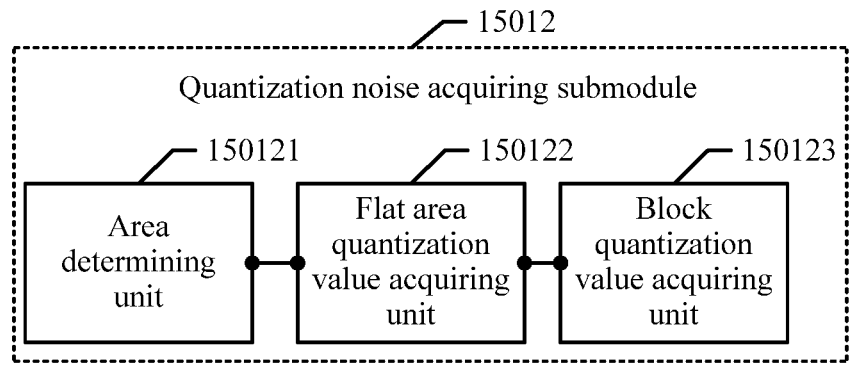
FIG. 15C is a schematic structural diagram of a quantization noise acquiring submodule according to an embodiment of the present disclosure.

In some embodiments of the present disclosure, referring to FIG. 15C, the quantization noise acquiring submodule 15012 includes an area determining unit 150121, a flat area quantization value acquiring unit 150122, and a block quantization value acquiring unit 150123.

The area determining unit 150121 is configured to determine whether each pixel in the first block is in a flat area.

The flat area quantization value acquiring unit 150122 is configured to acquire quantization noise of all pixels in the first block that are in the flat area.

The block quantization value acquiring unit 150123 is configured to calculate the quantization noise of the first block according to the quantization noise of all the pixels in the first block that are in the flat area.

Figure 15D:
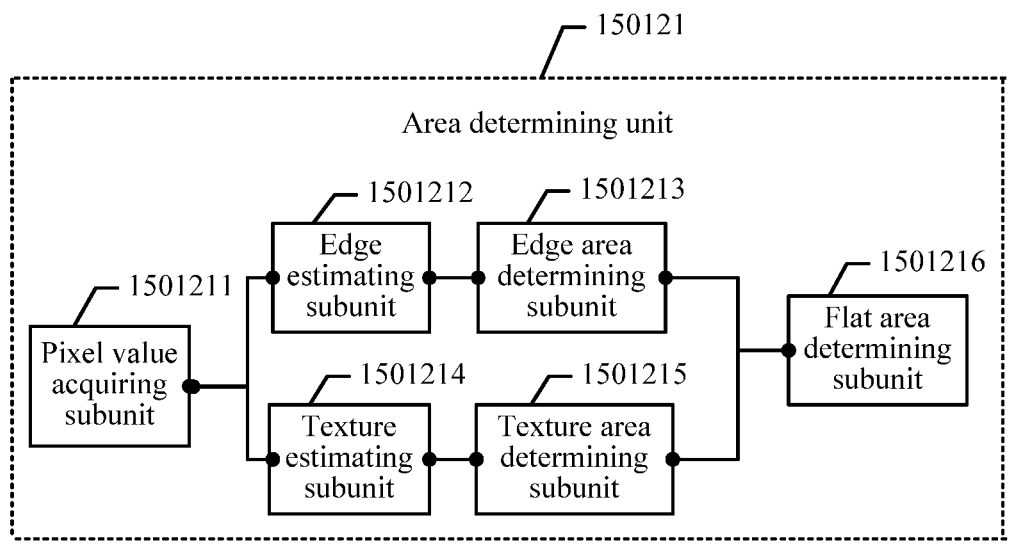
FIG. 15D is a schematic structural diagram of an area determining unit according to an embodiment of the present disclosure.

Referring to FIG. 15D, the area determining unit 150121 further includes a pixel value acquiring subunit 1501211, an edge estimating subunit 1501212, an edge area determining subunit 1501213, a texture estimating subunit 1501214, a texture area determining subunit 1501215, and a flat area determining subunit 1501216.

The pixel value acquiring subunit 1501211 is configured to acquire the pixel values of all the pixels in the noise estimation neighborhood, where the noise estimation neighborhood includes the neighbor pixels that are centered around the first pixel and that are used to determine the quantization noise of the first pixel, and the first pixel is any pixel in the first block.

The edge estimating subunit 1501212 is configured to calculate an edge estimation value of the first pixel according to the pixel values and Sobel edge convolution kernels of all the pixels in the noise estimation neighborhood.

The edge area determining subunit 1501213 is configured to determine whether the edge estimation value of the first pixel is greater than an edge area threshold, and if the edge estimation value of the first pixel is greater than the edge area threshold, determine that the first pixel is in an edge area, or if the edge estimation value of the first pixel is less than or equal to the edge area threshold, determine that the first pixel is not in the edge area.

The texture estimating subunit 1501214 is configured to calculate a texture estimation value of the first pixel according to the pixel values of all the pixels in the noise estimation neighborhood.

The texture area determining subunit 1501215 is configured to determine whether the texture estimation value of the first pixel is greater than a texture area threshold, and if the texture estimation value of the first pixel is greater than the texture area threshold, determine that the first pixel is in a texture area, or if the texture estimation value of the first pixel is less than or equal to the texture area threshold, determine that the first pixel is not in the texture area.

The flat area determining subunit 1501216 is configured to determine that the first pixel is in the flat area if the first pixel meets both of the following conditions: the first pixel is not in the edge area and the first pixel is not in the texture area.

The edge estimating subunit 1501212 is further configured to calculate the edge estimation value of the first pixel in the following manner:

$$EM(x,y)=|NH(x,y)*E\_h|+|NH(x,y)*E\_v|+|NH(x,y)*E\_p45|+|NH(x,y)*E\_n45|,$$

where (x,y) is a pixel position of the first pixel in the current frame, EM(x,y) is the edge estimation value of the first pixel, NH(x,y) is the noise estimation neighborhood, E_h, E_v, E_p45, and E_n45 are the Sobel edge convolution kernels, and * is a convolution symbol.

The texture estimating subunit 1501214 is further configured to calculate the texture estimation value of the first pixel in the following manner:

$$\text{Noise\_Max\_Min}(x,y)=\text{Max}(abs(\text{value}_i-\text{value\_median}))-\text{Min}(abs(\text{value}_i-\text{value\_median})),$$
$$\text{value}_i \in NH(x,y),$$

where (x,y) is the pixel position of the first pixel in the current frame, Noise_Max_Min(x,y) is the texture estimation value of the first pixel, value, is the $i^{th}$ pixel value in the noise estimation neighborhood, NH(x,y) is the noise estimation neighborhood, and value_median is a middle value or an average value of the pixel values of all the pixels in NH(x,y).

The flat area determining subunit 1501216 is configured to determine, in the following manner, whether the first pixel meets both of the following conditions the first pixel is not in the edge area and the first pixel is not in the texture area $$(EM(x,y)<=EGth)\&\&(\text{Noise\_Max\_Min}(x,y)<=MNth)==1,$$

where EM(x,y) is the edge estimation value of the first pixel, EGth is the edge area threshold, Noise_Max_Min(x,y) is the texture estimation value of the first pixel, and MNth is the texture area threshold.

Figure 15E:
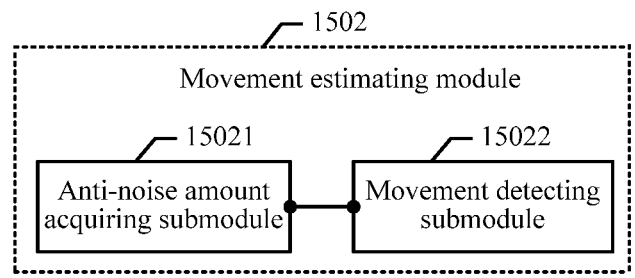
FIG. 15E is a schematic structural diagram of a movement estimating module according to an embodiment of the present disclosure.

In some embodiments of the present disclosure, referring to FIG. 15E, the movement estimating module 1502 includes an anti-noise amount acquiring submodule 15021 and a movement detecting submodule 15022.

The anti-noise amount acquiring submodule 15021 is configured to acquire a brightness anti-noise value and a gradient anti-noise value of the first pixel according to the quantization noise of the first section to which the first pixel belongs.

The movement detecting submodule 15022 is configured to perform movement detection on the first pixel according to the brightness anti-noise value and the gradient anti-noise value of the first pixel and a pixel value of the first pixel at a pixel position in the current frame, to obtain a pixel position of the first pixel in the next frame.

In some embodiments of the present disclosure, the noise acquiring module 1501 is further configured to acquire quantization noise of all N sections of the noisy image, and compare the quantization noise of the N sections with N preset quantization thresholds, and classify the quantization noise of the N sections into (N+1) noise levels. The anti-noise amount acquiring submodule 15021 is further configured to extract a noise level of the first section, acquire the brightness anti-noise value of the first pixel according to a positive correlation relationship between the noise level and the brightness anti-noise value, and acquire the gradient anti-noise value of the first pixel according to a positive correlation relationship between the noise level and the gradient anti-noise value.

Figure 15F:
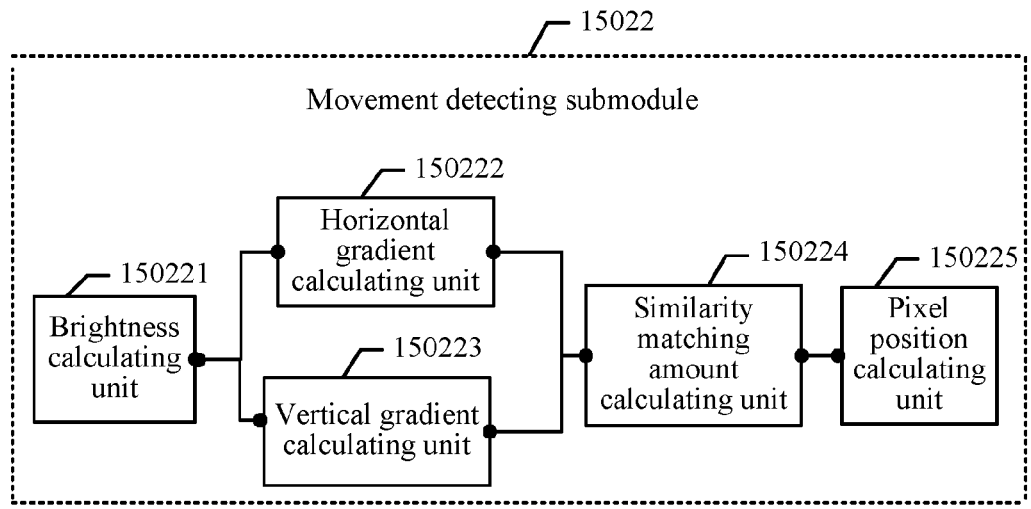
FIG. 15F is a schematic structural diagram of a movement detecting submodule according to an embodiment of the present disclosure.

In some other embodiments of the present disclosure, referring to FIG. 15F, the movement detecting submodule 15022 includes a brightness calculating unit 150221, a horizontal gradient calculating unit 150222, a vertical gradient calculating unit 150223, a similarity matching amount calculating unit 150224, and a pixel position calculating unit 150225.

The brightness calculating unit 150221 is configured to calculate, according to the brightness anti-noise value of the first pixel, a brightness change value when the first pixel moves from the pixel position in the current frame to the pixel position in the next frame.

The horizontal gradient calculating unit 150222 is configured to calculate, according to the gradient anti-noise value of the first pixel, a horizontal-direction gradient change value when the first pixel moves from the pixel position in the current frame to the pixel position in the next frame.

The vertical gradient calculating unit 150223 is configured to calculate, according to the gradient anti-noise value of the first pixel, a vertical-direction gradient change value when the first pixel moves from the pixel position in the current frame to the pixel position in the next frame.

The similarity matching amount calculating unit 150224 is configured to calculate a pixel similarity matching value of the first pixel according to the brightness change value, the horizontal-direction gradient change value, and the vertical-direction gradient change value.

The pixel position calculating unit 150225 is configured to calculate a pixel position of the first pixel in the next frame when a minimum value of the pixel similarity matching value is acquired.

The brightness calculating unit 150221 is further configured to calculate, in the following manner, the brightness change value when the first pixel moves from the pixel position in the current frame to the pixel position in the next frame:

$$\Delta \text{gray}' = \begin{cases} 0, & \Delta \text{gray} - lath(noiselvl) < 0 \\ \Delta \text{gray} - lath(noiselvl), & \Delta \text{gray} - lath(noiselvl) \geq 0 \end{cases}$$

where $\Delta$gray' is the brightness change value, $lath(noiselvl)$ is the brightness anti-noise value of the first pixel, $\Delta$gray=abs$(g_m(x,y)-g_{m+1}(x+i,y+j))$, $(x,y)$ is the pixel position of the first pixel in the current frame, $g_m(x,y)$ is a pixel value of the first pixel in the $m^{th}$ frame, the $m^{th}$ frame is the current frame of the first pixel, the $(m+1)^{th}$ frame is the next frame of the first pixel, and $g_{m+1}(x+i,y+j)$ is a pixel value of the first pixel in the $(m+1)^{th}$ frame.

The horizontal gradient calculating unit 150222 is further configured to calculate, in the following manner, the horizontal-direction gradient change value when the first pixel moves from the pixel position in the current frame to the pixel position in the next frame $$\Delta \text{gradh}' = \begin{cases} 0, & \Delta \text{gradh} - gath(noiselvl) < 0 \\ \Delta \text{gradh} - gath(noiselvl), & \Delta \text{gradh} - gath(noiselvl) \geq 0 \end{cases}$$

where $\Delta$gradh' is the horizontal-direction gradient change value, $gath(noiselvl)$ is the gradient anti-noise value of the first pixel, $\Delta \text{gradh}=abs(g_m(x+1,y)-g_m(x-1,y)-(g_{m+1}(x+i+1,y+j)-g_{m+1}(x+i-1,y+j)))$, $g_m(x+1,y)$ is a pixel value obtained after the first pixel moves upward from the pixel value $g_m(x,y)$ in the current frame in a horizontal direction, $g_m(x-1,y)$ is a pixel value obtained after the first pixel moves downward from the pixel value $g_m(x,y)$ in the current frame in the horizontal direction, $g_{m+1}(x+i+1,y+j)$ is a pixel value obtained after the first pixel moves upward from the pixel value $g_{m+1}(x+i,y+j)$ in the next frame in the horizontal direction, and $g_{m+1}(x+i-1,y+j)$ is a pixel value obtained after the first pixel moves downward from the pixel value $g_{m+1}(x+i,y+j)$ in the next frame in the horizontal direction.

The vertical gradient calculating unit 150223 is further configured to calculate, in the following manner, the vertical-direction gradient change value when the first pixel moves from the pixel position in the current frame to the pixel position in the next frame:

$$\Delta \text{gradv}' = \begin{cases} 0, & \Delta \text{gradv} - gath(noiselvl) < 0 \\ \Delta \text{gradv} - gath(noiselvl), & \Delta \text{gradv} - gath(noiselvl) \geq 0 \end{cases}$$

where $\Delta$gradv' is the vertical-direction gradient change value, $gath(noiselvl)$ is the gradient anti-noise value of the first pixel, $\Delta \text{gradv}=abs(g_m(x,y+1)-g_m(x,y-1)-(g_{m+1}(x+i,y+j+1)-g_{m+1}(x+i,y+j-1)))$, $g_m(x,y+1)$ is a pixel value obtained after the first pixel moves upward from the pixel value $g_m(x,y)$ in the current frame in a vertical direction, $g_m(x,y-1)$ is a pixel value obtained after the first pixel moves downward from the pixel value $g_m(x,y)$ in the current frame in the vertical direction, $g_{m+1}(x+i,y+j+1)$ is a pixel value obtained after the first pixel moves upward from the pixel value $g_{m+1}(x+i,y+j)$ in the next frame in the vertical direction, and $g_{m+1}(x+i,y+j-1)$ is a pixel value obtained after the first pixel moves downward from the pixel value $g_{m+1}(x+i,y+j)$ in the next frame in the vertical direction.

The similarity matching amount calculating unit 150224 is further configured to calculate the pixel similarity matching value of the first pixel in the following manner:

cost-volume=$\Delta$gray'+$\Delta$gradh'+$\Delta$gradv' where cost-volume is the pixel similarity matching value of the first pixel, $\Delta$gray' is the brightness change value, $\Delta$gradh' is the horizontal-direction gradient change value, and $\Delta$gradv' is the vertical-direction gradient change value.

Figure 15G:
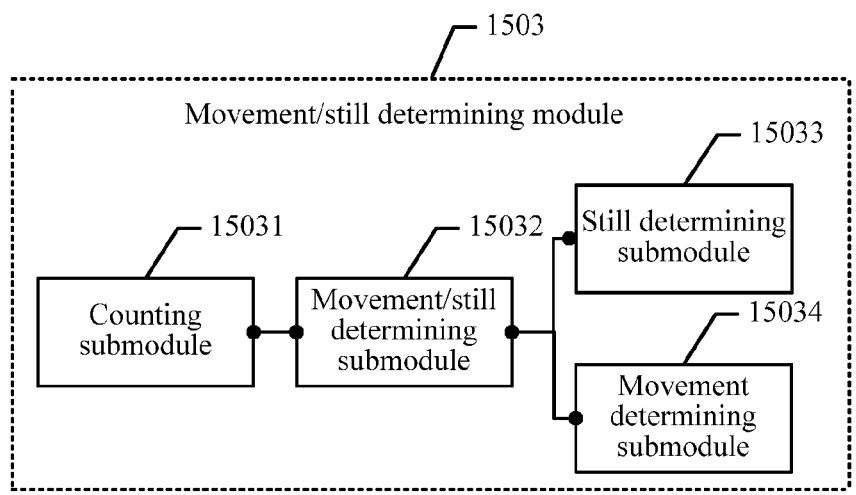
FIG. 15G is a schematic structural diagram of a movement/still determining module according to an embodiment of the present disclosure.

In some embodiments of the present disclosure, referring to FIG. 15G, the movement/still determining module 1503 includes a counting submodule 15031, a movement/still determining submodule 15032, a still determining submodule 15033, and a movement determining submodule 15034.

The counting submodule 15031 is configured to count pixels in the still area in the movement estimation neighborhood according to pixel positions of all the pixels in the current frame in the movement estimation neighborhood and pixel positions of all the pixels in the next frame in the movement estimation neighborhood.

The movement/still determining submodule 15032 is configured to compare a quantity of the pixels in the still area in the movement estimation neighborhood with a preset threshold for determining of movement/still.

The still determining submodule 15033 is configured to determine that the first pixel is in the still area if the quantity of the pixels in the still area in the movement estimation neighborhood is greater than or equal to the preset threshold for determining of movement/still.

The movement determining submodule 15034 is configured to determine that the first pixel is in a movement area if the quantity of the pixels in the still area in the movement estimation neighborhood is less than the preset threshold for determining of movement/still.

Figure 15H:
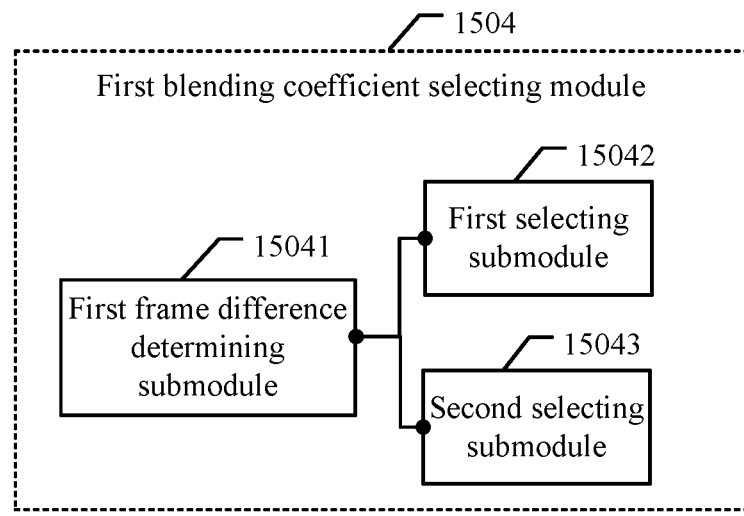
FIG. 15H is a schematic structural diagram of a first blending coefficient selecting module according to an embodiment of the present disclosure.

In some embodiments of the present disclosure, referring to FIG. 15H, the first blending coefficient selecting module 1504 includes a first frame difference determining submodule 15041, a first selecting submodule 15042, and a second selecting submodule 15043.

The first frame difference determining submodule 15041 is configured to determine whether the first frame difference of the first pixel is less than the preset first frame difference threshold.

The first selecting submodule 15042 is configured to select the first blending coefficient according to the quantization noise of the first section to which the first pixel belongs if the first frame difference of the first pixel is less than or equal to the first frame difference threshold.

The second selecting submodule 15043 is configured to select a first frame difference weight coefficient according to the quantization noise of the first section to which the first pixel belongs, and select the first blending coefficient according to the first frame difference threshold, the first frame difference of the first pixel, and the first frame difference weight coefficient if the first frame difference of the first pixel is greater than the first frame difference threshold.

The first TNR module 1505 is further configured to calculate the first noise reduction pixel value corresponding to the first pixel in the following manner:

TNR Output$(T)_{fir}$=TNR Output$_{mc}$$(T-1)\times$alpha$_{fir}$+Frame Input$(T)\times(1$-alpha$_{fir})$, where TNR Output$(T)_{fir}$ is the first noise reduction pixel value corresponding to the first pixel, TNR Output$_{mc}(T-1)$ is the pixel value of the corresponding position of the first pixel in the current frame and is obtained after movement estimation and movement compensation are performed based on the noise reduction pixel of the first pixel in the previous frame, $\text{alpha}_{fir}$ is the first blending coefficient, and Frame Input(T) is the pixel value of the first pixel in the current frame.

Further, the second TNR module 1507 is configured to calculate the second noise reduction pixel value corresponding to the first pixel in the following manner $$TNR\ \text{Output}(T)_{sec} = TNR\ \text{Output}(T-1) \times \text{alpha}_{sec} + \text{Frame Input}(T) \times (1 - \text{alpha}_{sec}),$$

where $TNR\ \text{Output}(T)_{sec}$ is the second noise reduction pixel value corresponding to the first pixel, $TNR\ \text{Output}(T-1)$ is the pixel value of the corresponding position of the noise reduction is pixel of the first pixel in the previous frame, $\text{alpha}_{sec}$ is the second blending coefficient, and Frame Input(T) is the pixel value of the first pixel in the current frame.

It should be noted that content such as information exchange between the modules/units of the apparatus and the execution processes thereof is based on the same idea as the method embodiments of the present disclosure, and produces the same technical effects as the method embodiments of the present disclosure. For the specific content, reference may be made to the description in the foregoing method embodiments of the present disclosure, and the details are not described herein again.

It can be learned from the embodiments shown in FIG. 15A, FIG. 15B, FIG. 15C, FIG. 15D, FIG. 15E, FIG. 15F, FIG. 15G, and FIG. 15H that a noisy image is divided into multiple sections. First, quantization noise of a first section is acquired. Then, pixel positions of all pixels in a movement estimation neighborhood in a next frame after the pixels separately move from pixel positions in a current frame to the next frame are detected according to the quantization noise of the first section. Next, whether a first pixel is in a movement area or a still area is determined according to a pixel position change situation of all the pixels in the movement estimation neighborhood that change from the current frame to the next frame. Next, different frame difference thresholds applicable to a movement area and a still area are separately set according to the determining of whether the first pixel is in a movement area or a still area, and then different frame difference calculation manners and previous-frame pixel value calculation manners that are applicable to a movement area and a still area are used. Finally, different noise reduction blending manners applicable to a movement area and a still area are selected according to a blending coefficient, a pixel value of a previous frame, and a pixel value of the first pixel in the current frame, where the blending coefficient is selected according to a movement estimation result of the first pixel. In the embodiments of the present disclosure, still/movement may be determined with reference to the quantization noise of the first section to which the first pixel belongs, and therefore a probability of incorrect determining is very low. For different results of the determining of whether the first pixel is in a movement area or a still area, different frame difference thresholds applicable to a movement area and a still area are separately set, and different frame difference calculation manners are used. Different blending coefficients applicable to a movement area and a still area are selected according to the different frame difference thresholds applicable to a movement area and a still area and the frame difference calculation manners. A noise reduction blending manner is selected according to the different blending coefficients applicable to a movement area and a still area, the frame difference calculation manners, and the pixel value of the first pixel in the current frame. In this way, noise reduction processing can be implemented according to whether the noisy image is in a movement area or a still area, and a probability of detection error is very low. Therefore, the technical solutions in these embodiments of the prevent disclosure can be applied to multiple noise scenarios.

An embodiment of the present disclosure further provides a computer storage medium, where the computer storage medium stores a program, and the program performs some or all steps recorded in the foregoing method embodiments.

Figure 16:
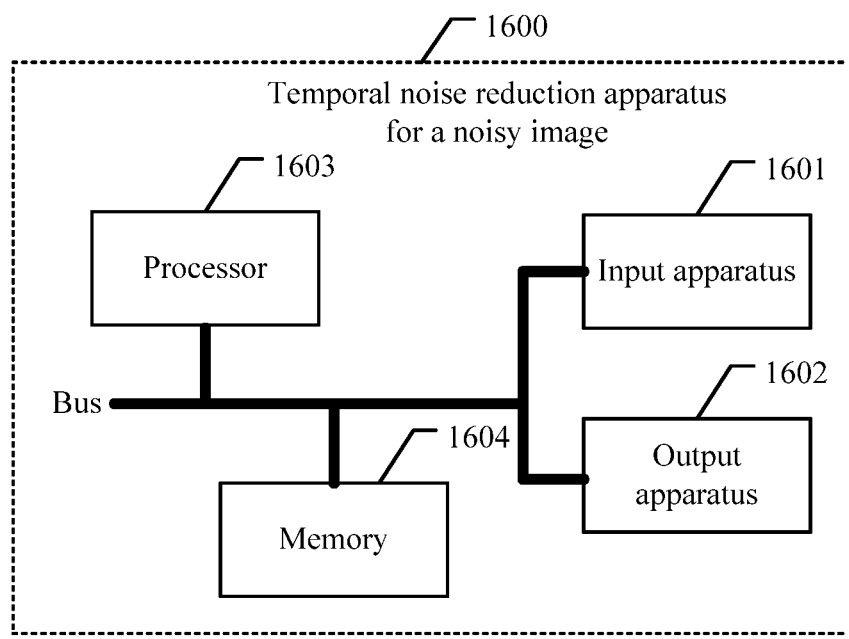
FIG. 16 is a schematic structural diagram of another TNR apparatus for a noisy image according to an embodiment of the present disclosure.

The following introduces another TNR apparatus for a noisy image according to an embodiment of the present disclosure. Referring to FIG. 16, a TNR apparatus 1600 for a noisy image includes an input apparatus 1601, an output apparatus 1602, a processor 1603, and a memory 1604 (the TNR apparatus 1600 for a noisy image may include one or more processors 1603, but one processor is used as an example in FIG. 16). In some embodiments of the present disclosure, the input apparatus 1601, the output apparatus 1602, the processor 1603, and the memory 1604 may be connected using a bus or in another manner. In FIG. 16, connecting them using a bus is used as an example.

In some embodiments of the present disclosure, the processor 1603 is configured to perform the following steps: acquiring quantization noise of a first section of a noisy image, where the first section is any one of multiple sections divided from the noisy image detecting, according to the quantization noise of the first section, pixel positions of all pixels in a movement estimation neighborhood in a next frame after the pixels move from pixel positions in a current frame to the next frame, where the movement estimation neighborhood includes neighbor pixels centered around a first pixel, and the first pixel is any pixel in the first section; determining, according to a pixel position change situation of all the pixels in the movement estimation neighborhood that change from the current frame to the next frame, whether the first pixel is in a movement area or a still area, and if the first pixel is in the movement area, selecting a first blending coefficient according to a first frame difference of the first pixel and a preset first frame difference threshold, and calculating a first noise reduction pixel value corresponding to the first pixel according to the first blending coefficient, a pixel value of the first pixel in the current frame, and a movement compensation pixel value of the first pixel in a previous frame, where the first frame difference is a difference between the pixel value of the first pixel in the current frame and the movement compensation pixel value of the first pixel in the previous frame, and the movement compensation pixel value is a pixel value of a corresponding position of the first pixel in the current frame and is obtained after movement estimation and movement compensation are performed based on a noise reduction pixel of the first pixel in the previous frame, and if the first pixel is in the still area, selecting a second blending coefficient according to a second frame difference of the first pixel and a preset second frame difference threshold, and then calculating a second noise reduction pixel value corresponding to the first pixel according to the second blending coefficient, the pixel value of the first pixel in the current frame, and a noise reduction pixel value of the first pixel in the previous frame, where the second frame difference threshold is greater than the first frame difference threshold, the second frame difference is a difference between the pixel value of the first pixel in the current frame and the noise reduction pixel value of the first pixel in the previous frame, and the noise reduction pixel value is a pixel value of a corresponding position of the noise reduction pixel of the first pixel in the previous frame.

In some embodiments of the present disclosure, the processor 1603 is further configured to perform the following steps: dividing the first section into multiple blocks, where each block includes multiple pixels; acquiring quantization noise of all pixels in a first block, and acquiring quantization noise of the first block according to the quantization noise of all the pixels in the first block, where the first block is any block in the first section, separately acquiring quantization noise of all the blocks except the first block in the first section, calculating average quantization noise based on the quantization noise of all the blocks in the first section, and using the average quantization noise as the quantization noise of the first section, or accumulate the quantization noise of all the blocks one by one in the first section, and using quantization noise that is greater than a preset noise threshold in a cumulative histogram as the quantization noise of the first section.

In some embodiments of the present disclosure, the processor 1603 is further configured to perform the following steps: determining whether each pixel in the first block is in a flat area, acquiring quantization noise of all pixels in the first block that are in the flat area, and calculating the quantization noise of the first block according to the quantization noise of all the pixels in the first block that are in the flat area.

In some embodiments of the present disclosure, the processor 1603 is further configured to perform the following steps: acquiring pixel values of all pixels in a noise estimation neighborhood, where the noise estimation neighborhood includes neighbor pixels that are centered around the first pixel and that are used to determine quantization noise of the first pixel, and the first pixel is any pixel in the first block; calculating an edge estimation value of the first pixel according to the pixel values and Sobel edge convolution kernels of all the pixels in the noise estimation neighborhood; determining whether the edge estimation value of the first pixel is greater than an edge area threshold, and if the edge estimation value of the first pixel is greater than the edge area threshold, determining that the first pixel is in an edge area, or if the edge estimation value of the first pixel is less than or equal to the edge area threshold, determining that the first pixel is not in the edge area; calculating a texture estimation value of the first pixel according to the pixel values of all the pixels in the noise estimation neighborhood, determining whether the texture estimation value of the first pixel is greater than a texture area threshold, and if the texture estimation value of the first pixel is greater than the texture area threshold, determining that the first pixel is in a texture area, or if the texture estimation value of the first pixel is less than or equal to the texture area threshold, determining that the first pixel is not in the texture area, where if the first pixel meets both of the following conditions: the first pixel is not in the edge area and the first pixel is not in the texture area, determining the first pixel is in the flat area.

In some embodiments of the present disclosure, the processor 1603 is further configured to perform the following steps: calculating the edge estimation value of the first pixel in the following manner:

$EM(x,y)=|NH(x,y)*E\_h|+|NH(x,y)*E\_v|+|NH(x,y)*E\_p45|+|NH(x,y)*E\_n45|,$ where (x,y) is a pixel position of the first pixel in the current frame, EM(x,y) is the edge estimation value of the first pixel, NH(x,y) is the noise estimation neighborhood, E_h, E_v, E_p45, and E_n45 are the Sobel edge convolution kernels, and * is a convolution symbol. calculating a texture estimation value of the first pixel according to the pixel values of all the pixels in the noise estimation neighborhood includes calculating the texture estimation value of the first pixel in the following manner:

$Noise\_Max\_Min(x,y)=Max(abs(value_i-value\_median))-Min(abs(value_i-value\_median)),$
$value_i \in NH(x,y),$ where (x,y) is the pixel position of the first pixel in the current frame, Noise_Max_Min(x,y) is the texture estimation value of the first pixel, $value_i$ is the $i^{th}$ pixel value in the noise estimation neighborhood, NH(x,y) is the noise estimation neighborhood, and value_median is a middle value or an average value of the pixel values of all the pixels in NH(x,y), and determining, in the following manner, whether the first pixel meets both of the following conditions: the first pixel is not in the edge area and the first pixel is not in the texture area:

$(EM(x,y)<=EGth)\&\&(Noise\_Max\_Min(x,y)<=MNth)==1,$ where EM(x,y) is the edge estimation value of the first pixel, EGth is the edge area threshold, Noise_Max_Min(x,y) is the texture estimation value of the first pixel, and MNth is the texture area threshold.

In some embodiments of the present disclosure, the processor 1603 is further configured to perform the following steps: acquiring pixel values of all pixels in a noise estimation neighborhood, where the noise estimation neighborhood includes neighbor pixels that are centered around the first pixel and that are used to determine quantization noise of the first pixel, and the first pixel is any pixel in the first block, and calculating the quantization noise of the first pixel in the following manner:

$pixel\_noise(x,y)=sum(abs(value_i-value\_median)),$
$value_i \in NH(x,y),$ where (x,y) is a pixel position of the first pixel in the current frame, pixel_noise(x,y) is the quantization noise of the first pixel, $value_i$ is the $i^{th}$ pixel value in the noise estimation neighborhood, NH(x,y) is the noise estimation neighborhood, and value_median is a middle value or an average value of the pixel values of all the pixels in NH(x,y).

In some embodiments of the present disclosure, the processor 1603 is further configured to perform the following steps: acquiring a brightness anti-noise value and a gradient anti-noise value of the first pixel according to the quantization noise of the first section to which the first pixel belongs; performing movement detection on the first pixel according to the brightness anti-noise value and the gradient anti-noise value of the first pixel and a pixel value of the first pixel at a pixel position in the current frame, to obtain a pixel position of the first pixel in the next frame; acquiring brightness anti-noise values and gradient anti-noise values of other pixels except the first pixel in the first section according to the quantization noise of the first section, and performing movement detection on the other pixels except the first pixel in the first section according to the brightness anti-noise values and the gradient anti-noise values of the other pixels except the first pixel in the first section and pixel values of the other pixels except the first pixel in the first section at pixel positions in the current frame, to obtain pixel positions of the other pixels except the first pixel in the first section in the next frame.

In some embodiments of the present disclosure, the processor 1603 is further configured to perform the following steps: calculating, according to the brightness anti-noise value of the first pixel, a brightness change value when the first pixel moves from the pixel position in the current frame to the pixel position in the next frame; calculating, according to the gradient anti-noise value of the first pixel, a horizontal-direction gradient change value when the first pixel moves from the pixel position in the current frame to the pixel position in the next frame; calculating, according to the gradient anti-noise value of the first pixel, a vertical-direction gradient change value when the first pixel moves from the pixel position in the current frame to the pixel position in the next frame; calculating a pixel similarity matching value of the first pixel according to the brightness change value, the horizontal-direction gradient change value, and the vertical-direction gradient change value, and calculating a pixel position of the first pixel in the next frame when a minimum value of the pixel similarity matching value is acquired.

In some embodiments of the present disclosure, the processor 1603 is further configured to perform the following steps: calculating, in the following manner, the brightness change value when the first pixel moves from the pixel position in the current frame to the pixel position in the next frame:

$$\Delta\text{gray}' = \begin{cases} 0, \Delta\text{gray} - lath(noiselvl) < 0 \\ \Delta\text{gray} - lath(noiselvl), \Delta\text{gray} - lath(noiselvl) \geq 0 \end{cases}$$

where $\Delta\text{gray}'$ is the brightness change value, $lath(noiselvl)$ is the brightness anti-noise value of the first pixel, $\Delta\text{gray}=abs(g_m(x,y)-g_{m+1}(x+i,y+j))$, $(x,y)$ is the pixel position of the first pixel in the current frame, $g_m(x,y)$ is a pixel value of the first pixel in the $m^{th}$ frame, the $m^{th}$ frame is the current frame of the first pixel, the $(m+1)^{th}$ frame is the next frame of the first pixel, and $g_{m+1}(x+i,y+j)$ is a pixel value of the first pixel in the $(m+1)^{th}$ frame; calculating, according to the gradient anti-noise value of the first pixel, a horizontal-direction gradient change value when the first pixel moves from the pixel position in the current frame to the pixel position in the next frame includes calculating, in the following manner, the horizontal-direction gradient change value when the first pixel moves from the pixel position in the current frame to the pixel position in the next frame:

$$\Delta\text{gradh}' = \begin{cases} 0, \Delta\text{gradh} - gath(noiselvl) < 0 \\ \Delta\text{gradh} - gath(noiselvl), \Delta\text{gradh} - gath(noiselvl) \geq 0 \end{cases}$$

where $\Delta\text{gradh}'$ is the horizontal-direction gradient change value, $gath(noiselvl)$ is the gradient anti-noise value of the first pixel, $\Delta\text{gradh}=abs(g_m(x+1,y)-g_m(x-1,y)-(g_{m+1}(x+i+1,y+j)-g_{m+1}(x+i-1,y+j)))$, $g_m(x+1,y)$ is a pixel value obtained after the first pixel moves upward from the pixel value $g_m(x,y)$ in the current frame in a horizontal direction, $g_m(x-1,y)$ is a pixel value obtained after the first pixel moves downward from the pixel value $g_m(x,y)$ in the current frame in the horizontal direction, $g_{m+1}(x+i+1,y+j)$ is a pixel value obtained after the first pixel moves upward from the pixel value $g_{m+1}(x+i,y+j)$ in the next frame in the horizontal direction, and $g_{m+1}(x+i-1,y+j)$ is a pixel value obtained after the first pixel moves downward from the pixel value $g_{m+1}(x+i,y+j)$ in the next frame in the horizontal direction; calculating, according to the gradient anti-noise value of the first pixel, a vertical-direction gradient change value when the first pixel moves from the pixel position in the current frame to the pixel position in the next frame includes calculating, in the following manner, the vertical-direction gradient change value when the first pixel moves from the pixel position in the current frame to the pixel position in the next frame:

$$\Delta\text{gradv}' = \begin{cases} 0, \Delta\text{gradv} - gath(noiselvl) < 0 \\ \Delta\text{gradv} - gath(noiselvl), \Delta\text{gradv} - gath(noiselvl) \geq 0 \end{cases}$$

where $\Delta\text{gradv}'$ is the vertical-direction gradient change value, $gath(noiselvl)$ is the gradient anti-noise value of the first pixel, $\Delta\text{gradv}=abs(g_m(x,y+1)-g_m(x,y-1)-(g_{m+1}(x+i,y+j+1)-g_{m+1}(x+i,y+j-1)))$, $g_m(x,y+1)$ is a pixel value obtained after the first pixel moves upward from the pixel value $g_m(x,y)$ in the current frame in a vertical direction, $g_m(x,y-1)$ is a pixel value obtained after the first pixel moves downward from the pixel value $g_m(x,y)$ in the current frame in the vertical direction, $g_{m+1}(x+i,y+j+1)$ is a pixel value obtained after the first pixel moves upward from the pixel value $g_{m+1}(x+i,y+j)$ in the next frame in the vertical direction, and $g_{m+1}(x+i,y+j-1)$ is a pixel value obtained after the first pixel moves downward from the pixel value $g_{m+1}(x+i,y+j)$ in the next frame in the vertical direction, and calculating a pixel similarity matching value of the first pixel according to the brightness change value, the horizontal-direction gradient change value, and the vertical-direction gradient change value includes calculating the pixel similarity matching value of the first pixel in the following manner:

$$\text{cost-volume}=\Delta\text{gray}'+\Delta\text{gradh}'+\Delta\text{gradv}'$$

where cost-volume is the pixel similarity matching value of the first pixel, $\Delta\text{gray}'$ is the brightness change value, $\Delta\text{gradh}'$ is the horizontal-direction gradient change value, and $\Delta\text{gradv}'$ is the vertical-direction gradient change value.

In some embodiments of the present disclosure, the processor 1603 is further configured to perform the following steps: acquiring quantization noise of all N sections of the N noisy image, comparing the quantization noise of the N sections with N preset quantization thresholds, classifying the quantization noise of the N sections into (N+1) noise levels, and acquiring a brightness anti-noise value and a gradient anti-noise value of the first pixel according to the quantization noise of the first section to which the first pixel belongs includes extracting a noise level of the first section, acquiring the brightness anti-noise value of the first pixel according to a positive correlation relationship between the noise level and the brightness anti-noise value, and acquiring the gradient anti-noise value of the first pixel according to a positive correlation relationship between the noise level and the gradient anti-noise value.

In some embodiments of the present disclosure, the processor 1603 is further configured to perform the following steps: counting pixels in the still area in the movement estimation neighborhood according to pixel positions of all the pixels in the current frame in the movement estimation neighborhood and pixel positions of all the pixels in the next frame in the movement estimation neighborhood; comparing a quantity of the pixels in the still area in the movement estimation neighborhood with a preset threshold for determining of movement/still, and if the quantity of the pixels in the still area in the movement estimation neighborhood is greater than or equal to the preset threshold for determining of movement/still, determining that the first pixel is in a still area, and if the quantity of the pixels in the still area in the movement estimation neighborhood is less than the preset threshold for determining of movement/still, determining that the first pixel is in a movement area.

In some embodiments of the present disclosure, the processor 1603 is further configured to perform the following steps: determining whether the first frame difference of the first pixel is less than the preset first frame difference threshold, and if the first frame difference of the first pixel is less than or equal to the first frame difference threshold, selecting the first blending coefficient according to the quantization noise of the first section to which the first pixel belongs, and if the first frame difference of the first pixel is greater than the first frame difference threshold, selecting a first frame difference weight coefficient according to the quantization noise of the first section to which the first pixel belongs, and selecting the first blending coefficient according to the first frame difference threshold, the first frame difference of the first pixel, and the first frame difference weight coefficient.

In some embodiments of the present disclosure, the processor 1603 is further configured to perform the following step: calculating the first noise reduction pixel value corresponding to the first pixel in the following manner:

$$TNR\ Output(T)\_{fir} = TNR\ Output\_{mc}(T-1) \times alpha\_{fir} + Frame\ Input(T) \times (1-alpha\_{fir}),$$

where $TNR\ Output(T)\_{fir}$ is the first noise reduction pixel value corresponding to the first pixel, $TNR\ Output\_{mc}(T-1)$ is the pixel value of the corresponding position of the first pixel in the current frame and is obtained after movement estimation and movement compensation are performed based on the noise reduction pixel of the first pixel in the previous frame, $alpha\_{fir}$ is the first blending coefficient, and $Frame\ Input(T)$ is the pixel value of the first pixel in the current frame.

In some embodiments of the present disclosure, the processor 1603 is further configured to perform the following step: calculating the second noise reduction pixel value corresponding to the first pixel in the following manner:

$$TNR\ Output(T)\_{sec} = TNR\ Output(T-1) \times alpha\_{sec} + Frame\ Input(T) \times (1-alpha\_{sec}),$$

where $TNR\ Output(T)\_{sec}$ is the second noise reduction pixel value corresponding to the first pixel, $TNR\ Output(T-1)$ is the pixel value of the corresponding position of the noise reduction pixel of the first pixel in the previous frame, $alpha\_{sec}$ is the second blending coefficient, and $Frame\ Input(T)$ is the pixel value of the first pixel in the current frame.

It can be learned from this embodiment that a noisy image is divided into multiple sections. First, quantization noise of a first section is acquired. Then, pixel positions of all pixels in a movement estimation neighborhood in a next frame after the pixels separately move from pixel positions in a current frame to the next frame are detected according to the quantization noise of the first section. Next, whether a first pixel is in a movement area or a still area is determined according to a pixel position change situation of all the pixels in the movement estimation neighborhood that change from the current frame to the next frame. Next, different frame difference thresholds applicable to a movement area and a still area are separately set according to the determining of whether the first pixel is in a movement area or a still area, and then different frame difference calculation manners and previous-frame pixel value calculation manners that are applicable to a movement area and a still area are used. Finally, different noise reduction blending manners applicable to a movement area and a still area are selected according to a blending coefficient, a pixel value of a previous frame, and a pixel value of the first pixel in the current frame, where the blending coefficient is selected according to a movement estimation result of the first pixel. In the embodiments of the present disclosure, still/movement may be determined with reference to the quantization noise of the first section to which the first pixel belongs, and therefore a probability of incorrect determining is very low. For different results of the determining of whether the first pixel is in a movement area or a still area, different frame difference thresholds applicable to a movement area and a still area are separately set, and different frame difference calculation manners are used. Different blending coefficients applicable to a movement area and a still area are selected according to the different frame difference thresholds applicable to a movement area and a still area and the frame difference calculation manners. A noise reduction blending manner is selected according to the different blending coefficients applicable to a movement area and a still area, the frame difference calculation manners, and the pixel value of the first pixel in the current frame. In this way, noise reduction processing can be implemented according to whether the noisy image is in a movement area or a still area, and a probability of detection error is very low. Therefore, the technical solutions in these embodiments of the prevent disclosure can be applied to multiple noise scenarios.

In addition, it should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments provided by the present disclosure, connection relationships between modules indicate that the modules have communication connections with each other, which may be further implemented as one or more communications buses or signal cables. Persons of ordinary skill in the art may understand and implement the embodiments of the present disclosure without creative efforts.

Based on the description of the foregoing implementation manners, persons skilled in the art may clearly understand that the present disclosure may be implemented by software in addition to necessary universal hardware, or by dedicated hardware, including an application-specific integrated circuit, a dedicated central processing unit (CPU), a dedicated memory, a dedicated component, and the like. Generally, any functions that can be performed by a computer program can be easily implemented using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation manner in most cases. Based on such an understanding, the technical solutions of the present disclosure essentially or the part contributing to the prior art may be implemented in a form of a software product. The computer software product is stored in a readable storage medium, such as a floppy disk, a universal serial bus (USB) flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present disclosure.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A temporal noise reduction method for a noisy image, comprising:
   acquiring quantization noise of a first section of the noisy image, wherein the first section is any one of multiple sections divided from the noisy image;
   detecting, according to the quantization noise of the first section, pixel positions of all pixels in a movement estimation neighborhood in a next frame after the pixels move from pixel positions in a current frame to the next frame, wherein the movement estimation neighborhood comprises neighbor pixels centered around a first pixel, and wherein the first pixel is any pixel in the first section;
   determining, according to a pixel position change situation of all the pixels in the movement estimation neighborhood that change from the current frame to the next frame, whether the first pixel is in a movement area or a still area;
   selecting a first blending coefficient according to a first frame difference of the first pixel and a preset first frame difference threshold when the first pixel is in the movement area;
   calculating a first noise reduction pixel value corresponding to the first pixel according to the first blending coefficient, a pixel value of the first pixel in the current frame, and a movement compensation pixel value of the first pixel in a previous frame, wherein the first frame difference is the difference between the pixel value of the first pixel in the current frame and the movement compensation pixel value of the first pixel in the previous frame, and wherein the movement compensation pixel value is a pixel value of a corresponding position of the first pixel in the current frame and is obtained after movement estimation and movement compensation are performed based on a noise reduction pixel of the first pixel in the previous frame;
   selecting a second blending coefficient according to a second frame difference of the first pixel and a preset second frame difference threshold when the first pixel is in the still area; and
   calculating a second noise reduction pixel value corresponding to the first pixel according to the second blending coefficient, the pixel value of the first pixel in the current frame, and the noise reduction pixel value of the first pixel in the previous frame, wherein the second frame difference threshold is greater than the first frame difference threshold, wherein the second frame difference is the difference between the pixel value of the first pixel in the current frame and the noise reduction pixel value of the first pixel in the previous frame, and wherein the noise reduction pixel value is a pixel value of a corresponding position of the noise reduction pixel of the first pixel in the previous frame.

2. The method according to claim 1, wherein acquiring the quantization noise of the first section of the noisy image comprises:
   dividing the first section into multiple blocks, wherein each block comprises multiple pixels;
   acquiring quantization noise of all the pixels in a first block;
   acquiring quantization noise of the first block according to the quantization noise of all the pixels in the first block, wherein the first block is any block in the first section;
   separately acquiring quantization noise of all the blocks except the first block in the first section; and
   either:
      calculating average quantization noise based on the quantization noise of all the blocks in the first section, and using the average quantization noise as the quantization noise of the first section; or
      accumulating the quantization noise of all the blocks one by one in the first section, and using the quantization noise that is greater than a preset noise threshold in a cumulative histogram as the quantization noise of the first section.

3. The method according to claim 2, wherein acquiring the quantization noise of the first block according to the quantization noise of all the pixels in the first block comprises:
   determining whether each pixel in the first block is in a flat area;
   acquiring the quantization noise of all the pixels in the first block that are in the flat area; and
   calculating the quantization noise of the first block according to the quantization noise of all the pixels in the first block that are in the flat area.

4. The method according to claim 3, wherein determining whether each pixel in the first block is in the flat area comprises:
   acquiring pixel values of all pixels in a noise estimation neighborhood, wherein the noise estimation neighborhood comprises neighbor pixels that are centered around the first pixel and that are used to determine quantization noise of the first pixel, and wherein the first pixel is any pixel in the first block;
   calculating an edge estimation value of the first pixel according to the pixel values and Sobel edge convolution kernels of all the pixels in the noise estimation neighborhood;
   either:
      determining whether the edge estimation value of the first pixel is greater than an edge area threshold, determining that the first pixel is in an edge area when the edge estimation value of the first pixel is greater than the edge area threshold; or
      determining that the first pixel is not in the edge area when the edge estimation value of the first pixel is less than or equal to the edge area threshold;
   calculating a texture estimation value of the first pixel according to the pixel values of all the pixels in the noise estimation neighborhood;
   either:
      determining whether the texture estimation value of the first pixel is greater than a texture area threshold, and determining that the first pixel is in a texture area when the texture estimation value of the first pixel is greater than the texture area threshold; or determining that the first pixel is not in the texture area when the texture estimation value of the first pixel is less than or equal to the texture area threshold; and determining the first pixel is in the flat area when the first pixel meets both of the following conditions: the first pixel is not in the edge area, and the first pixel is not in the texture area.

5. The method according to claim 4, wherein calculating the edge estimation value of the first pixel according to the pixel values and the Sobel edge convolution kernels of all the pixels in the noise estimation neighborhood comprises calculating the edge estimation value of the first pixel in the manner of $EM(x,y)=|NH(x,y)*E\_h|+|NH(x,y)*E\_v|+|NH(x,y)*E\_p45|+|NH(x,y)*E\_n45|$, wherein (x,y) is a pixel position of the first pixel in the current frame, wherein EM(x,y) is the edge estimation value of the first pixel, wherein NH(x,y) is the noise estimation neighborhood, wherein E_h, E_v, E_p45, and E_n45 are the Sobel edge convolution kernels, wherein * is a convolution symbol, wherein calculating the texture estimation value of the first pixel according to the pixel values of all the pixels in the noise estimation neighborhood comprises calculating the texture estimation value of the first pixel in the manner of $Noise\_Max\_Min(x,y)=Max(abs(value_i-value\_median))-Min(abs(value_i-value\_median))$, wherein $value_i \in NH(x,y)$, wherein (x,y) is the pixel position of the first pixel in the current frame, wherein Noise_Max_Min(x,y) is the texture estimation value of the first pixel, wherein value, is an $i^{th}$ pixel value in the noise estimation neighborhood, wherein NH(x,y) is the noise estimation neighborhood, wherein value_median is a middle value or an average value of the pixel values of all the pixels in NH(x,y), wherein determining whether the first pixel meets the conditions: the first pixel is not in the edge area and the first pixel is not in the texture area, comprises determining in the manner of $(EM(x,y) \leq EGth)\&\&(Noise\_Max\_Min(x,y) \leq MNth)==1$, wherein EM(x,y) is the edge estimation value of the first pixel, wherein EGth is the edge area threshold, wherein Noise_Max_Min(x,y) is the texture estimation value of the first pixel, and wherein MNth is the texture area threshold.

6. The method according to claim 2, wherein acquiring the quantization noise of all pixels in the first block comprises:

acquiring pixel values of all pixels in a noise estimation neighborhood, wherein the noise estimation neighborhood comprises neighbor pixels that are centered around the first pixel and that are used to determine quantization noise of the first pixel, and wherein the first pixel is any pixel in the first block; and calculating a quantization noise of the first pixel in the manner of $pixel\_noise(x,y)=sum(abs(value_i-value\_median))$, wherein $value_i \in NH(x,y)$, wherein (x,y) is a pixel position of the first pixel in the current frame, wherein pixel_noise(x,y) is the quantization noise of the first pixel, wherein value, is an $i^{th}$ pixel value in the noise estimation neighborhood, wherein NH(x,y) is the noise estimation neighborhood, and wherein value_median is a middle value or an average value of the pixel values of all the pixels in NH(x,y).

7. The method according to claim 1, wherein detecting, according to the quantization noise of the first section, the pixel positions of all the pixels in the movement estimation neighborhood in the next frame after the pixels move from the pixel positions in the current frame to the next frame comprises:

acquiring a brightness anti-noise value and a gradient anti-noise value of the first pixel according to the quantization noise of the first section to which the first pixel belongs;

performing movement detection on the first pixel according to the brightness anti-noise value and the gradient anti-noise value of the first pixel and the pixel value of the first pixel at the pixel position in the current frame, to obtain a pixel position of the first pixel in the next frame;

acquiring brightness anti-noise values and gradient anti-noise values of other pixels except the first pixel in the first section according to the quantization noise of the first section; and performing movement detection on the other pixels except the first pixel in the first section according to the brightness anti-noise values and the gradient anti-noise values of the other pixels except the first pixel in the first section and pixel values of the other pixels except the first pixel in the first section at pixel positions in the current frame, to obtain pixel positions of the other pixels except the first pixel in the first section in the next frame.

8. The method according to claim 7, wherein performing the movement detection on the first pixel according to the brightness anti-noise value and the gradient anti-noise value of the first pixel and the pixel value of the first pixel at the pixel position in the current frame, to obtain the pixel position of the first pixel in the next frame comprises:

calculating, according to the brightness anti-noise value of the first pixel, a brightness change value when the first pixel moves from the pixel position in the current frame to the pixel position in the next frame;

calculating, according to the gradient anti-noise value of the first pixel, a horizontal-direction gradient change value when the first pixel moves from the pixel position in the current frame to the pixel position in the next frame;

calculating, according to the gradient anti-noise value of the first pixel, a vertical-direction gradient change value when the first pixel moves from the pixel position in the current frame to the pixel position in the next frame;

calculating the pixel similarity matching value of the first pixel according to the brightness change value, the horizontal-direction gradient change value, and the vertical-direction gradient change value; and calculating a pixel position of the first pixel in the next frame when a minimum value of the pixel similarity matching value is acquired.

9. The method according to claim 7, wherein after acquiring the quantization noise of the first section of the noisy image, the method further comprises:

acquiring quantization noise of all N sections of the noisy image, wherein N is a positive integer greater than one;

comparing the quantization noise of the N sections with N preset quantization thresholds;

classifying the quantization noise of the N sections into (N+1) noise levels, and wherein acquiring the brightness anti-noise value and the gradient anti-noise value of the first pixel according to the quantization noise of the first section to which the first pixel belongs comprises:

extracting a noise level of the first section;
acquiring the brightness anti-noise value of the first pixel according to a positive correlation relationship between the noise level and the brightness anti-noise value; and
acquiring the gradient anti-noise value of the first pixel according to a positive correlation relationship between the noise level and the gradient anti-noise value.

10. The method according to claim 1, wherein determining, according to the pixel position change situation of all the pixels in the movement estimation neighborhood that change from the current frame to the next frame, whether the first pixel is in the movement area or the still area comprises:
counting pixels in the still area in the movement estimation neighborhood according to pixel positions of all the pixels in the current frame in the movement estimation neighborhood and pixel positions of all the pixels in the next frame in the movement estimation neighborhood;
comparing a quantity of the pixels in the still area in the movement estimation neighborhood with a preset threshold for determining of movement/still;
determining that the first pixel is in the still area when the quantity of the pixels in the still area in the movement estimation neighborhood is greater than or equal to the preset threshold for determining of movement/still; and
determining that the first pixel is in the movement area when the quantity of the pixels in the still area in the movement estimation neighborhood is less than the preset threshold for determining of movement/still.

11. The method according to claim 1, wherein selecting the first blending coefficient according to the first frame difference of the first pixel and the preset first frame difference threshold comprises:
determining whether the first frame difference of the first pixel is less than the preset first frame difference threshold;
selecting the first blending coefficient according to the quantization noise of the first section to which the first pixel belongs when the first frame difference of the first pixel is less than or equal to the first frame difference threshold;
selecting a first frame difference weight coefficient according to the quantization noise of the first section to which the first pixel belongs when the first frame difference of the first pixel is greater than the first frame difference threshold; and
selecting the first blending coefficient according to the first frame difference threshold, the first frame difference of the first pixel, and the first frame difference weight coefficient.

12. The method according to claim 1, wherein calculating the first noise reduction pixel value corresponding to the first pixel according to the first blending coefficient, the pixel value of the first pixel in the current frame, and the movement compensation pixel value of the first pixel in the previous frame comprises calculating the first noise reduction pixel value corresponding to the first pixel in the manner of TNR Output(T)$_{\_fir}$=TNR Output$_{\_mc}$(T−1)×alpha$_{\_fir}$+Frame Input(T)×(1−alpha$_{\_fir}$), wherein TNR Output(T)$_{\_fir}$ is the first noise reduction pixel value corresponding to the first pixel, wherein TNR Output$_{\_mc}$(T−1) is the pixel value of the corresponding position of the first pixel in the current frame and is obtained after movement estimation and movement compensation are performed based on the noise reduction pixel of the first pixel in the previous frame, wherein alpha$_{\_fir}$ is the first blending coefficient, and wherein Frame Input (T) is the pixel value of the first pixel in the current frame.

13. The method according to claim 1, wherein calculating the second noise reduction pixel value corresponding to the first pixel according to the second blending coefficient, the pixel value of the first pixel in the current frame, and the noise reduction pixel value of the first pixel in the previous frame comprises calculating the second noise reduction pixel value corresponding to the first pixel in the manner of TNR Output(T)$_{\_sec}$=TNR Output(T−1)×alpha$_{\_sec}$+Frame Input(T)×(1−alpha$_{\_sec}$), wherein TNR Output(T)$_{\_sec}$ is the second noise reduction pixel value corresponding to the first pixel, wherein TNR Output(T−1) is the pixel value of the corresponding position of the noise reduction pixel of the first pixel in the previous frame, wherein alpha$_{\_sec}$ is the second blending coefficient, and wherein Frame Input (T) is the pixel value of the first pixel in the current frame.

14. A temporal noise reduction apparatus for a noisy image, comprising:
a memory; and
a processor coupled to the memory and configured to:
acquire quantization noise of a first section of the noisy image, wherein the first section is any one of multiple sections divided from the noisy image;
detect, according to the quantization noise of the first section, pixel positions of all pixels in a movement estimation neighborhood in a next frame after the pixels move from pixel positions in a current frame to the next frame, wherein the movement estimation neighborhood comprises neighbor pixels centered around a first pixel, and wherein the first pixel is any pixel in the first section;
determine, according to a pixel position change situation of all the pixels in the movement estimation neighborhood that change from the current frame to the next frame, whether the first pixel is in a movement area or a still area;
trigger execution of a first blending coefficient selection and a first temporal noise reduction when the first pixel is in the movement area;
trigger execution of a second blending coefficient selection and a second temporal noise reduction when the first pixel is in the still area,
wherein the first blending coefficient selection is configured to select a first blending coefficient according to a first frame difference of the first pixel and a preset first frame difference threshold when the first pixel is in the movement area,
wherein the first frame difference is the difference between a pixel value of the first pixel in the current frame and a movement compensation pixel value of the first pixel in the previous frame,
wherein the first temporal noise reduction is configured to calculate a first noise reduction pixel value corresponding to the first pixel according to the first blending coefficient, the pixel value of the first pixel in the current frame, and the movement compensation pixel value of the first pixel in the previous frame,
wherein the movement compensation pixel value is a pixel value of a corresponding position of the first pixel in the current frame and is obtained after movement estimation and movement compensation are performed based on a noise reduction pixel of the first pixel in the previous frame,
wherein the second blending coefficient selection is configured to select a second blending coefficient according to a second frame difference of the first pixel and a preset second frame difference threshold when the first pixel is in the still area, wherein the second frame difference is the difference between the pixel value of the first pixel in the current frame and a noise reduction pixel value of the first pixel in the previous frame, wherein the second frame difference threshold is greater than the first frame difference threshold, wherein the second temporal noise reduction is configured to calculate a second noise reduction pixel value corresponding to the first pixel according to the second blending coefficient, the pixel value of the first pixel in the current frame, and the noise reduction pixel value of the first pixel in the previous frame, and wherein the noise reduction pixel value is a pixel value of a corresponding position of the noise reduction pixel of the first pixel in the previous frame.

15. The apparatus according to claim 14, wherein the processor is further configured to:

divide the first section into multiple blocks, wherein each block comprises multiple pixels;

acquire quantization noise of all the pixels in a first block;

acquire quantization noise of the first block according to the quantization noise of all the pixels in the first block, wherein the first block is any block in the first section;

separately acquire quantization noise of all the blocks except the first block in the first section; and either:

calculate average quantization noise based on the quantization noise of all the blocks in the first section, and set the average quantization noise as the quantization noise of the first section; or accumulate the quantization noise of all the blocks one by one in the first section, and set quantization noise that is greater than a preset noise threshold in a cumulative histogram as the quantization noise of the first section.

16. The apparatus according to claim 15, wherein the processor is further configured to:

determine whether each pixel in the first block is in a flat area;

acquire the quantization noise of all the pixels in the first block that are in the flat area; and calculate the quantization noise of the first block according to the quantization noise of all the pixels in the first block that are in the flat area.

17. The apparatus according to claim 16, wherein the processor is further configured to:

acquire pixel values of all pixels in a noise estimation neighborhood, wherein the noise estimation neighborhood comprises neighbor pixels that are centered around the first pixel and that are used to determine quantization noise of the first pixel, and wherein the first pixel is any pixel in the first block;

calculate an edge estimation value of the first pixel according to the pixel values and Sobel edge convolution kernels of all the pixels in the noise estimation neighborhood;

determine whether the edge estimation value of the first pixel is greater than an edge area threshold;

determine that the first pixel is in an edge area when the edge estimation value of the first pixel is greater than the edge area threshold;

determine that the first pixel is not in the edge area when the edge estimation value of the first pixel is less than or equal to the edge area threshold;

calculate a texture estimation value of the first pixel according to the pixel values of all the pixels in the noise estimation neighborhood;

determine whether the texture estimation value of the first pixel is greater than a texture area threshold;

determine that the first pixel is in a texture area when the texture estimation value of the first pixel is greater than the texture area threshold;

determine that the first pixel is not in the texture area when the texture estimation value of the first pixel is less than or equal to the texture area threshold; and determine that the first pixel is in the flat area when the first pixel meets both of the following conditions: the first pixel is not in the edge area, and the first pixel is not in the texture area.

18. The apparatus according to claim 15, wherein the processor is further configured to:

acquire pixel values of all pixels in a noise estimation neighborhood, wherein the noise estimation neighborhood comprises neighbor pixels that are centered around the first pixel and that are used to determine quantization noise of the first pixel, and wherein the first pixel is any pixel in the first block; and calculate the quantization noise of the first pixel in the manner of pixel_noise(x,y)=sum(abs($value_i$−value_median)), wherein $value_i \in NH(x,y)$, wherein (x,y) is a pixel position of the first pixel in the current frame, wherein pixel_noise(x,y) is the quantization noise of the first pixel, wherein value, is an $i^{th}$ pixel value in the noise estimation neighborhood, wherein NH(x,y) is the noise estimation neighborhood, and wherein value_median is a middle value or an average value of the pixel values of all the pixels in NH(x,y).

19. The apparatus according to claim 14, wherein the processor is further configured to:

acquire a brightness anti-noise value and a gradient anti-noise value of the first pixel according to the quantization noise of the first section to which the first pixel belongs; and perform movement detection on the first pixel according to the brightness anti-noise value and the gradient anti-noise value of the first pixel and the pixel value of the first pixel at the pixel position in the current frame, to obtain a pixel position of the first pixel in the next frame.

20. The apparatus according to claim 14, wherein the processor is further configured to:

count pixels in the still area in the movement estimation neighborhood according to pixel positions of all the pixels in the current frame in the movement estimation neighborhood and pixel positions of all the pixels in the next frame in the movement estimation neighborhood;

compare a quantity of the pixels in the still area in the movement estimation neighborhood with a preset threshold for determining of movement/still;

determine that the first pixel is in the still area when the quantity of the pixels in the still area in the movement estimation neighborhood is greater than or equal to the preset threshold for determining of movement/still; and determine that the first pixel is in the movement area when the quantity of the pixels in the still area in the movement estimation neighborhood is less than the preset threshold for determining of movement/still.

* * * * *